US012495390B2

(12) United States Patent
Cier et al.

(10) Patent No.: US 12,495,390 B2
(45) Date of Patent: Dec. 9, 2025

(54) AUTOMATED TRACKING OF IN-BUILDING DEVICE LOCATION AND PROVISION OF ASSOCIATED LOCATION-RELATED FUNCTIONALITY

(71) Applicant: MFTB Holdco, Inc., Seattle, WA (US)

(72) Inventors: Sean P. Cier, Ravensdale, WA (US); Joshua Weisberg, Anacortes, WA (US); Christopher Buehler, Seattle, WA (US)

(73) Assignee: MFTB Holdco, Inc., Seattle, WA (US)

( * ) Notice: Subject to any disclaimer, the term of this patent is extended or adjusted under 35 U.S.C. 154(b) by 524 days.

(21) Appl. No.: 18/100,559

(22) Filed: Jan. 23, 2023

(65) Prior Publication Data

US 2024/0251378 A1 Jul. 25, 2024

(51) Int. Cl.
*H04W 64/00* (2009.01)
*G07C 9/28* (2020.01)

(52) U.S. Cl.
CPC ............ *H04W 64/006* (2013.01); *G07C 9/28* (2020.01)

(58) Field of Classification Search
CPC .................................................. H04W 64/006
See application file for complete search history.

(56) References Cited

U.S. PATENT DOCUMENTS

| 5,140,352 | A  | 8/1992  | Moore et al. |
| 6,031,540 | A  | 2/2000  | Golin et al. |
| 6,141,034 | A  | 10/2000 | McCutchen |
| 6,317,166 | B1 | 11/2001 | McCutchen |

(Continued)

FOREIGN PATENT DOCUMENTS

| EP | 2413097 A2 | 2/2012 |
| EP | 2505961 A2 | 10/2012 |

(Continued)

OTHER PUBLICATIONS

CubiCasa | From video to floor plan in under 5 minutes, retrieved on Mar. 26, 2019, from https://www.cubi.casa/, 6 pages.

(Continued)

*Primary Examiner* — Curtis B Odom
(74) *Attorney, Agent, or Firm* — VLP Law Group LLP; James A. D. White

(57) ABSTRACT

Techniques are described for using computing devices to perform automated operations for using generated building information to further generate and present visual data enhancements on images that are captured by and displayed on a mobile device in the building (e.g., concurrent with capture of the images by a camera of the mobile device, such as in a real-time or near-real-time manner with respect to image capture), such as using descriptive information about a building that is generated from analysis of acquired building images and optionally other building information (e.g., floor plans), and such as to improve navigation of the building (e.g., for autonomous vehicles) and provide other functionality as the mobile device moves through the building. The descriptive building information may include structural elements and other objects identified in the building and other determined attributes of the building, and automatically generated textual descriptions of the objects and other attributes.

26 Claims, 20 Drawing Sheets

(56) References Cited

U.S. PATENT DOCUMENTS

| | | |
|---|---|---|
| 6,320,584 B1 | 11/2001 | Golin et al. |
| 6,323,858 B1 | 11/2001 | Gilbert et al. |
| 6,337,683 B1 | 1/2002 | Gilbert et al. |
| 6,654,019 B2 | 11/2003 | Gilbert et al. |
| 6,683,608 B2 | 1/2004 | Golin et al. |
| 6,690,374 B2 | 2/2004 | Park et al. |
| 6,731,305 B1 | 5/2004 | Park et al. |
| 6,738,073 B2 | 5/2004 | Park et al. |
| 7,050,085 B1 | 5/2006 | Park et al. |
| 7,129,971 B2 | 10/2006 | McCutchen |
| 7,196,722 B2 | 3/2007 | White et al. |
| 7,525,567 B2 | 4/2009 | McCutchen |
| 7,620,909 B2 | 11/2009 | Park et al. |
| 7,627,235 B2 | 12/2009 | McCutchen et al. |
| 7,782,319 B2 | 8/2010 | Ghosh et al. |
| 7,791,638 B2 | 9/2010 | McCutchen |
| 7,909,241 B2 | 3/2011 | Stone et al. |
| 7,973,838 B2 | 7/2011 | McCutchen |
| 8,072,455 B2 | 12/2011 | Temesvari et al. |
| 8,094,182 B2 | 1/2012 | Park et al. |
| RE43,786 E | 11/2012 | Cooper |
| 8,463,020 B1 | 6/2013 | Schuckmann et al. |
| 8,517,256 B2 | 8/2013 | Stone et al. |
| 8,520,060 B2 | 8/2013 | Zomet et al. |
| 8,523,066 B2 | 9/2013 | Stone et al. |
| 8,523,067 B2 | 9/2013 | Stone et al. |
| 8,528,816 B2 | 9/2013 | Stone et al. |
| 8,540,153 B2 | 9/2013 | Stone et al. |
| 8,594,428 B2 | 11/2013 | Aharoni et al. |
| 8,654,180 B2 | 2/2014 | Zomet et al. |
| 8,666,815 B1 | 3/2014 | Chau |
| 8,699,005 B2 | 4/2014 | Likholyot |
| 8,705,892 B2 | 4/2014 | Aguilera et al. |
| RE44,924 E | 6/2014 | Cooper et al. |
| 8,854,684 B2 | 10/2014 | Zomet |
| 8,861,840 B2 | 10/2014 | Bell et al. |
| 8,861,841 B2 | 10/2014 | Bell et al. |
| 8,879,828 B2 | 11/2014 | Bell et al. |
| 8,953,871 B2 | 2/2015 | Zomet |
| 8,989,440 B2 | 3/2015 | Klusza et al. |
| 8,996,336 B2 | 3/2015 | Malka et al. |
| 9,021,947 B2 | 5/2015 | Landa |
| 9,026,947 B2 | 5/2015 | Lee et al. |
| 9,035,968 B2 | 5/2015 | Zomet |
| 9,041,796 B2 | 5/2015 | Malka et al. |
| 9,071,714 B2 | 6/2015 | Zomet |
| 9,129,438 B2 | 9/2015 | Aarts et al. |
| 9,151,608 B2 | 10/2015 | Malka et al. |
| 9,165,410 B1 | 10/2015 | Bell et al. |
| 9,171,405 B1 | 10/2015 | Bell et al. |
| 9,324,190 B2 | 4/2016 | Bell et al. |
| 9,361,717 B2 | 6/2016 | Zomet |
| 9,396,586 B2 | 7/2016 | Bell et al. |
| 9,438,759 B2 | 9/2016 | Zomet |
| 9,438,775 B2 | 9/2016 | Powers et al. |
| 9,489,775 B1 | 11/2016 | Bell et al. |
| 9,495,783 B1 | 11/2016 | Samarasekera et al. |
| 9,576,401 B2 | 2/2017 | Zomet |
| 9,619,933 B2 | 4/2017 | Spinella-Marno et al. |
| 9,635,252 B2 | 4/2017 | Accardo et al. |
| 9,641,702 B2 | 5/2017 | Bin-Nun et al. |
| 9,760,994 B1 | 9/2017 | Bell et al. |
| 9,786,097 B2 | 10/2017 | Bell et al. |
| 9,787,904 B2 | 10/2017 | Birkler et al. |
| 9,836,885 B1 | 12/2017 | Eraker et al. |
| 9,852,351 B2 | 12/2017 | Aguilera Perez et al. |
| 9,953,111 B2 | 4/2018 | Bell et al. |
| 9,953,430 B1 | 4/2018 | Zakhor |
| 9,990,760 B2 | 6/2018 | Aguilera Perez et al. |
| 9,990,767 B1 | 6/2018 | Sheffield et al. |
| 10,026,224 B2 | 7/2018 | Bell et al. |
| 10,030,979 B2 | 7/2018 | Bjorke et al. |
| 10,055,876 B2 | 8/2018 | Ford et al. |
| 10,068,344 B2 | 9/2018 | Jovanovic et al. |
| 10,083,522 B2 | 9/2018 | Jovanovic et al. |
| 10,102,639 B2 | 10/2018 | Bell et al. |
| 10,102,673 B2 | 10/2018 | Eraker et al. |
| 10,120,397 B1 | 11/2018 | Zakhor et al. |
| 10,122,997 B1 | 11/2018 | Sheffield et al. |
| 10,127,718 B2 | 11/2018 | Zakhor et al. |
| 10,127,722 B2 | 11/2018 | Shakib et al. |
| 10,139,985 B2 | 11/2018 | Mildrew et al. |
| 10,163,261 B2 | 12/2018 | Bell et al. |
| 10,163,271 B1 | 12/2018 | Powers et al. |
| 10,181,215 B2 | 1/2019 | Sedeffow |
| 10,192,115 B1 | 1/2019 | Sheffield et al. |
| 10,204,185 B2 | 2/2019 | Mrowca et al. |
| 10,210,285 B2 | 2/2019 | Wong et al. |
| 10,235,797 B1 | 3/2019 | Sheffield et al. |
| 10,242,400 B1 | 3/2019 | Eraker et al. |
| 10,339,716 B1 | 7/2019 | Powers et al. |
| 10,366,531 B2 | 7/2019 | Sheffield |
| 10,375,306 B2 | 8/2019 | Shan et al. |
| 10,395,435 B2 | 8/2019 | Powers et al. |
| 10,530,997 B2 | 1/2020 | Shan et al. |
| 10,643,386 B2 | 5/2020 | Li et al. |
| 10,708,507 B1 | 7/2020 | Dawson et al. |
| 10,809,066 B2 | 10/2020 | Colburn et al. |
| 10,825,247 B1 | 11/2020 | Vincent et al. |
| 10,834,317 B2 | 11/2020 | Shan et al. |
| 11,055,531 B1 | 7/2021 | Maestas |
| 11,057,561 B2 | 7/2021 | Shan et al. |
| 11,164,361 B2 | 11/2021 | Moulon et al. |
| 11,164,368 B2 | 11/2021 | Vincent et al. |
| 11,165,959 B2 | 11/2021 | Shan et al. |
| 11,200,421 B1 | 12/2021 | Chavez et al. |
| 11,217,019 B2 | 1/2022 | Li et al. |
| 11,238,652 B2 | 2/2022 | Impas et al. |
| 11,243,656 B2 | 2/2022 | Li et al. |
| 11,252,329 B1 | 2/2022 | Cier et al. |
| 11,284,006 B2 | 3/2022 | Dawson et al. |
| 11,405,549 B2 | 8/2022 | Cier et al. |
| 11,405,558 B2 | 8/2022 | Dawson et al. |
| 11,408,738 B2 | 8/2022 | Colburn et al. |
| 2006/0256109 A1 | 11/2006 | Acker et al. |
| 2010/0232709 A1 | 9/2010 | Zhang et al. |
| 2012/0075414 A1 | 3/2012 | Park et al. |
| 2012/0293613 A1 | 11/2012 | Powers et al. |
| 2013/0050407 A1 | 2/2013 | Brinda et al. |
| 2013/0342533 A1 | 12/2013 | Bell et al. |
| 2014/0043436 A1 | 2/2014 | Bell et al. |
| 2014/0044343 A1 | 2/2014 | Bell et al. |
| 2014/0044344 A1 | 2/2014 | Bell et al. |
| 2014/0125658 A1 | 5/2014 | Bell et al. |
| 2014/0125767 A1 | 5/2014 | Bell et al. |
| 2014/0125768 A1 | 5/2014 | Bell et al. |
| 2014/0125769 A1 | 5/2014 | Bell et al. |
| 2014/0125770 A1 | 5/2014 | Bell et al. |
| 2014/0236482 A1 | 8/2014 | Dorum et al. |
| 2014/0267631 A1 | 9/2014 | Powers et al. |
| 2014/0307100 A1 | 10/2014 | Myllykoski et al. |
| 2014/0320674 A1 | 10/2014 | Kuang |
| 2015/0109338 A1 | 4/2015 | McKinnon et al. |
| 2015/0116691 A1 | 4/2015 | Likholyot |
| 2015/0189165 A1 | 7/2015 | Milosevski et al. |
| 2015/0262421 A1 | 9/2015 | Bell et al. |
| 2015/0269785 A1 | 9/2015 | Bell et al. |
| 2015/0302636 A1 | 10/2015 | Arnoldus et al. |
| 2015/0310596 A1 | 10/2015 | Sheridan et al. |
| 2015/0332464 A1 | 11/2015 | O'Keefe et al. |
| 2016/0055268 A1 | 2/2016 | Bell et al. |
| 2016/0134860 A1 | 5/2016 | Jovanovic et al. |
| 2016/0140676 A1 | 5/2016 | Fritze et al. |
| 2016/0217225 A1 | 7/2016 | Bell et al. |
| 2016/0260250 A1 | 9/2016 | Jovanovic et al. |
| 2016/0286119 A1 | 9/2016 | Rondinelli |
| 2016/0300385 A1 | 10/2016 | Bell et al. |
| 2017/0034430 A1 | 2/2017 | Fu et al. |
| 2017/0067739 A1 | 3/2017 | Siercks et al. |
| 2017/0194768 A1 | 7/2017 | Powers et al. |
| 2017/0195654 A1 | 7/2017 | Powers et al. |
| 2017/0263050 A1 | 9/2017 | Ha et al. |
| 2017/0324941 A1 | 11/2017 | Birkler |
| 2017/0330273 A1 | 11/2017 | Holt et al. |

(56) References Cited

U.S. PATENT DOCUMENTS

| | | | |
|---|---|---|---|
| 2017/0337737 | A1 | 11/2017 | Edwards et al. |
| 2018/0007340 | A1 | 1/2018 | Stachowski |
| 2018/0025536 | A1 | 1/2018 | Bell et al. |
| 2018/0075168 | A1 | 3/2018 | Tiwari et al. |
| 2018/0139431 | A1 | 5/2018 | Simek et al. |
| 2018/0143023 | A1 | 5/2018 | Bjorke et al. |
| 2018/0143756 | A1 | 5/2018 | Mildrew et al. |
| 2018/0144487 | A1 | 5/2018 | Bell et al. |
| 2018/0144535 | A1 | 5/2018 | Ford et al. |
| 2018/0144547 | A1 | 5/2018 | Shakib et al. |
| 2018/0144555 | A1 | 5/2018 | Ford et al. |
| 2018/0146121 | A1 | 5/2018 | Hensler et al. |
| 2018/0146193 | A1 | 5/2018 | Safreed et al. |
| 2018/0146212 | A1 | 5/2018 | Hensler et al. |
| 2018/0165871 | A1 | 6/2018 | Mrowca |
| 2018/0203955 | A1 | 7/2018 | Bell et al. |
| 2018/0241985 | A1 | 8/2018 | O'Keefe et al. |
| 2018/0293793 | A1 | 10/2018 | Bell et al. |
| 2018/0300936 | A1 | 10/2018 | Ford et al. |
| 2018/0306588 | A1 | 10/2018 | Bjorke et al. |
| 2018/0348854 | A1 | 12/2018 | Powers et al. |
| 2018/0365496 | A1 | 12/2018 | Hovden et al. |
| 2019/0012833 | A1 | 1/2019 | Eraker et al. |
| 2019/0026956 | A1 | 1/2019 | Gausebeck et al. |
| 2019/0026957 | A1 | 1/2019 | Gausebeck |
| 2019/0026958 | A1 | 1/2019 | Gausebeck et al. |
| 2019/0035165 | A1 | 1/2019 | Gausebeck |
| 2019/0041972 | A1 | 2/2019 | Bae |
| 2019/0050137 | A1 | 2/2019 | Mildrew et al. |
| 2019/0051050 | A1 | 2/2019 | Bell et al. |
| 2019/0051054 | A1 | 2/2019 | Jovanovic et al. |
| 2019/0087067 | A1 | 3/2019 | Hovden et al. |
| 2019/0122422 | A1 | 4/2019 | Sheffield et al. |
| 2019/0164335 | A1 | 5/2019 | Sheffield et al. |
| 2019/0180104 | A1 | 6/2019 | Sheffield et al. |
| 2019/0251645 | A1 | 8/2019 | Winans |
| 2019/0287164 | A1 | 9/2019 | Eraker et al. |
| 2020/0336675 | A1 | 10/2020 | Dawson et al. |
| 2020/0389602 | A1 | 12/2020 | Dawson et al. |
| 2020/0408532 | A1 | 12/2020 | Colburn et al. |
| 2021/0044760 | A1 | 2/2021 | Dawson et al. |
| 2021/0065271 | A1 | 3/2021 | Benkreira et al. |
| 2021/0377442 | A1 | 12/2021 | Boyadzhiev et al. |
| 2021/0385378 | A1 | 12/2021 | Cier et al. |
| 2022/0003555 | A1 | 1/2022 | Colburn et al. |
| 2022/0028156 | A1 | 1/2022 | Boyadzhiev et al. |
| 2022/0028159 | A1 | 1/2022 | Vincent et al. |
| 2022/0076019 | A1 | 3/2022 | Moulon et al. |
| 2022/0076491 | A1 | 3/2022 | Zellner et al. |
| 2022/0092227 | A1 | 3/2022 | Yin et al. |
| 2022/0114291 | A1 | 4/2022 | Li et al. |
| 2022/0164493 | A1 | 5/2022 | Li et al. |
| 2022/0189122 | A1 | 6/2022 | Li et al. |
| 2024/0284572 | A1* | 8/2024 | Casey .................. H05B 47/16 |

FOREIGN PATENT DOCUMENTS

| | | |
|---|---|---|
| EP | 2506170 A2 | 10/2012 |
| KR | 101770648 B1 | 8/2017 |
| KR | 101930796 B1 | 12/2018 |
| WO | 2005091894 A2 | 10/2005 |
| WO | 2016154306 A1 | 9/2016 |
| WO | 2018204279 A1 | 11/2018 |
| WO | 2019058266 A1 | 3/2019 |
| WO | 2019083832 A1 | 5/2019 |
| WO | 2019104049 A1 | 5/2019 |
| WO | 2019118599 A2 | 6/2019 |
| WO | 2020068177 A1 | 4/2020 |
| WO | 2022053888 A1 | 3/2022 |

OTHER PUBLICATIONS

CubiCasa FAQ & Manual, retrieved on Mar. 26, 2019, from https://www.cubi.casa/faq/, 5 pages.
Cupix Home, retrieved on Mar. 26, 2019, from https://www.cupix.com/, 1 page.
Cupix—FAQ, retrieved on Mar. 26, 2019, from https://www.cupix.com/faq.html, 3 pages.
IGUIDE: 3D Virtual Tours, retrieved on Mar. 26, 2019, from https://goiguide.com/, 6 pages.
immoviewer.com | Automated Video Creation & Simple Affordable 3D 360 Tours, retrieved on Mar. 26, 2019, from https://www.immoviewer.com/, 5 pages.
MagicPlan | #1 Floor Plan App, Construction & Surveying Samples, retrieved on Mar. 26, 2019, from https://www.magicplan.app/, 9 pages.
EyeSpy360 Virtual Tours | Virtual Tour with any 360 camera, retrieved on Mar. 27, 2019, from https://www.eyespy360.com/en-us/, 15 pages.
Indoor Reality, retrieved on Mar. 27, 2019, from https://www.indoorreality.com/, 9 pages.
InsideMaps, retrieved on Mar. 27, 2019, from https://www.insidemaps.com/, 7 pages.
IStaging | Augmented & Virtual Reality Platform For Business, retrieved on Mar. 27, 2019, from https://www.istaging.com/en/, 7 pages.
Metareal, retrieved on Mar. 27, 2019, from https://www.metareal.com/, 4 pages.
PLNAR—The AR 3D Measuring / Modeling Platform, retrieved on Mar. 27, 2019, from https://www.plnar.co, 6 pages.
YouVR Global, retrieved on Mar. 27, 2019, from https://global.youvr.io/, 9 pages.
GeoCV, retrieved on Mar. 28, 2019, from https://geocv.com/, 4 pages.
Biersdorfer, J.D., "How To Make A 3-D Model Of Your Home Renovation Vision," in The New York Times, Feb. 13, 2019, retrieved Mar. 28, 2019, 6 pages.
Chen et al. "Rise of the indoor crowd: Reconstruction of building interior view via mobile crowdsourcing." In: Proceedings of the 13th ACM Conference on Embedded Networked Sensor Systems. Nov. 4, 2015, 13 pages.
Immersive 3D for the Real World, retrieved from https://matterport.com/, on Mar. 27, 2017, 5 pages.
Learn About Our Complete 3D System, retrieved from https://matterport.com/how-it-works/, on Mar. 27, 2017, 6 pages.
Surefield FAQ, retrieved from https://surefield.com/faq, on Mar. 27, 2017, 1 page.
Why Surefield, retrieved from https://surefield.com/why-surefield, on Mar. 27, 2017, 7 pages.
Schneider, V., "Create immersive photo experiences with Google Photo Sphere," retrieved from http://geojournalism.org/2015/02/create-immersive-photo-experiences-with-google-photo-sphere/, on Mar. 27, 2017, 7 pages.
Tango (platform), Wikipedia, retrieved from https://en.wikipedia.org/wiki/Tango_(platform), on Jun. 12, 2018, 5 pages.
Zou et al. "LayoutNet: Reconstructing the 3D Room Layout from a Single RGB Image" in arXiv:1803.08999, submitted Mar. 23, 2018, 9 pages.
Lee et al. "RoomNet: End-to-End Room Layout Estimation" in arXiv:1703.00241v2, submitted Aug. 7, 2017, 10 pages.
Time-of-flight camera, Wikipedia, retrieved from https://en.wikipedia.org/wiki/Time-of-flight_camera, on Aug. 30, 2018, 8 pages.
Magicplan—Android Apps on Go . . . , retrieved from https://play.google.com/store/apps/details?id=com.sensopia.magicplan, on Feb. 21, 2018, 5 pages.
Pintore et al., "AtlantaNet: Inferring the 3D Indoor Layout from a Single 360 Image beyond the Manhattan World Assumption", ECCV 2020, 16 pages.
Cowles, Jeremy, "Differentiable Rendering", Aug. 19, 2018, accessed Dec. 7, 2020 at https://towardsdatascience.com/differentiable-rendering-d00a4b0f14be, 3 pages.
Yang et al., "DuLa-Net: A Dual-Projection Network for Estimating Room Layouts from a Single RGB Panorama", in arXiv:1811.11977[cs.v2], submitted Apr. 2, 2019, 14 pages.
Sun et al., "HoHoNet: 360 Indoor Holistic Understanding with Latent Horizontal Features", in arXiv:2011.11498[cs.v2], submitted Nov. 24, 2020, 15 pages.

(56) References Cited

OTHER PUBLICATIONS

Nguyen-Phuoc et al., "RenderNet: A deep convolutional network for differentiable rendering from 3D shapes", in arXiv:1806.06575[cs.v3], submitted Apr. 1, 2019, 17 pages.

Convolutional neural network, Wikipedia, retrieved from https://en.wikipedia.org/wiki/Convolutional_neural_network, on Dec. 7, 2020, 25 pages.

Hamilton et al., "Inductive Representation Learning on Large Graphs", in 31st Conference on Neural Information Processing Systems (NIPS 2017), 2017, 19 pages.

Kipf et al., "Variational Graph Auto-Encoders", in arXiv:1611.07308v1 [stat.ML], submitted Nov. 21, 2016, 3 pages.

Cao et al., "MolGAN: An Implicit Generative Model For Small Molecular Graphs", in arXiv:1805.11973v1 [stat.ML], submitted May 30, 2018, 11 pages.

Chen et al., "Intelligent Home 3D: Automatic 3D-House Design from Linguistic Descriptions Only", in arXiv:2003.00397v1 [cs.CV], submitted Mar. 1, 2020, 14 pages.

Cucurull et al., "Context-Aware Visual Compatibility Prediction", in arXiv:1902.03646v2 [cs.CV], submitted Feb. 12, 2019, 10 pages.

Fan et al., "Labeled Graph Generative Adversarial Networks", in arXiv:1906.03220v1 [cs.LG], submitted Jun. 7, 2019, 14 pages.

Gong et al., "Exploiting Edge Features in Graph Neural Networks", in arXiv: 1809.02709v2 [cs.LG], submitted Jan. 28, 2019, 10 pages.

Genghis Goodman, "A Machine Learning Approach to Artificial Floorplan Generation", University of Kentucky Theses and Dissertations—Computer Science, 2019, accessible at https://uknowledge.uky.edu/cs_etds/89, 40 pages.

Grover et al., "node2vec: Scalable Feature Learning for Networks", in arXiv:1607.00653v1 [cs.SI], submitted Jul. 3, 2016, 10 pages.

Nauata et al., "House-GAN: Relational Generative Adversarial Networks for Graph-constrained House Layout Generation", in arXiv:2003.06988v1 [cs.CV], submitted Mar. 16, 2020, 17 pages.

Kang et al., "A Review of Techniques for 3D Reconstruction of Indoor Environments", in ISPRS International Journal Of Geo-Information 2020, May 19, 2020, 31 pages.

Kipf et al., "Semi-Supervised Classification With Graph Convolutional Networks", in arXiv:1609.02907v4 [cs.LG], submitted Feb. 22, 2017, 14 pages.

Li et al., "Graph Matching Networks for Learning the Similarity of Graph Structured Objects", in Proceedings of the 36th International Conference on Machine Learning (PMLR 97), 2019, 18 pages.

Liu et al., "Hyperbolic Graph Neural Networks", in 33rd Conference on Neural Information Processing Systems (NeurIPS 2019), 2019, 12 pages.

Merrell et al., "Computer-Generated Residential Building Layouts", in ACM Transactions on Graphics, Dec. 2010, 13 pages.

Alletto et al., "An Indoor Location-Aware System For An IoT-Based Smart Museum", IEEE Internet Of Things Journal 3(2), Apr. 1, 2016, 11 pages.

Jeff Butts, "Check Out Schlage's Upcoming Home Key Smart Lock", Dec. 20, 2021, retrieved from https://www.macobserver.com/news/product-news/check-out-schlages-upcoming-home-key-smart-lock/ on Nov. 7, 2022, 4 pages.

Estimote UWB Beacons, retrieved from https://estimote.com/uwb-beacons on Nov. 7, 2022, 15 pages.

Huang et al., "A Hybrid Method to Improve the BLE-Based Indoor Positioning in a Dense Bluetooth Environment", Sensors 2019 19(2), 424, 15 pages.

Geetha Kakarlapudi, "Analysis Of Beacon Triangulation In Random Graphs", Feb. 17, 2005, Texas A&M University, retrieved from https://oaktrust.library.tamu.edu/bitstream/handle/1969.1/1447/etd-tamu-2004C-CPSC-Kakarla.pdf?sequence=1&isAllowed=y on Nov. 7, 2022, 64 pages.

Kampmann et al., "Infrared Beacons For Robust Localization", arXiv:2104.09335v1, Apr. 19, 2021, retrieved from https://deepai.org/publication/infrared-beacons-for-robust-localization on Nov. 7, 2022, 9 pages.

Ultra-Wideband Indoor Positioning System, retrieved from https://marvelmind.com/download/uwb/ on Nov. 7, 2022, 8 pages.

Minea et al., "Developing a Solution for Mobility and Distribution Analysis Based on Bluetooth and Artificial Intelligence", Sensors 2020, 20, 7327, retrieved from https://doi.org/10.3390/s20247327 on Nov. 7, 2022, 27 pages.

Morgado et al., "Beacons Positioning Detection, A Novel Approach", 10th International Conference on Ambient Systems, Networks and Technologies (ANT), Apr. 29-May 2, 2019, 8 pages.

Shchekotov et al., "Semi-Automatic Self-Calibrating Indoor Localization Technique", 2018 23rd Conference of Open Innovations Association (FRUCT), Nov. 2018, 8 pages.

Shchekotov et al., "The Ontology Driven SLAM Based Indoor Localization Using BLE Beacon Multilateration", 2021 Journal Of Physics Conference Series 1801(1):012007, Feb. 2021, 13 pages.

Spachos et al., "BLE Beacons for Indoor Positioning at an Interactive IoT-Based Smart Museum", arXiv:2001.07686v1, Jan. 21, 2020, retrieved from http://arxiv.org/pdf/2001.07686v1 on Nov. 7, 2022, 11 pages.

UWB—The First Choice For RTLS And Smart Homes, retrieved from https://www.rfid-wiot-search.com/uwb-the-first-choice-for-rtls-and-smart-homes on Nov. 7, 2022, 13 pages.

Wikipedia—Bluetooth Low Energy Beacon, retrieved from https://en.wikipedia.org/wiki/Bluetooth_Low_Energy_beacon on Nov. 7, 2022, 8 pages.

Wikipedia—Indoor Positioning System, retrieved from https://en.wikipedia.org/wiki/indoor_positioning_system on Nov. 7, 2022, 15 pages.

Wikipedia—Types Of Beacons, retrieved from https://en.wikipedia.org/wiki/Types_of_beacons on Nov. 7, 2022, 4 pages.

Wikipedia—Ultra-wideband, retrieved from https://en.wikipedia.org/wiki/Ultra-wideband on Nov. 7, 2022, 10 pages.

Ye et al., "Application of Ibeacon in Indoor Positioning and Navigation", 2020 Journal Of Physics Conference Series 1575:012056, Jul. 2020, 8 pages.

Ishihara et al., "Deep Learning And Geometry-Based Image Localization Enhanced By Bluetooth Signals", 2018 Information Processing 26:707, Jan. 2018, 11 pages.

Monika Adarsh, "How The Real Estate Industry Is Using Beacons", Mar. 25, 2018, retrieved from https://blog.peaconstac.com/2017/10/real-estate-industry-using-beacons/ on Nov. 4, 2022, 7 pages.

Pavithra Babu, "How Beacons Are Transforming The Travel Industry", May 15, 2018, retrieved from https://blog.peaconstac.com/2015/11/how-beacons-are-transforming-the-travel-industry/ on Nov. 4, 2022, 6 pages.

"Revolutionizing Real Estate Marketing With Beacons", BLE Mobile Apps, Dec. 18, 2017, retrieved from https://www.blemobileapps.com/blog/revolutionizing-real-estate-marketing-beacons/ on Nov. 4, 2022, 4 pages.

Doljenkova et al., "Beacons: Exploring Location-Based Technology In Museums", Mar. 30, 2015, retrieved from http://www.metmuseum.org/blogs/digital-underground/2015/beacons on Nov. 4, 2022, 17 pages.

Neha Mallik, "How Museums Can Use Beacons To Enhance Visitor Experiences", Feb. 4, 2022, retrieved from https://blog.beaconstac.com/2014/06/how-museums-can-use-beacons-to-enhance-visitor/ on Nov. 4, 2022, 8 pages.

"How iBeacons Real Estate Are Revamping The Real Estate Industry", Jan. 12, 2022, retrieved from https://www.mokoblue.com/ibeacons-real-estate-industry/ on Nov. 4, 2022, 6 pages.

OConnell et al., Building The Physical Web: A Campus Tour Using Bluetooth Low Energy Beacons, Information Systems Education Journal (ISEDJ) 17(5), Oct. 2019, 10 pages (22-31).

* cited by examiner

House 198 Overview Description

This is a beautiful 2-story craftsmen home, with a recently updated kitchen and territorial views. It is near ...

House 198 Attributes

Overview
Detached construction, built in 1982; Total interior livable area: 1,456 sq. ft.; Forced air, natural gas; ...

...

Further Details - Interior
Bedrooms: 4; Bathrooms: 2; Full bathrooms: 2
Primary Bedroom: Area 400 sq. ft., Dimensions 20 x 20
Bedroom 1 ...
Flooring: Laminate (kitchen and bathrooms); Carpet (other)
Appliances included: Disposal, Microwave, Refrigerator, Electric Stove

...

Further Details - Property
Parking spaces: 3; Garage spaces: 2
Stories: 2
Exterior features: Deck

...

Kitchen countertops: marble
Living room walls: paint, gray
Living room ceiling style: vaulted
Accessibility (wheelchair): good ($1^{st}$ story)
Open floor plan: yes
Modern style: 6 of 10 (10 being most)

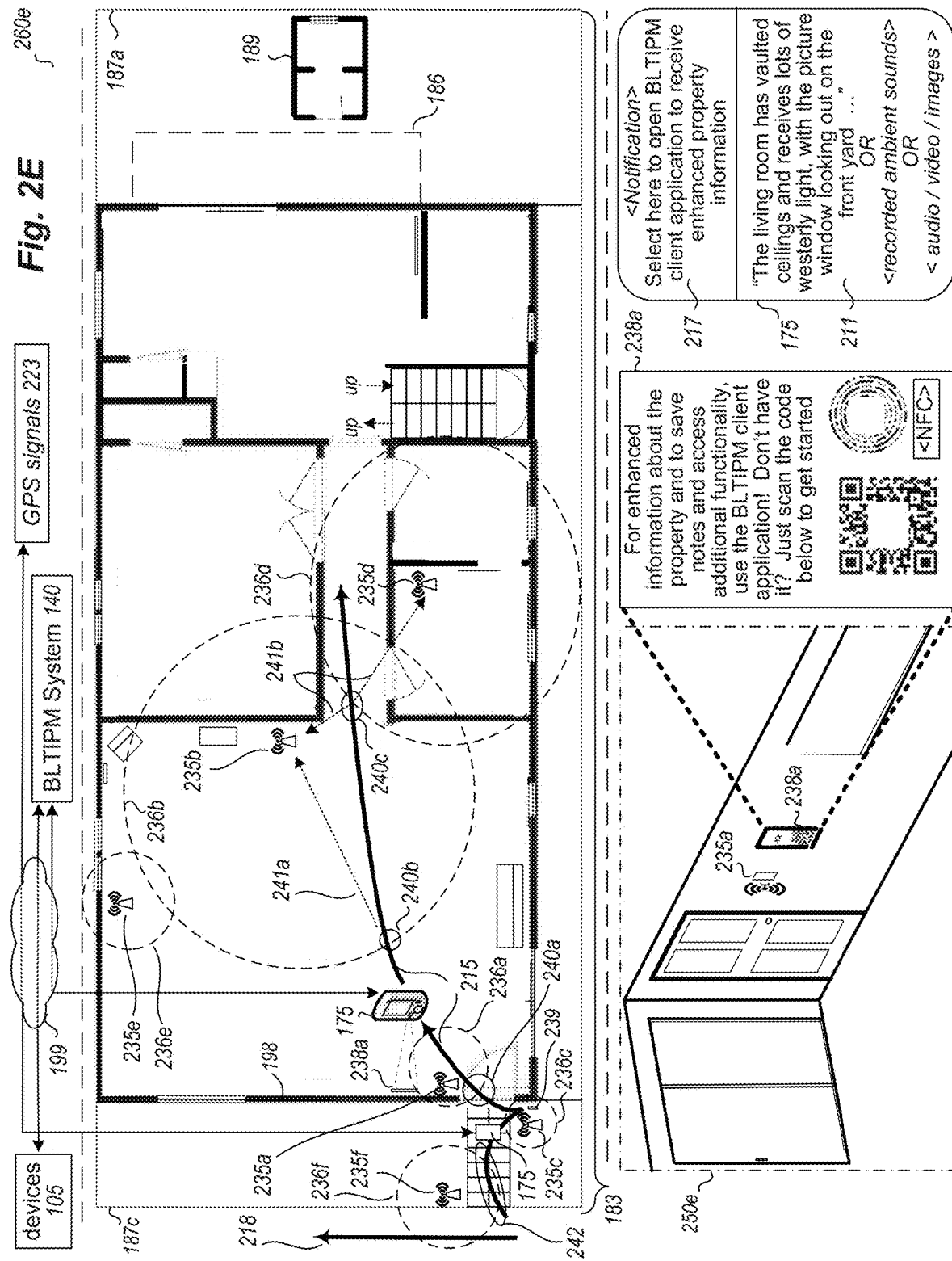

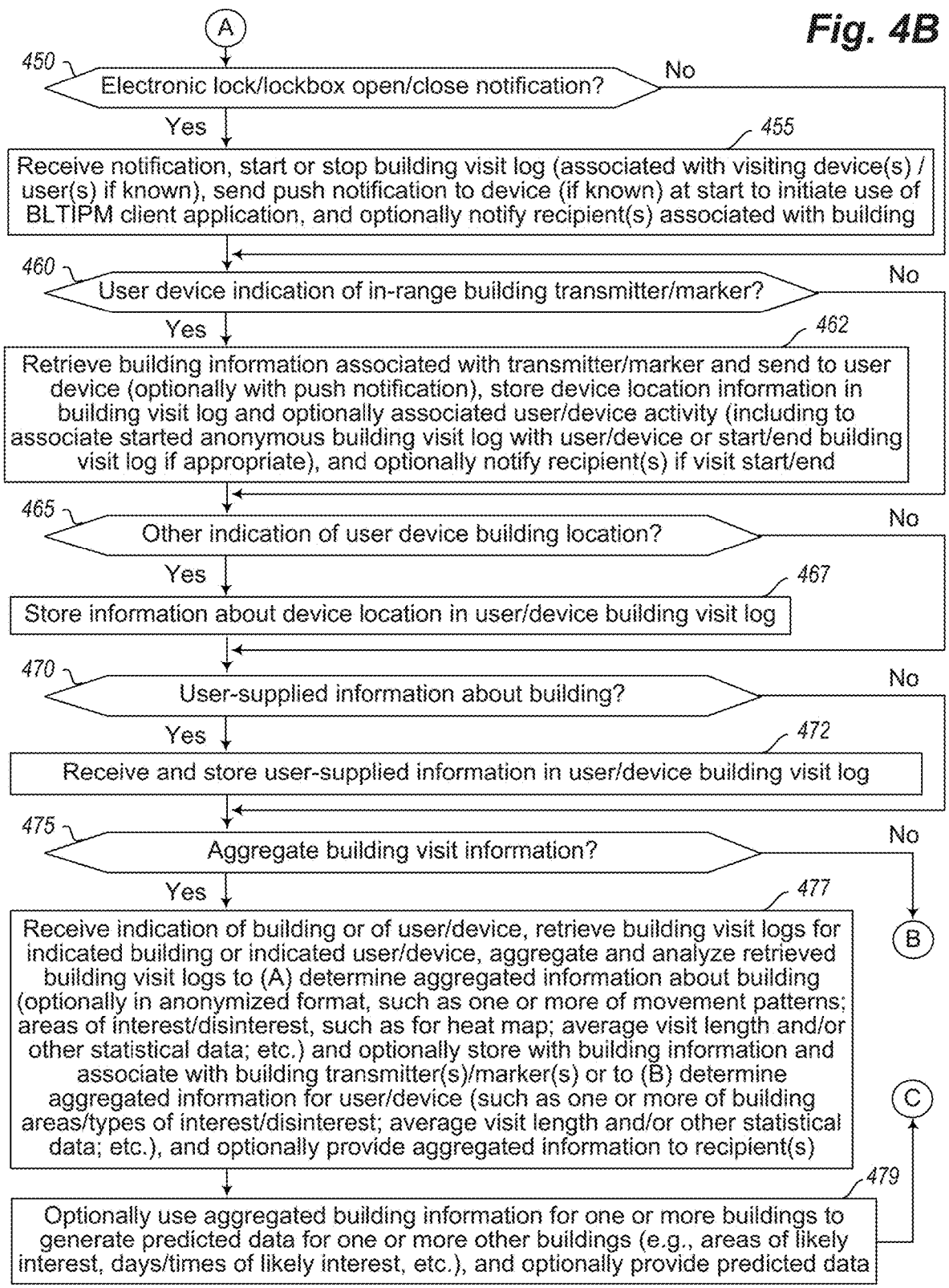

AUTOMATED TRACKING OF IN-BUILDING DEVICE LOCATION AND PROVISION OF ASSOCIATED LOCATION-RELATED FUNCTIONALITY

TECHNICAL FIELD

The following disclosure relates generally to techniques for automatically tracking locations of mobile devices in buildings and for providing associated location-related functionality, such as to provide improved navigation of buildings and to provide other benefits from aggregated device location tracking data.

BACKGROUND

In various circumstances, such as architectural analysis, property inspection, real estate acquisition and development, general contracting, improvement cost estimation, etc., it may be desirable to know the interior of a house or other building without physically traveling to and entering the building. However, it can be difficult to effectively capture, represent and use such building interior information, including to identify buildings that satisfy one or more defined criteria of interest, and to display visual information captured within building interiors to users at remote locations (e.g., to enable a user to understand the layout and other details of the interior, including to control the display in user-selected manners). Moreover, even if a user is present at a building, it can be difficult to effectively navigate the building and determine information about the building that is not readily apparent. In addition, existing types of building information can be difficult to use, such as textual descriptions of buildings that are often inaccurate and/or incomplete (e.g., lack details about various attributes of the buildings, include incorrect or misleading information, etc.), and a floor plan of a building that can be difficult to construct and maintain, to accurately scale and populate with information about room interiors, to visualize and otherwise use, etc.

BRIEF DESCRIPTION OF THE DRAWINGS

FIG. 1B illustrates an example of a type of descriptive building information.

FIGS. 2E-2J illustrate examples of automatically using building descriptive information for providing location-related functionality to improve navigation and provide other functionality.

FIGS. 4A-4B illustrate an example embodiment of a flow diagram for a Building Location Tracking and Information Presentation Manager (BLTIPM) system routine in accordance with an embodiment of the present disclosure.

DETAILED DESCRIPTION

Figure 1A:
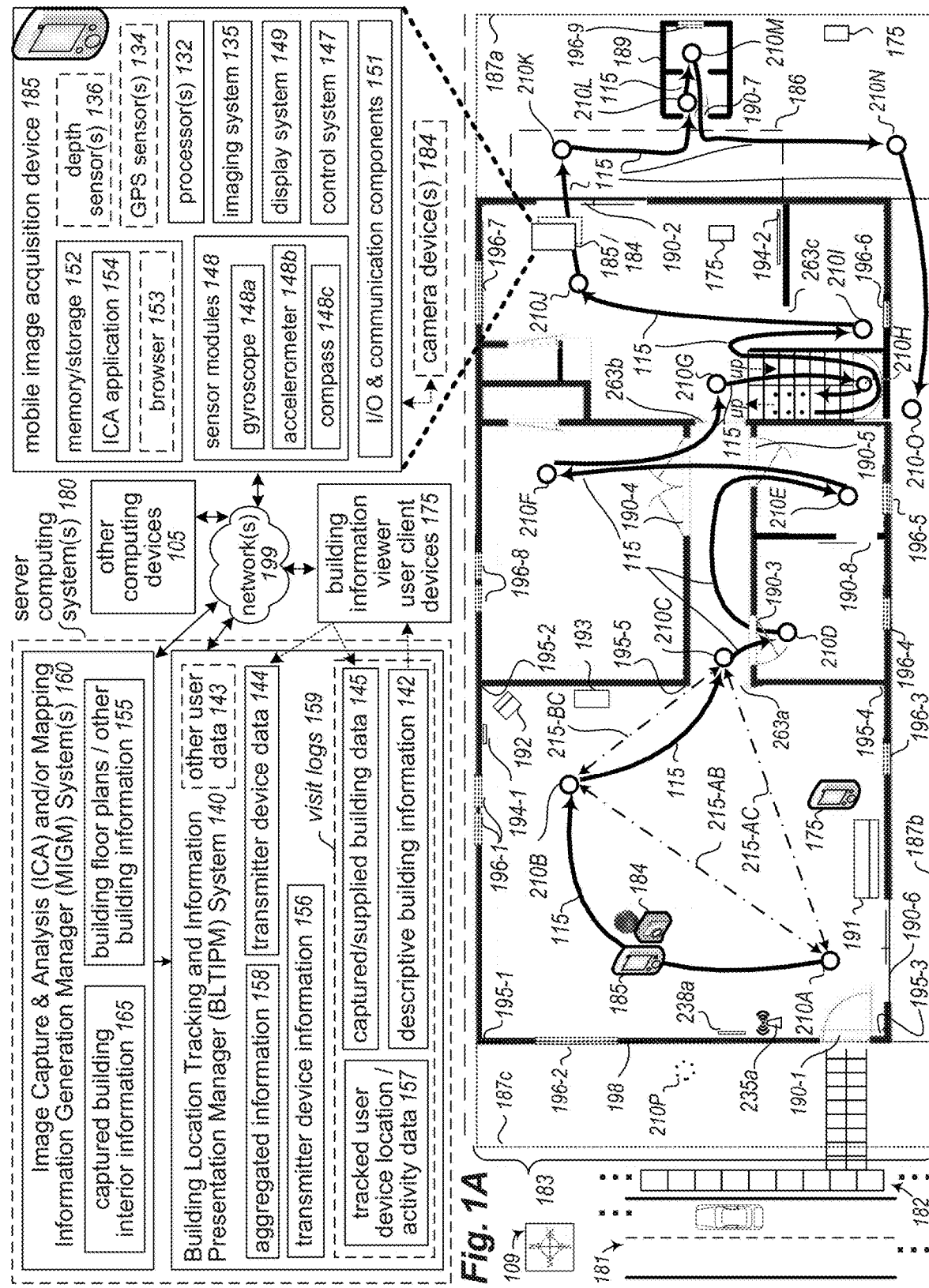
FIG. 1A includes diagrams depicting an exemplary building interior environment and computing systems and devices for use in embodiments of the present disclosure, including to capture information representing a building, and to use the building information for providing location-related functionality.

The present disclosure describes techniques for using computing devices to perform automated operations that include providing location-related functionality involving devices moving through buildings, such as to automatically track locations of mobile devices during temporary visits to a building, to automatically use building information to provide location-related navigation functionality and/or other information to those mobile devices, and to automatically determine and use aggregated information about tracked locations and activities of multiple mobile devices in a building to provide further functionality. In at least some embodiments and situations, the automated operations include configuring and using multiple wireless transmitter devices in multiple locations in a building that each transmits unique data to prompt mobile devices that receive such transmitted data to interact with remote computing devices to report their interactions with particular wireless transmitter devices and to receive building information associated with those wireless transmitter devices and their building locations, including to enable the determination of a sequence of locations of a mobile device as it moves through at least some of the building in an unscripted freeform manner (e.g., as determined by a user of the mobile device who carries or otherwise moves the mobile device)—in addition, in at least some embodiments, such wireless transmitter devices may be dynamically updated during their use in a building (e.g., based on changes to a wireless transmitter device's location and/or to building information associated with the wireless transmitter device's location) and/or due to movement between buildings, and the automated operations may further include directing the placement of wireless transmitter devices in determined locations within a building in various manners. Information about a particular mobile device's visit to a particular building may be further stored, analyzed and used in various manners in various embodiments, including to track mobile device locations and/or activities during a visit, to provide notifications of the beginning and/or end of the visit (e.g., in a real-time or near-real-time manner, such as to provide a notification within milliseconds or seconds or minutes of a corresponding event), to aggregate the visit information with information about other visits to that particular building by other mobile devices and/or other visits by that mobile device to other buildings, to further use aggregated visit information in various manners, etc. Additional details are included below regarding automated tracking of locations of mobile devices in buildings and providing of associated location-related functionality, and some or all techniques described herein may, in at least some embodiments, be performed via automated operations of a Building Location Tracking and Information Presentation Manager ("BLTIPM") system, as discussed further below.

As noted above, the automated operations of the BLTIPM system may include using wireless transmitter devices (also referred to herein as "transmitter devices" or "transmitters") located in and around buildings to assist in tracking locations of mobile devices in those buildings and providing of associated location-related functionality. Such transmitter devices may each be configured to transmit a unique identifier and optionally additional data within a range of the transmitter device, and may be of one or more types, such as beacon devices using Bluetooth or Bluetooth variants (e.g., Bluetooth Low Energy, or "BLE") or ultra-wideband ("UWB") radio transmission capabilities (e.g., having a transmission range of numerous meters or feet), near-field communications (NFC) devices (e.g., having a range of centimeters or inches), Wi-Fi devices, RFID devices, infrared (IR) devices, etc.—such beacon devices or other transmitter devices may further include devices that provide such transmissions in addition to other functionality (e.g., smart locks, electronic lockboxes, televisions, medical devices, smart home devices, etc.). A mobile device that receives the identifier transmitted by a transmitter device at a building may, for example, be configured to provide the identifier to a particular client application or other software program installed and executing on the mobile device (also referred to herein as a "user device"), and the client application or other software program (referred to herein generally as a "client application") may then send the received identifier to one or more other designated computing devices (e.g., one or more server devices, such as that implement the BLTIPM system) to obtain information and/or functionality associated with that transmitter device. Such transmitter devices may be installed or otherwise placed in and around a building (e.g., temporarily, such as for hours, days, weeks or months) and used by the BLTIPM system in various manners in various embodiments, with non-exclusive examples including the following: multiple transmitter devices installed or otherwise placed in multiple locations within a building, such as one or more transmitter devices in each of some or all rooms of the building, and each used to provide a subset of information about the building and its surroundings that is associated with the location of that transmitter device; a transmitter device installed or otherwise placed near an entrance to the building, such as to provide overview information about the building at the beginning of a visit of a user device to the building and optionally used to track when the visit starts and/or ends; a transmitter device installed or otherwise placed outside an entrance to the building, such as on or near an electronic lock or lockbox (e.g., containing a key to the building) and used to provide authentication information to enable access to the building if the user device and/or an associated user is authorized to receive such access (e.g., an access code for the user to enter in the electronic lock or lockbox to open it, an access code or other information for the user device to electronically transmit to the electronic lock or lockbox to open it, etc.); a transmitter device installed or otherwise placed near an edge of a property on which the building is situated, such as near an adjacent sidewalk and/or street, and used to provide overview information about the building to user devices of passing users and/or to prompt such user devices or associated users to schedule or otherwise initiate a visit to the building; one or more transmitter devices installed or otherwise placed in one or more external locations outside the building and on the building's property, such as in each of one or more external areas and/or outbuildings, and each used to provide information about the building and its property and associated with the location of that transmitter device; etc. In addition, visual markers of one or more types (e.g., QR codes, app clip codes, other machine-readable data, etc., and optionally having an associated transmitter device co-located with the visual marker) may be used in a manner similar to that of transmitter devices, whether in addition to or instead of such transmitter devices, such as with each such visual marker being placed at a known location in the building and having an associated group of building information, such that scanning or other use of the visual marker by a user device indicates a location of the user device at or near the visual marker and prompts the corresponding user device to send data from the visual marker to the BLTIPM system and to receive the associated building information in return—visual markers may be further used in additional manners in some embodiments and situations, as is discussed further below. It will be appreciated that transmitter devices and visual markers may be used in additional manners in some embodiments and situations, and additional details about transmitter devices and their uses are included below.

As noted above, automated operations of the BLTIPM system may also include obtaining and using information about a building in various manners, including to associate overview information about the building with a transmitter device at the building (e.g., near an entrance to the building and/or near an edge of the building's property), to associate groups of building information associated with locations in or around the building with transmitter devices near or at those locations; etc. Such building information may, in at least some embodiments, be for an as-built multi-room building (e.g., a house, office building, apartment building, etc.) and include one or more of the following: textual descriptions of the building and/or of particular attributes of the building and its rooms and other areas; data captured in or around the building at corresponding acquisition locations, such as audio data (e.g., recordings of environmental sounds, such as ambient noises; recordings of spoken descriptions of the building and/or of particular attributes of the building and its rooms and other areas; etc.), visual data in captured images (e.g., panorama images, such as with 360° of horizontal video coverage; other images, such as rectilinear perspective images; etc.) and/or in captured video (optionally along with audio data in the video), other types of captured data readings (e.g., one or more gases and/or one or more types of radiation or other energy and/or one or more types of wireless signals), etc.; user-supplied information from a visit to the building with an associated user device; aggregated data from multiple visits to the building by multiple user devices; etc. In at least some embodiments, some or all such building information may be captured without having or using information from any depth sensors or other distance-measuring devices about distances from a data acquisition location to walls or other objects in the surrounding building, and location determination activities for user devices at the building may similarly be performed without using such depth information, while in other embodiments a combination of types of information may be used to determine a user device's location, as discussed further below. In some cases, the automated operations may further include using the building information in various manners, such as for controlling navigation of mobile devices (e.g., autonomous vehicles) in a building, assisting navigation of a building by a user via display or other presentation on his/her mobile device(s) in a corresponding GUI (graphical user interface), etc. Additional details about types and uses of building information are included below.

As noted above, a client application may be used on a user device in at least some embodiments and situations as part of the automated operations, such as a client application of the BLTIPM system. Such a client application may be installed on a user device in various manners in various embodiments and situations, such as before a user device visits a building for which the BLTIPM system provides location-related functionality, or upon a first visit of a user device to such a building. As one non-exclusive example, information may be posted or otherwise displayed at a building (e.g., near an entrance to the building) that may be used to prompt the installation and execution of the client application, such as a visual marker with data that causes the user device to initiate a download of the client application (e.g., by interacting with the BLTIPM system or other download site), by using a wireless transmitter that sends a notification message (e.g., a push notification or local notification) to the user device to prompt the installation of the client application when selected (e.g., by interacting with the BLTIPM system or other download site), etc. Once such a client application is installed on the user device, it may be further configured to receive information about transmissions received by the user device from transmitter devices, such as identifiers for such transmitter devices and optionally other data, and to interact with the BLTIPM system (e.g., with one or more computing devices on which the BLTIPM system is executing) using such identifiers (e.g., to provide the identifier and receive corresponding response information, such as an associated group of building information). Once a client application is installed on a user device, the BLTIPM system may further use the client application in various manners, such as to send a notification message to a user device upon a beginning of a visit and/or during a visit to prompt accessing the client application to receive additional location-related functionality. In addition, such a client application on a user device may be used to assist in tracking a visit of the user device to each of one or more buildings and storing associated information (whether on the user device and/or at the BLTIPM system, such as in an account of the BLTIPM system associated with the user device and/or associated user), such as to create a visit log or other record of each visit and to include information in such a visit log about one or more of the following non-exclusive types of data: a start and/or end of the visit, such as one or more corresponding times (e.g., date and time-of-day); a location of the building and/or other identification of the building; copies of building information that is sent to the client application during the visit; information about locations of the user device during the visit, such as a path or route followed by the user device through some or all of the building; user-supplied information from the visit, such as notes, data captured by the user via the user device in or around the building, etc.; information about other activities of the user device and/or associated user during the visit, such as interacting with particular provided building information and/or requesting particular building information or related functionality; etc. Additional details related to the use of a client application are included below.

The automated operations of the BLTIPM system may further include determining and tracking the location of a user device during a visit to a building based at least in part on transmitter devices at or around the building. For example, an interaction by a user device with a single transmitter device (e.g., receiving data transmitted by the transmitter device) having a known location may provide at least approximate information about a corresponding location of the user device (e.g., an area in which the location is situated), such as based on a known range of the transmitter device's transmissions and/or range data provided by the transmitter device or otherwise determined by the user device (e.g., based on received signal strength of the transmissions, such as relative to the signal strength leaving the transmitter device)—in addition, if an approach to the transmitter device is available along only a single path (e.g., a first interaction of a user device with a transmitter device that is positioned near an entrance to the building, such that the user device must enter through the front door), the location may be determined more specifically to a small area along the path corresponding to the range of the transmitter device. Furthermore, some user devices (or other receiver devices) may further determine information about a direction or orientation between the user device and the transmitter device in addition to a range of the user device to the transmitter device (e.g., using angle-of-arrival data for multiple antennas and/or by using other specialized hardware)—if so, the location of the user device interacting with that single transmitter device having a known location may be determined with a high degree of accuracy using both the range and direction information. In other embodiments in which direction information is not available, a location of the user device may be determined with a high degree of accuracy based on concurrent or simultaneous interactions with multiple transmitter devices having known locations, such as by geometric triangulation or other means. Thus, using only multiple transmitter devices with known locations at or around the building, a detailed sequence of locations of a user device during a visit to the building may be determined, including to determine rooms or other areas or locations through which the user device passes, amounts of time spent in particular rooms or other areas or locations, particular times (e.g., date and time of day) at which particular rooms or other areas or locations of the building are visited, etc.—in addition, such locations may be determined in a relative frame of reference in some embodiments or situations (e.g., relative to a fixed position, such as an entrance, a particular external corner of the building; as locations on a floor plan or otherwise within rooms or other areas; etc.), while in other embodiments the locations may be determined as absolute locations (e.g., latitude and longitude coordinates). Furthermore, in some embodiments and situations, location-related information from interactions with transmitter devices may be further supplemented or augmented with other types of location-related information available to a user device, such as by doing further processing on the user device to determine a location within a room or other area of the building (e.g., using visual data and/or additional sensor data such as from one or more Inertial Measurement Units, or "MUs", including by performing one or more of visual odometry, SLAM, SfM, etc.), by using GPS signals, etc. Additional details about determining the location of a user device in or around a building are included below.

In addition, the automated operations of the BLTIPM system may further include aggregating information from multiple building visits and using that aggregated information in various manners. For example, location-related information and other information about activities from multiple visits to a building by multiple user devices may be combined and analyzed to determine various additional types of information about the building, such as one or more of the following non-exclusive examples: particular rooms or other areas of aggregate interest or disinterest (e.g., based at least in part on a quantity of visits including locations in those areas and/or an amount of time spent at locations in those areas that are above or below one or more defined thresholds or otherwise satisfy one or more defined criteria); particular groups of building information that are provided to user devices and optionally further interacted with by a user of the user device, such as to enable identification of one or more rooms or other areas or locations of the building that include one or more transmitter devices being underused due to a lack of visit interactions (e.g., available to be repurposed into one or more other rooms or areas or locations of the building, to initiate changes at the building and/or in provided building information to direct user devices to those one or more rooms or other areas, etc.); amounts of time spent during visits to the building; particular times (e.g., days and times of day) at which visits to the building occur; information about types of user devices and/or associated users who participate in visits to the building; etc. Such aggregated information may be further used in various manners, with non-exclusive examples including the following: to generate and present or otherwise provide visual representations of aggregated information, such as heat maps, movement patterns, etc.; to predict how visits to other buildings (e.g., similar or dissimilar buildings) may occur, such as with similar rooms or other areas or locations of the other buildings being predicted to be of interest and/or disinterest, with predicted times and/or quantities of visits to the other buildings, predicted types of user devices and/or associated users that will visit the other buildings, etc.; to identify transmitter devices that are underused and/or overused, such as to initiate moving underused transmitter devices to other locations (e.g., to additional areas that are not currently covered, to initiate separating an existing area with an overused transmitter device into two or more subareas to provide further differentiation, etc.); to generate additional information about the building from the aggregated information (e.g., to identify rooms or other areas or locations of aggregate interest during prior visits, to identify particular building attributes of aggregate interest during prior visits, etc.), such as for use in updating building information associated with one or more transmitter devices in the building to include or otherwise reflect such additional information; etc. In a similar manner, location-related information and other information about activities from multiple visits of a particular user device to multiple buildings may be aggregated and analyzed to determine various types of information about the user device and/or its associated user, such as one or more of the following non-exclusive examples of types of information: information about types of buildings visited; particular types of rooms or other areas of interest or disinterest; particular times at which visits occur; etc., and that aggregated information for such a user device and/or associated user may be further used in various manners, such as to generate and present or otherwise provide visual representations of aggregated information, to predict other buildings of likely interest, etc. Additional details about determining and using aggregate information are included below.

The automated operations of the BLTIPM system may further include determining locations of particular transmitter devices in and around buildings in various manners, including in some embodiments and situations for the BLTIPM system to automatically determine and direct the placement of transmitter devices at particular locations. In some embodiments and situations, at least some of the transmitter devices may be manually placed at particular building locations, and the location of those transmitter devices may be provided by the person doing the placement and/or may be automatically determined (e.g., using an additional location determination device at the same location, based on self-localization activities using transmissions between multiple transmitter devices at the building, etc.). In other embodiments and situations, the BLTIPM system may automatically determine locations at which some or all transmitter devices are to be placed at or around the building and further direct the placement of the transmitter devices at those locations, such as using aggregated information of transmitter device locations and/or movement patterns in other similar buildings to identify such locations, by grouping available building information into corresponding rooms or other areas or locations and determining to position a transmitter device at some or all such locations in order to provide that building information to user devices, etc. To direct the placement of particular transmitter devices, the BLTIPM system may, for example, provide corresponding instructions to one or more users at the building, provide corresponding instructions to direct autonomous movement operations of other mobile devices and/or of the transmitter devices to cause the transmitter device placement, etc. In addition, initial locations of some or all transmitter devices in a building may be updated during use (e.g., dynamically during visits of user devices to the building and/or otherwise during a period of time at which such visits may occur), such as to reposition transmitter devices using information from aggregated information about previous visits to the building, to reflect one or more users manually repositioning one or more such transmitter devices, based on additional building information becoming available for a room or other area or location at which a transmitter device was not previously positioned and to which a transmitter device is moved or added to provide such additional building information to user devices, etc. Additional details about determining and using location information for transmitter devices is included below.

In addition to updating locations of transmitter devices during use, other information associated with a transmitter device may be similarly updated (e.g., in a dynamic manner during use), whether in addition to or instead of changing a location of the transmitter device—for example, building information associated with a transmitter device may be updated or otherwise modified during use, such as to add or change information (e.g., based on additional information becoming available, such as from aggregated building information; based on additional data captured at the building, optionally by one or more user devices during their visits; etc.), to correct errors in the building information, etc. In addition, the BLTIPM system may further perform additional activities, including personalizing building information provided to a particular user device and/or associated user during a building visit (e.g., based at least in part on aggregated information from previous visits by that user device and/or user, based on other information provided by or otherwise determined by that user device and/or user, etc.), such as by including or otherwise emphasizing particular building rooms or other areas or locations or building attributes of types that have previously been of interest to the user device and/or user (e.g., directing the user device and/or user to particular locations), by excluding or otherwise deemphasizing similar types of information of previous disinterest to the user device and/or user, etc. Additional details about various other automated operations of the BLTIPM system are included below.

The described techniques provide various benefits in various embodiments, including to allow aggregated information about visits to multi-room buildings and other structures to be determined and used more efficiently and rapidly and in manners not previously available, including to automatically generate and use additional building-related information from such aggregated information. In addition, such automated techniques include providing navigation functionality and other related functionality for a building by using information acquired from the actual building environment (rather than from plans on how the building should theoretically be constructed) and by tracking locations and providing building information in particular manners, including by directing the placement of transmitter devices at particular determined locations, by dynamically updating information associated with transmitter devices in use (e.g., associated building locations due to movement of the transmitter devices, associated groups of building information that are provided to user devices, etc., including based on aggregated building information), etc. The described techniques further enable the capture of changes to structural elements and/or visual appearance elements that occur after a building is initially constructed, and further perform such automated operations using significantly reduced computing power and time relative to other attempts to learn a building's layout. In addition, in some embodiments the described techniques may be used to provide an improved GUI in which a user may more accurately and quickly identify obtain information about an indicated building (e.g., using a mobile device of the user in the building, and such as for use in navigating an interior of the building), including in response to search requests, as part of providing personalized information to the user, as part of providing value estimates and/or other information about a building to a user (e.g., after analysis of information about one or more target building floor plans that are similar to one or more initial floor plans or that otherwise match specified criteria), etc. Various other benefits are also provided by the described techniques, some of which are further described elsewhere herein.

As noted above, automated operations of a BLTIPM system may include using acquired building images and/or other building information, such as a floor plan, building attribute information, etc. In at least some embodiments, such an BLTIPM system may operate in conjunction with one or more separate ICA (Image Capture and Analysis) systems and/or with one or more separate MIGM (Mapping Information and Generation Manager) systems, such as to obtain and use images and floor plans and other associated information for buildings from the ICA and/or MIGM systems, while in other embodiments such an BLTIPM system may incorporate some or all functionality of such ICA and/or MIGM systems as part of the BLTIPM system. In yet other embodiments, the BLTIPM system may operate without using some or all functionality of the ICA and/or MIGM systems, such as if the BLTIPM system obtains building images, floor plans and/or other associated information from other sources (e.g., from manual creation or provision of such building images, floor plans and/or associated information by one or more users).

With respect to functionality of such an ICA system, it may perform automated operations in at least some embodiments to acquire images (e.g., panorama images) at various acquisition locations associated with a building (e.g., in the interior of multiple rooms of the building), and optionally further acquire metadata related to the image acquisition process (e.g., image pose information, such as using compass headings and/or GPS-based locations) and/or to movement of a capture device between acquisition locations—in at least some embodiments, such acquisition and subsequent use of acquired information may occur without having or using information from depth sensors or other distance-measuring devices about distances from images' acquisition locations to walls or other objects in a surrounding building or other structure. For example, in at least some such embodiments, such techniques may include using one or more mobile devices (e.g., a camera having one or more fisheye lenses or other lenses and mounted on a rotatable tripod or otherwise having an automated rotation mechanism; a camera having one or more fisheye lenses sufficient to capture 360° horizontally without rotation; a smartphone with one or more lenses that is held and moved by a user, such as to rotate the user's body and held smartphone in a 360° circle around a vertical axis; a camera held by or mounted on a user or the user's clothing; a camera mounted on an aerial and/or ground-based drone or other robotic device able to move under its own power; etc.) to capture visual data from a sequence of multiple acquisition locations within multiple rooms of a house (or other building); etc. Additional details are included elsewhere herein regarding operations of device(s) implementing an ICA system, such as to perform such automated operations, and in some cases to further interact with one or more ICA system operator user(s) in one or more manners to provide further functionality.

With respect to functionality of such an MIGM system, it may perform automated operations in at least some embodiments to analyze multiple 360° panorama images (and optionally other images) that have been acquired for a building interior (and optionally an exterior of the building), and generate a corresponding floor plan for the building, such as by determining room shapes and locations of passages connecting rooms for some or all of those panorama images, as well as by determining structural wall elements and optionally other objects in some or all rooms of the building in at least some embodiments and situations. The types of structural wall elements corresponding to connecting passages between two or more rooms may include one or more of doorway openings and other inter-room non-doorway wall openings, windows, stairways, non-room hallways, etc., and the automated analysis of the images may identify such elements based at least in part on identifying the outlines of the passages, identifying different content within the passages than outside them (e.g., different colors or shading), etc. The automated operations may further include using the determined information to generate a floor plan for the building and to optionally generate other mapping information for the building, such as by using the inter-room passage information and other information to determine relative positions of the associated room shapes to each other, and to optionally add distance scaling information and/or various other types of information to the generated floor plan. In addition, the MIGM system may in at least some embodiments perform further automated operations to determine and associate additional information with a building floor plan and/or specific rooms or locations within the floor plan, such as to analyze images and/or other environmental information (e.g., audio) captured within the building interior to determine particular objects and attributes (e.g., a color and/or material type and/or other characteristics of particular structural elements or other objects, such as a floor, wall, ceiling, countertop, furniture, fixture, appliance, cabinet, island, fireplace, etc.; the presence and/or absence of particular objects or other elements; etc.), or to otherwise determine relevant attributes (e.g., directions that building objects face, such as windows; views from particular windows or other locations; etc.). Additional details are included below regarding operations of computing device(s) implementing an MIGM system, such as to perform such automated operations and in some cases to further interact with one or more MIGM system operator user(s) in one or more manners to provide further functionality.

For illustrative purposes, some embodiments are described below in which specific types of information are acquired, used and/or presented in specific ways for specific types of structures and by using specific types of devices—however, it will be understood that the described techniques may be used in other manners in other embodiments, and that the invention is thus not limited to the exemplary details provided. As one non-exclusive example, while specific types of data structures (e.g., floor plans, virtual tours of inter-linked images, building descriptions, visit logs, aggregated building information, predicted building information, etc.) are generated and used in specific manners in some embodiments, it will be appreciated that other types of information to describe buildings may be similarly generated and used in other embodiments, including for buildings (or other structures or layouts) separate from houses, and that determined and generated information may be used in other manners in other embodiments. In addition, the term "building" refers herein to any partially or fully enclosed structure, typically but not necessarily encompassing one or more rooms that visually or otherwise divide the interior space of the structure—non-limiting examples of such buildings include houses, apartment buildings or individual apartments therein, condominiums, office buildings, commercial buildings or other wholesale and retail structures (e.g., shopping malls, department stores, warehouses, etc.), supplemental structures on a property with another main building (e.g., a detached garage or shed on a property with a house), etc. The term "acquire" or "capture" as used herein with reference to a building interior, acquisition location, or other location (unless context clearly indicates otherwise) may refer to any recording, storage, or logging of media, sensor data, and/or other information related to spatial characteristics and/or visual characteristics and/or otherwise perceivable characteristics of the building interior or subsets thereof, such as by a recording device or by another device that receives information from the recording device, including by one or more camera lenses and/or associated imaging systems (e.g., including one or more image sensors) that capture image data and other visual data. As used herein, the term "panorama image" may refer to a visual representation that is based on, includes or is separable into multiple discrete component images originating from a substantially similar physical location in different directions and that depicts a larger field of view than any of the discrete component images depict individually, including images with a sufficiently wide-angle view from a physical location to include angles beyond that perceivable from a person's gaze in a single direction. The term "sequence" of acquisition locations, as used herein, refers generally to two or more acquisition locations that are each visited at least once in a corresponding order, whether or not other non-acquisition locations are visited between them, and whether or not the visits to the acquisition locations occur during a single continuous period of time or at multiple different times, or by a single user and/or device or by multiple different users and/or devices. In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Further- more, identical reference numbers may be used in the drawings to identify the same or similar elements or acts.

FIG. 1A includes an example block diagram of various computing devices and systems that may participate in the described techniques in some embodiments, such as with respect to an illustrated example of part of a building 198 (in this example, house 198) on property 183, and by the Building Location Tracking and Information Presentation Manager ("BLTIPM") system 140 executing at least in part on one or more server computing systems 180 in this example embodiment—in the illustrated embodiment, a BLTIPM client application or other building information viewer system (not shown) may execute on each of one or more mobile user devices 175, and in other embodiments and situations, some or all of the BLTIPM system may similarly execute on some or all mobile user devices 175 (e.g., in a distributed manner).

In the illustrated embodiment, the BLTIPM system 140 obtains various types of descriptive building information 142 for each of one or more buildings, including in some cases to generate some or all such building information by analysis of other data about the building (e.g., visual data of images, such as images 165 acquired by the ICA system; floor plan data, such as for floor plans 155 generated by the MIGM system; etc.), and to optionally further use supporting information supplied by system operator users via computing devices 105 over intervening computer network(s) 199. Such ICA and/or MIGM systems 160 may in some embodiments execute on the same server computing system(s) 180 as the BLTIPM system (e.g., with all systems being operated by a single entity or otherwise being executed in coordination with each other, such as with some or all functionality of all the systems integrated together), and in some embodiments the ICA system 160 and/or MIGM system 160 may operate on one or more other systems separate from the system(s) 180 (e.g., on one or more mobile image acquisition devices 185 and/or mobile user devices 175 and/or other computing systems, not shown), whether instead of or in addition to the copies of those systems executing on the system(s) 180 (e.g., to have a copy of the MIGM system 160 executing on the device 185 to incrementally generate at least partial building floor plans as building images are acquired by the ICA system 160 executing on the device 185 and/or by that copy of the MIGM system, while another copy of the MIGM system optionally executes on one or more server computing systems to generate a final complete building floor plan after all images are acquired; etc.). In addition, building information may in some embodiments be obtained by the BLTIPM system in manners other than via ICA and/or MIGM systems (e.g., if such ICA and/or MIGM systems are not part of the BLTIPM system), such as to receive building images and/or floor plans from other sources, and/or the BLTIPM system may receive some or all of the descriptive building information 142 from one or more external sources (e.g., users of computing devices 105; other automated systems, not shown; etc.) rather than generate it.

The BLTIPM system 140 may further use the building information 142 as part of providing location-related functionality involving user devices 175 moving through buildings such as building 198. In particular, the BLTIPM system 140 may further store various transmitter device information 156 (e.g., transmitter identifiers, associated building locations, associated groups of the building information 142, etc.), and when a user device 175 at a building sends transmitter device data 144 to the BLTIPM system 140 from the building, send corresponding associated building information 142 to the user device, and track corresponding user device location and optionally activity data 157—in at least some embodiments, such sent building information 142 and/or tracked data 157 may be stored as part of a visit log 159 for that user device and/or associated user, optionally along with additional data 145 sent from that user device at the building (e.g., captured data, such as visual and/or audio data; user-supplied notes and other information; etc.). Other data 143 may also be optionally stored and used, including about user devices and/or associated users (e.g., as part of associated accounts at the BLTIPM system), such as preference-related data (e.g., for use in personalizing building information and/or functionality provided to the user device and/or associated user. The BLTIPM system 140 may further analyze multiple related visit logs (or corresponding data 157, 142 and/or 145) to determine aggregated information 158 (e.g., aggregated information about particular buildings, about activities of particular user devices and/or associated users, etc.), and use such aggregated information in various manners, including to predict various types of information about buildings and/or about user devices and/or associated users (e.g., as included with the aggregated information 158), to update the descriptive building information 142 (e.g., to include some or all of the aggregated information), to determine transmitter device locations for buildings in which transmitter devices are already present and/or in which transmitter devices are to be placed and to suggest or direct corresponding transmitter device placement, to update the transmitter device information (e.g., associated building information and/or associated locations), etc. Additional details related to the automated operations of the BLTIPM system are included elsewhere herein, including with respect to FIGS. 2E-2J and FIGS. 4A-4B.

In this example, an Interior Capture and Analysis ("ICA") system (e.g., an ICA system 160 executing on the one or more server computing systems 180, such as part of or associated with the BLTIPM system; an ICA system application 154 executing on a mobile image acquisition device 185; etc.) is also illustrated and captures information 165 with respect to one or more buildings or other structures (e.g., by capturing one or more 360° panorama images and/or other images for multiple acquisition locations 210 in example house 198), and a MIGM (Mapping Information Generation Manager) system 160 executing on the one or more server computing systems 180 (e.g., as part of or otherwise associated with the BLTIPM system) further uses that captured building information and optionally additional supporting information (e.g., supplied by system operator users via computing devices 105 over intervening computer network(s) 199) to generate and provide building floor plans 155 and/or other mapping-related information (not shown) for the building(s) or other structure(s). Additional details related to the automated operation of the ICA and MIGM systems are included elsewhere herein, including with respect to FIGS. 2A-2D and with respect to FIGS. 5 and 6A-6B, respectively.

Various components of the mobile image acquisition computing device 185 are also illustrated in FIG. 1A, including one or more hardware processors 132 (e.g., CPUs, GPUs, etc.) that execute software (e.g., ICA application 154, optional browser 153, etc.) using executable instructions stored and/or loaded on one or more memory/storage components 152 of the device 185, and optionally one or more imaging systems 135 of one or more types (e.g., including one or more cameras with one or more lenses and one or more image sensors) to acquire visual data of one or more panorama images 165 and/or other images (not shown, such as rectilinear perspective images)—some or all such images 165 may in some embodiments be supplied by one or more separate associated camera devices 184 (e.g., via a wired/cabled connection, via Bluetooth or other inter-device wireless communications, etc.), whether in addition to or instead of images captured by the mobile device 185. The illustrated embodiment of mobile device 185 further includes one or more sensor modules 148 that include a gyroscope 148$a$, accelerometer 148$b$ and compass 148$c$ in this example (e.g., as part of one or more IMUs, or inertial measurement units, on the mobile device, not shown separately), one or more control systems 147 managing I/O (input/output) and/or communications and/or networking for the device 185 (e.g., to receive instructions from and present information to the user) such as for other device I/O and communication components 151 (e.g., network interfaces or other connections, keyboards, mice or other pointing devices, microphones, speakers, GPS receivers, etc.), a display system 149 (e.g., including one or more displays, optionally with touch-sensitive screens), optionally one or more depth-sensing sensors or other distance-measuring components 136 of one or more types, optionally a GPS (or Global Positioning System) sensor 134 or other position determination sensor (not shown in this example), optionally other components (e.g., one or more lighting components), etc. Other devices/systems 105, 175 and 180 and/or camera devices 184 may each include various hardware components and stored information in a manner analogous to mobile device 185, which are not shown in this example for the sake of brevity, and as discussed in greater detail below with respect to FIG. 3.

One or more users (e.g., end-users, not shown) of one or more mobile client devices 175 may further interact over one or more computer networks 199 with the BLTIPM system 140 (and optionally the ICA system 160 and/or MIGM system 160), and/or with some or all of the BLTIPM system executing on that device 175 (not shown), such as to participate in capturing target images in or around a building using one or more cameras of the device 175 or otherwise providing user-supplied information, displaying received building data 142, etc. Such mobile devices 175 may each execute a BLTIPM client application or other building information viewer system (not shown) that is used to interact with the BLTIPM system to send transmitter data and to receive associated building information, to present such received building information and/or other received information on that mobile device (e.g., as part of a GUI displayed on that mobile device), and further optionally receive and respond to interactions by one or more users with the presented information (e.g., with displayed user-selectable controls, such as part of the generated visual data enhancements), as discussed in greater detail elsewhere herein, including with respect to FIGS. 7A-7B. Interactions by the user(s) may include, for example, specifying criteria to use in providing building information (e.g., criteria about building attributes of interest to a user), obtaining and optionally requesting information for one or more indicated buildings (e.g., at which the user's mobile device is located, such as by supplying one or more target images captured at a building) and interacting with corresponding provided building information—non-exclusive examples of interactions with displayed or otherwise presented information includes the following: to view building information, such as part of provided descriptive building data; to select user-selectable controls that are provided with provided building data, such as included in visual data enhancements overlaid on a target image, including to interact with one or more displayed visual indicators and/or textual descriptions associated with a particular building object or other building attribute, such as to obtain further data related to that building object or other building attribute; to change between a floor plan view and a view of a particular image at an acquisition location within or near the floor plan; to change the horizontal and/or vertical viewing direction from which a corresponding view of a panorama image is displayed, such as to determine a portion of a panorama image to which a current user viewing direction is directed; etc.). In addition, a floor plan (or portion of it) may be linked to or otherwise associated with one or more other types of information, including for a floor plan of a multi-story or otherwise multi-level building to have multiple associated sub-floor plans for different stories or levels that are interlinked (e.g., via connecting stairway passages), for a two-dimensional ("2D") floor plan of a building to be linked to or otherwise associated with a three-dimensional ("3D") rendering of the building, etc. Also, while not illustrated in FIG. 1A, in some embodiments the client devices 175 (or other devices, not shown) may receive and use information about buildings (e.g., identified floor plans and/or other mapping-related information) in additional manners, such as to control or assist automated navigation activities by those devices (e.g., by autonomous vehicles or other devices), whether instead of or in addition to display of the identified information.

In the depicted computing environment of FIG. 1A, the network 199 may be one or more publicly accessible linked networks, possibly operated by various distinct parties, such as the Internet. In other implementations, the network 199 may have other forms. For example, the network 199 may instead be a private network, such as a corporate or university network that is wholly or partially inaccessible to non-privileged users. In still other implementations, the network 199 may include both private and public networks, with one or more of the private networks having access to and/or from one or more of the public networks. Furthermore, the network 199 may include various types of wired and/or wireless networks in various situations. In addition, the client devices 175 and server computing systems 180 may include various hardware components and stored information, as discussed in greater detail below with respect to FIG. 3.

In the example of FIG. 1A, the ICA system may perform automated operations involved in generating multiple 360° panorama images at multiple associated acquisition locations (e.g., in multiple rooms or other locations within a building or other structure and optionally around some or all of the exterior of the building or other structure), such as using visual data acquired via the mobile device(s) 185 and/or associated camera devices 184, and for use in generating and providing a representation of an interior of the building or other structure. For example, in at least some such embodiments, such techniques may include using one or more mobile devices (e.g., a camera having one or more fisheye lenses and/or other lenses and mounted on a rotatable tripod or otherwise having an automated rotation mechanism; a camera having sufficient fisheye lenses and/or other lenses to capture 360° horizontally without rotation; a camera of a smartphone or separate device held by or mounted on a user or the user's clothing and using one or more non-fisheye lenses, such as wide-angle rectilinear lenses and/or telephoto lenses and/or macro lenses and/or standard lenses; etc.) to capture data from a sequence of multiple acquisition locations within multiple rooms of a house (or other building), and to optionally further capture data involved in movement of the acquisition device (e.g., movement at an acquisition location, such as rotation; movement between some or all of the acquisition locations, such as for use in linking the multiple acquisition locations together; etc.), in at least some cases without having distances between the acquisition locations being measured or having other measured depth information to objects in an environment around the acquisition locations (e.g., without using any depth-sensing sensors). After an acquisition location's information is captured, the techniques may include producing a 360° panorama image from that acquisition location with 360° of horizontal information around a vertical axis (e.g., a 360° panorama image that shows the surrounding room in an equirectangular format), and then providing the panorama images for subsequent use by the MIGM and/or BLTIPM systems. Additional details related to embodiments of a system providing at least some such functionality of an ICA system are included in U.S. Non-Provisional patent application Ser. No. 16/693,286, filed Nov. 23, 2019 and entitled "Connecting And Using Building Data Acquired From Mobile Devices" (which includes disclosure of an example BICA system that is generally directed to obtaining and using panorama images from within one or more buildings or other structures); in U.S. Non-Provisional patent application Ser. No. 16/236,187, filed Dec. 28, 2018 and entitled "Automated Control Of Image Acquisition Via Use Of Acquisition Device Sensors" (which includes disclosure of an example ICA system that is generally directed to obtaining and using panorama images from within one or more buildings or other structures); and in U.S. Non-Provisional patent application Ser. No. 16/190,162, filed Nov. 14, 2018 and entitled "Automated Mapping Information Generation From Inter-Connected Images"; each of which is incorporated herein by reference in its entirety.

In addition, a floor plan (or portion of it) may be linked to or otherwise associated with one or more additional types of information, such as one or more associated and linked images or other associated and linked information, including for a two-dimensional ("2D") floor plan of a building to be linked to or otherwise associated with a separate 2.5D model floor plan rendering of the building and/or a 3D model floor plan rendering of the building, etc., and including for a floor plan of a multi-story or otherwise multi-level building to have multiple associated sub-floor plans for different stories or levels that are interlinked (e.g., via connecting stairway passages) or are part of a common 2.5D and/or 3D model. Accordingly, non-exclusive examples of an end-user's interactions with a displayed or otherwise generated 2D floor plan of a building may include one or more of the following: to change between a floor plan view and a view of a particular image at an acquisition location within or near the floor plan; to change between a 2D floor plan view and a 2.5D or 3D model view that optionally includes images texture-mapped to walls of the displayed model; to change the horizontal and/or vertical viewing direction from which a corresponding subset view of (or portal into) a panorama image is displayed, such as to determine a portion of a panorama image in a 3D coordinate system to which a current user viewing direction is directed, and to render a corresponding planar image that illustrates that portion of the panorama image without the curvature or other distortions present in the original panorama image; etc. Additional details regarding example embodiments of systems to provide or otherwise support at least some functionality of a building information viewer system and routine as discussed herein, including to display various types of information related to a building of interest and such as by a BIIP (Building Information Integrated Presentation) system and/or an ILTM (Image Locations Transition Manager) system and/or a BMLSM (Building Map Lighting Simulation Manager) system, are included in U.S. Non-Provisional patent application Ser. No. 16/681,787, filed Nov. 12, 2019 and entitled "Presenting Integrated Building Information Using Three-Dimensional Building Models," in U.S. Non-Provisional patent application Ser. No. 16/841,581, filed Apr. 6, 2020 and entitled "Providing Simulated Lighting Information For Three-Dimensional Building Models," and in U.S. Non-Provisional patent application Ser. No. 15/950,881, filed Apr. 11, 2018 and entitled "Presenting Image Transition Sequences Between Acquisition Locations," each of which is incorporated herein by reference in its entirety. In addition, while not illustrated in FIG. 1A, in some embodiments the client devices 175 (or other devices, not shown) may receive and use generated floor plans and/or other generated mapping-related information in additional manners, such as to control or assist automated navigation activities by those devices (e.g., by autonomous vehicles or other devices), whether instead of or in addition to display of the generated information.

FIG. 1A further depicts an exemplary building interior environment in which transmitter devices 235 are placed and used to provide location-related functionality by the BLTIPM system involving user devices 175 moving through the building, and/or in which 360° panorama images and/or other images are acquired, such as by the ICA system and for use by the MIGM system (e.g., under control of the BLTIPM system) to generate and provide one or more corresponding building floor plans (e.g., multiple incremental partial building floor plans) and/or to further use such building information as part of automated building information generation operations. In particular, FIG. 1A illustrates one story of a multi-story house (or other building) 198 with an interior that was captured at least in part via multiple panorama images, such as by a mobile image acquisition device 185 with image acquisition capabilities and/or one or more associated camera devices 184 as they are moved through the building interior to a sequence of multiple acquisition locations 210 (e.g., starting at acquisition location 210A, moving to acquisition location 210B along travel path 115, etc., and ending at acquisition location 210-O or 210P outside of the building). An embodiment of the ICA system may automatically perform or assist in the capturing of the data representing the building interior (as well as to further analyze the captured data to generate 360° panorama images to provide a visual representation of the building interior), and an embodiment of the MIGM system may analyze the visual data of the acquired images to generate one or more building floor plans for the house 198 (e.g., multiple incremental building floor plans). While such a mobile image acquisition device may include various hardware components, such as a camera, one or more sensors (e.g., a gyroscope, an accelerometer, a compass, etc., such as part of one or more IMUs, or inertial measurement units, of the mobile device; an altimeter; light detector; etc.), a GPS receiver, one or more hardware processors, memory, a display, a microphone, etc., the mobile device may not in at least some embodiments have access to or use equipment to measure the depth of objects in the building relative to a location of the mobile device, such that relationships between different panorama images and their acquisition locations in such embodiments may be determined in part or in whole based on elements in different images but without using any data from any such depth sensors, while in other embodiments such depth data may be used. In addition, while directional indicator 109 is provided in FIG. 1A for reference of the reader relative to the example house 198, the mobile device and/or ICA system may not use such absolute directional information and/or absolute locations in at least some embodiments, such as to instead determine relative directions and distances between acquisition locations 210 without regard to actual geographical positions or directions in such embodiments, while in other embodiments such absolute directional information and/or absolute locations may be obtained and used.

In operation, the mobile device 185 and/or camera device(s) 184 arrive at a first acquisition location 210A within a first room of the building interior (in this example, in a living room accessible via an external door 190-1), and captures or acquires a view of a portion of the building interior that is visible from that acquisition location 210A (e.g., some or all of the first room, and optionally small portions of one or more other adjacent or nearby rooms, such as through doorway wall openings, non-doorway wall openings, hallways, stairways or other connecting passages from the first room). The view capture may be performed in various manners as discussed herein, and may include a number of structural elements or other objects that may be visible in images captured from the acquisition location—in the example of FIG. 1A, such objects within the building 198 include the walls, floors, ceilings, doorways 190 (including 190-1 through 190-6, such as with swinging and/or sliding doors), windows 196 (including 196-1 through 196-8), borders between walls and other walls/ceilings/floors such as for inter-wall corners or edges 195 (including corner 195-1 in the northwest corner of the building 198, corner 195-2 in the northeast corner of the first room, corner 195-3 in the southwest corner of the first room, corner 195-4 in the southeast corner of the first room, corner 195-5 at the northern edge of the inter-room passage between the first room and a hallway, etc.), furniture 191-193 (e.g., a couch 191; chair 192; table 193; etc.), pictures or paintings or televisions or other hanging objects 194 (such as 194-1 and 194-2) hung on walls, light fixtures (not shown in FIG. 1A), various built-in appliances or other fixtures or other structural elements (not shown in FIG. 1A), etc. The user may also optionally provide a textual or auditory label identifier to be associated with an acquisition location and/or a surrounding room, such as "living room" for one of acquisition locations 210A or 210B or for the room including acquisition locations 210A and/or 210B, and/or a descriptive annotation with one or more phrases or sentences about a room and/or one or more objects in the room, while in other embodiments the ICA and/or MIGM system may automatically generate such identifiers and/or annotations (e.g., by automatically analyzing images and/or video and/or other recorded information for a building to perform a corresponding automated determination, such as by using machine learning; based at least in part on input from ICA and/or MIGM system operator users; etc.) or the identifiers may not be used.

After the first acquisition location 210A has been captured, the mobile device 185 and/or camera device(s) 184 may be moved or move under their own power to a next acquisition location (such as acquisition location 210B), optionally recording images and/or video and/or other data from the hardware components (e.g., from one or more IMUs, from the camera, etc.) during movement between the acquisition locations. At the next acquisition location, the mobile 185 and/or camera device(s) 184 may similarly capture a 360° panorama image and/or other type of image from that acquisition location. This process may repeat for some or all rooms of the building 198 and in some cases parts of the property 183 external to the building, as illustrated for additional acquisition locations 210C-210P in this example, including in this example to acquire target panorama image(s) on an external deck or patio or balcony area 186, on a larger external back yard or patio area 187a, in a separate side yard area 187b, near or in an external additional accessory structure area 189 (e.g., a garage, shed, accessory dwelling unit, greenhouse, gazebo, car port, etc.) that may have one or more rooms, in a front yard 187c outside the external doorway 190-1 (e.g., during a different image acquisition session than used to acquire some or all of the other target images, such as with images for acquisition locations 210A-210-O being captured in a single image acquisition session in a substantially continuous manner that occurs within a period of time such as 5 minutes or 15 minutes or 30 minutes), and in other embodiments and situations from further acquisition locations (not shown) on an adjoining street or road 181 and/or sidewalk 182, from one or more overhead locations (e.g., from a drone, airplane, satellite, etc., not shown), etc. The acquired images for each acquisition location may be further analyzed, including in some embodiments to render or otherwise place each panorama image in an equirectangular format, whether at the time of image acquisition or later, as well as further analyzed by the MIGM and/or BLTIPM systems in the manners described herein.

FIG. 1A further illustrates examples of one or more user devices 175 that may later be in the house 198 after the acquisition of the building information by the mobile image acquisition device(s) 185, such as for a user device 175 that interacts with transmitter devices 235 at the building (e.g., device 235a in a west-most living room of the building) and that receives corresponding building information from the BLTIPM system and that presents that received building information on a display of that mobile device. In the examples of FIG. 1A, one or more mobile devices 175 are illustrated at various locations in the house, such as in the living room, the kitchen/dining room, and the back yard (e.g., as a user of the mobile device carries it through the house), and the user device(s) 175 may be of one or more device types, such as a smartphone device, a tablet device, a smart glasses device, a virtual reality headset device, etc. Additional details are included elsewhere herein regarding presenting building information on such user devices, including with respect to the examples of FIGS. 2E-2H.

FIG. 1B illustrates examples of types of textual building information 110 that may be available in some embodiments, such as building information from existing databases (e.g., governmental property data; real estate data, such as from a Multiple Listing Services, or MLS, system; etc.) that is subsequently analyzed and used by the MIGM and/or BLTIPM systems. In the example of FIG. 1B, the building description information 110 includes an overview textual description, and well as various attribute data, such as may be used in part or in whole as listing information for an MLS system. In this example, the attribute data is grouped into sections (e.g., overview attributes, further interior detail attributes, further property detail attributes, etc.), with some data having associated location information (e.g., garage spaces, flooring information, primary bedroom size, etc.), but in other embodiments the attribute data may not be grouped or may be grouped in other manners, or more generally the building description information may not be separated into a list of attributes and a separate textual overview description. In this example, the separate textual overview description emphasizes characteristics that may be of interest to viewers, such as a house style type, information of interest about rooms and other building characteristics (e.g., *have been recently updated or have other characteristics of interest*), information of interest about the property and surrounding neighborhood or other environment, etc. In addition, in this example, the attribute data includes objective attributes of a variety of types about rooms and the building and limited information about appliances, but may lack details of various types shown in italics in this example (e.g., *about subjective attributes, about inter-room connectivity and other adjacency, about other particular structural elements or objects and about attributes of such objects*, etc.), such as may instead be determined by the MIGM and/or BLTIPM systems via analysis of building images and/or other building information (e.g., floor plans).

Various details are provided with respect to FIGS. 1A and 1B, but it will be appreciated that the provided details are non-exclusive examples included for illustrative purposes, and other embodiments may be performed in other manners without some or all such details.

As noted above, automated operations of an MIGM system and/or the BLTIPM system may in at least some embodiments include automatically determining attributes of interest for a building based at least in part on analyzing visual data of images acquired in and around a building and optionally associated image acquisition metadata, including in at least some situations by using one or more trained machine learning models—in other embodiments, information about some or all of the building attributes may instead be determined in other manners, such as in part from an existing textual building description and/or property data. Such determined attributes may reflect characteristics of individual rooms or other areas of the building, such as corresponding to structural elements and other objects identified in the rooms and/or visible characteristics or other attributes of the objects and the rooms—in particular, the automated analysis of building images may, in at least some embodiments and situations, include identifying structural elements or other objects of various types in rooms of the building or otherwise in areas associated with the building (e.g., external areas, additional accessory buildings or other structures, etc.), with non-exclusive examples of such objects including a floor, wall, ceiling, window, doorway, non-doorway wall opening, set of stairs, fixture (e.g., lighting or plumbing), appliance, cabinet, island, fireplace, countertop, other built-in structural element, furniture, etc. The automated analysis of acquired building images may further include determining particular attributes of each of some or all such identified objects, such as, for example, a color, type of material (e.g., surface material), estimated age, etc., as well as additional types of attributes in some embodiments such as directions that building objects face (e.g., for windows, doorways, etc.), actual and/or simulated lighting at particular positions (e.g., based on the geographical location and orientation of the building and the position of the sun at a specified time, such as a time-of-day, day-of-month, month-of-year, season-of-year, etc., and optionally corresponding to a particular object), views from particular windows or other locations, etc. Attributes determined for a particular room from one or more images acquired in the room (or otherwise from one or more images acquired at positions with a view of at least some of the room) may include, for example, one or more of the following non-exclusive examples: room types, room dimensions, room shape (e.g., two-dimensional, or '2D', such as relative positions of walls; three-dimensional, or '3D', such as a 3D point cloud and/or planar surfaces of walls and a floor and a ceiling; etc.), types of room usage (e.g., public versus private space) and/or functionality (e.g., recreation), locations in a room of windows and doorways and other inter-room openings, types of inter-room connections, dimensions of inter-room connections, etc. In at least some such embodiments, such automated analysis of images may use one or more machine learning models (e.g., classification neural network models) that are trained via supervised learning (e.g., using labeled data that identifies images having each of the possible objects and attributes), while in other embodiments such machine learning models may instead be trained in an unsupervised manner (e.g., using unsupervised clustering). In at least some embodiments, some or all of the images acquired for a building and used in generation of building descriptive information may be panorama images that are each acquired at one of multiple acquisition locations in or around the building, such as to generate a panorama image at each such acquisition location from one or more of a video at that acquisition location (e.g., a 360° video taken from a smartphone or other mobile device held by a user turning at that acquisition location), or multiple images acquired in multiple directions from the acquisition location (e.g., from a smartphone or other mobile device held by a user turning at that acquisition location), or a simultaneous capture of all the image information (e.g., using one or more fisheye lenses), etc. It will be appreciated that such a panorama image may in some situations be represented in a spherical coordinate system and provide up to 360° coverage around horizontal and/or vertical axes, such that a user viewing a starting panorama image may move the viewing direction within the starting panorama image to different orientations to cause different images (or "views") to be rendered within the starting panorama image (including, if the panorama image is represented in a spherical coordinate system, to convert the image being rendered into a planar coordinate system). Furthermore, acquisition metadata regarding the capture of such panorama images may be obtained and used in various manners, such as data acquired from IMU (inertial measurement unit) sensors or other sensors of a mobile device as it is carried by a user or otherwise moved between acquisition locations.

As noted above, automated operations of an MIGM system and/or the BLTIPM system may also in at least some embodiments include automatically analyzing types of building information other than acquired building images to determine additional attributes of the building, including in at least some situations by using one or more trained machine learning models (e.g., one or more trained neural networks, and whether the same or different from the machine learning models used to analyze images) to determine attributes that reflect characteristics of some or all of the building (e.g., of two or more rooms of the building), such as corresponding to some or all of a layout of some or all rooms of the building (e.g., based at least in part on inter-connections between rooms and/or other inter-room adjacencies)—such other types of building information may include, for example, one or more of the following: a floor plan; a group of inter-linked images, such as for use in a virtual tour; an existing textual description of a building (e.g., listing information for a building, such as is included on a Multiple Listing Service, or MLS); etc. Such a floor plan of a building may include a 2D (two-dimensional) representation of various information about the building (e.g., the rooms, doorways between rooms and other inter-room connections, exterior doorways, windows, etc.), and may be further associated with various types of supplemental or otherwise additional information about the building (e.g., data for a plurality of other building-related attributes)—such additional building information may, for example, include one or more of the following: a 3D, or three-dimensional, model of the building that includes height information (e.g., for building walls and inter-room openings and other vertical areas); a 2.5D, or two-and-a-half dimensional, model of the building that when rendered includes visual representations of walls and/or other vertical surfaces without explicitly modeling measured heights of those walls and/or other vertical surfaces; images and/or other types of data captured in rooms of the building, including panoramic images (e.g., 360° panorama images); etc., as discussed in greater detail below. In some embodiments and situations, the floor plan and/or its associated information may further represent at least some information external to the building (e.g., for some or all of a property on which the building is located), such as exterior areas adjacent to doorways or other wall openings between the building and the exterior, or more generally some or all external areas of a property that includes one or more buildings or other structures (e.g., a house and one or more outbuildings or other accessory structures, such as a garage, shed, pool house, separate guest quarters, mother-in-law unit or other accessory dwelling unit, pool, patio, deck, sidewalk, etc.).

The automated analysis by an MIGM system and/or the BLTIPM system of a building floor plan and/or other building information may, in at least some embodiments and situations, include determining building attributes that are based on information about a building as a whole, such as objective attributes that can be independently verified and/or replicated (e.g., number of bedrooms, number of bathrooms, square footage, connectivity between rooms, etc.), and/or subjective attributes that have associated uncertainty (e.g., whether the building has an open floor plan; has a typical/normal layout versus atypical/odd/unusual layout; a standard versus nonstandard floor plan; a floor plan that is accessibility friendly, such as by being accessible with respect to one or more characteristics such as wheelchair or other disability and/or advanced age; etc.). The automated analysis of a building floor plan may, in at least some embodiments and situations, further include determining building attributes that are based at least in part on information about inter-room adjacencies (e.g., inter-room connections between two or more rooms or other areas), such as based at least in part on a layout of some or all rooms of a building (e.g., all rooms on the same story or that are otherwise part of a grouping of rooms), including some or all such subjective attributes, as well as other types of attributes such as a movement flow pattern of people through rooms. At least some such determined building attributes may be further based on information about a building's location and/or orientation (e.g., about views available from windows or other exterior openings of the building, about directions of windows or other structural elements or other objects of the building, about natural lighting information available at specified days and/or seasons and/or times, etc.). In at least some such embodiments, such automated analysis of building floor plans may use one or more machine learning models (e.g., classification neural network models) that are trained via supervised learning (e.g., using labeled data that identifies floor plans or other groups of rooms or other areas having each of the possible characteristics or other attributes), while in other embodiments such machine learning models may instead be trained in an unsupervised manner (e.g., using unsupervised clustering).

As noted above, automated operations of an MIGM system and/or the BLTIPM system may also in at least some embodiments include automated generation of descriptions about a building based on automatically determined characteristics and other attributes, including, in at least some embodiments and situations, using one or more trained language models to generate a description for each of some or all such determined attributes. The generated descriptions for individual attributes may be further combined in various manners in various embodiments, such as by grouping attributes and their associated descriptions in various manners (e.g., by room or other area; by type of attribute, such as by object type and/or color and/or surface material; by degree of specificity or generality, such as to group building-wide attributes and include their generated descriptions, followed by generated descriptions for attributes that are grouped by room, followed by generated descriptions for attributes that correspond to individual structural elements and other objects; etc.). After attributes and/or building descriptions are generated or otherwise obtained for a building, such as based on analysis of information for a building (e.g., images of, a floor plan for, and optionally other associated information for a building), that generated building information may be used by the BLTIPM system in various manners, including in some embodiments as part of building information provided to user devices (e.g., as visual data enhancements to overlay on or otherwise display in combination with corresponding target images, such as to highlight particular building attributes based at least in part by displaying corresponding generated textual descriptions).

In addition, in some embodiments, building information is generated and/or presented to an end-user based at least in part on specified criteria associated with that end-user (e.g., based on one or more initial buildings and/or building attributes that are selected by the end-user and/or are identified as previously being of interest to the end-user, whether based on explicit and/or implicit activities of the end-user to specify such buildings and/or building attributes; based on one or more search criteria specified by the end-user, whether explicitly and/or implicitly; etc.), and are used in further automated activities to personalize interactions with the end-user. Such further automated personalized interactions may be of various types in various embodiments, and in some embodiments may include displaying or otherwise presenting information to the end-user about selected building attributes and/or additional information associated with a building in which the end-user is located or otherwise reviewing from a remote location.

FIGS. 2A-2J illustrate examples of generating and using descriptive information for a building, such as based at least in part on automated analysis of acquired building images and other building information, and including presenting building information (e.g., visual data enhancements on camera view images displayed on a mobile device in the building) for subsequent use in one or more automated manners, such as for the building 198.

Figure 2A:
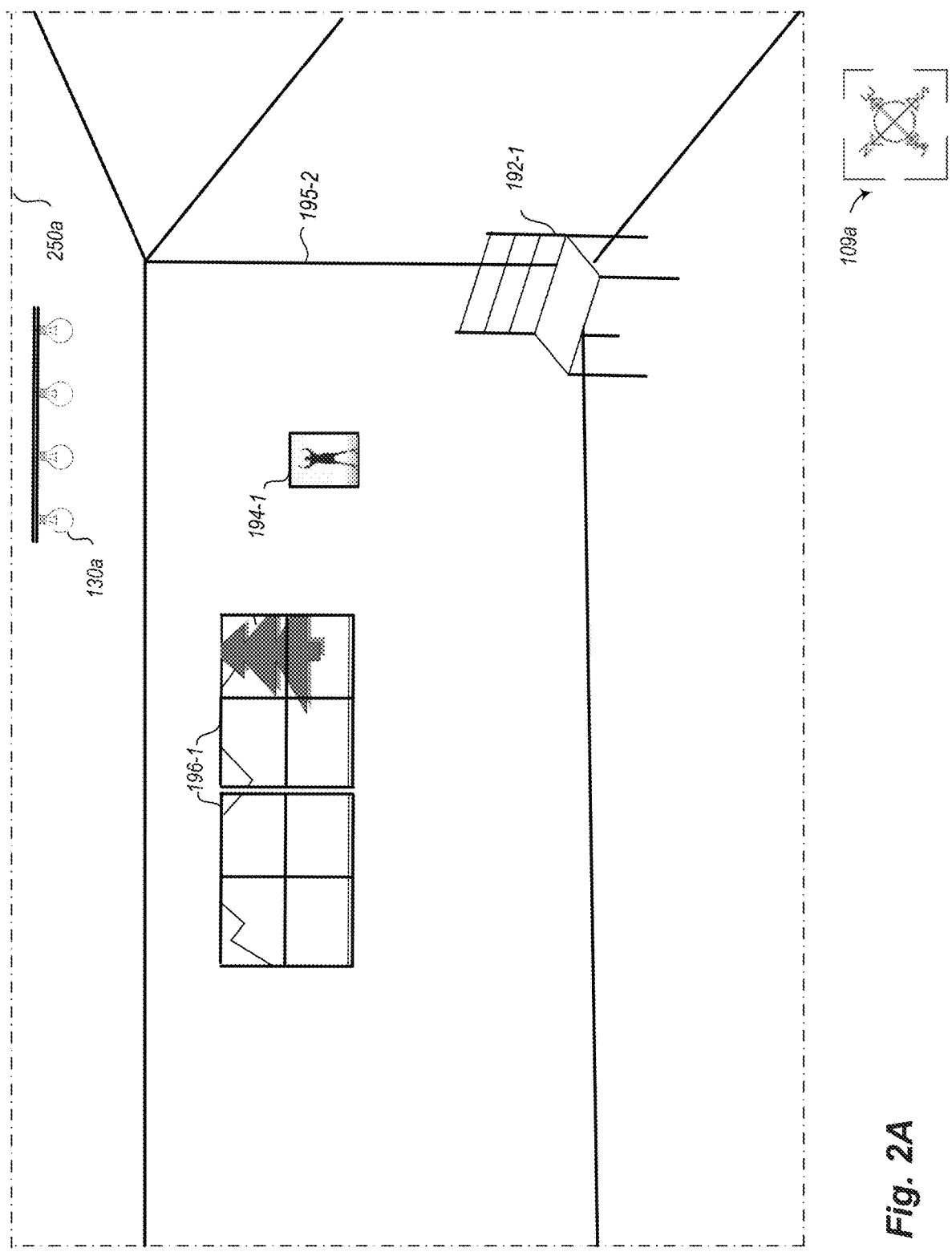
FIGS. 2A-2D illustrate examples of capturing and automatically generating descriptive information for a building.

In particular, FIG. 2A illustrates an example image 250*a*, such as a non-panorama perspective image taken in a northeasterly direction from acquisition location 210B in the living room of house 198 of FIG. 1A (or a northeasterly facing subset view of a 360° panorama image taken from that acquisition location and formatted in a rectilinear manner)—the directional indicator 109*a* is further displayed in this example to illustrate the northeasterly direction in which the image is taken. In the illustrated example, the displayed image includes built-in elements (e.g., light fixture 130*a*, two windows 196-1, etc.), furniture (e.g., chair 192-1), and a picture 194-1 hanging on the north wall of the living room. No inter-room passages into or out of the living room (e.g., doorways or other wall openings) are visible in this image. However, multiple room borders are visible in the image 250*a*, including horizontal wall-ceiling and wall-floor borders between a visible portion of the north wall of the living room and the living room's ceiling and floor, horizontal wall-ceiling and wall-floor borders between a visible portion of the east wall of the living room and the living room's ceiling and floor, and the inter-wall vertical border 195-2 between the north and east walls.

Figure 2B:
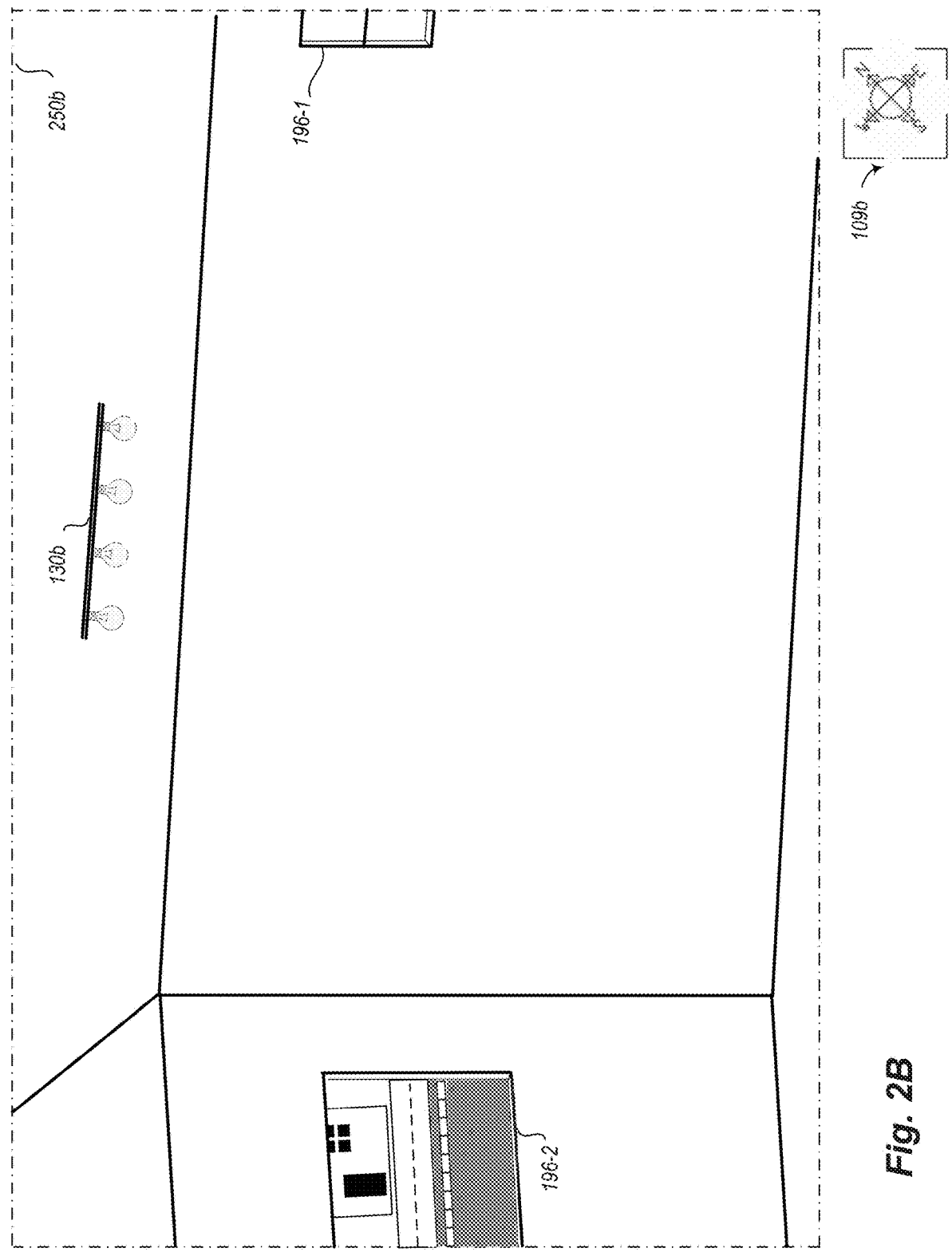

FIG. 2B continues the example of FIG. 2A, and illustrates an additional perspective image 250*b* taken in a northwesterly direction from acquisition location 210B in the living room of house 198 of FIG. 1A (or a northwesterly facing subset view of a 360° panorama image taken from that acquisition location and formatted in a rectilinear manner, such as the same 360° panorama image mentioned with respect to FIG. 2A)—the directional indicator 109*b* is further displayed to illustrate the northwesterly direction in which the image is taken. In this example image, a small portion of one of the windows 196-1 continues to be visible, along with a portion of window 196-2 and a new lighting fixture 130*b*. Horizontal and vertical room borders are also visible in image 250*b* in a manner similar to FIG. 2A.

Figure 2C:
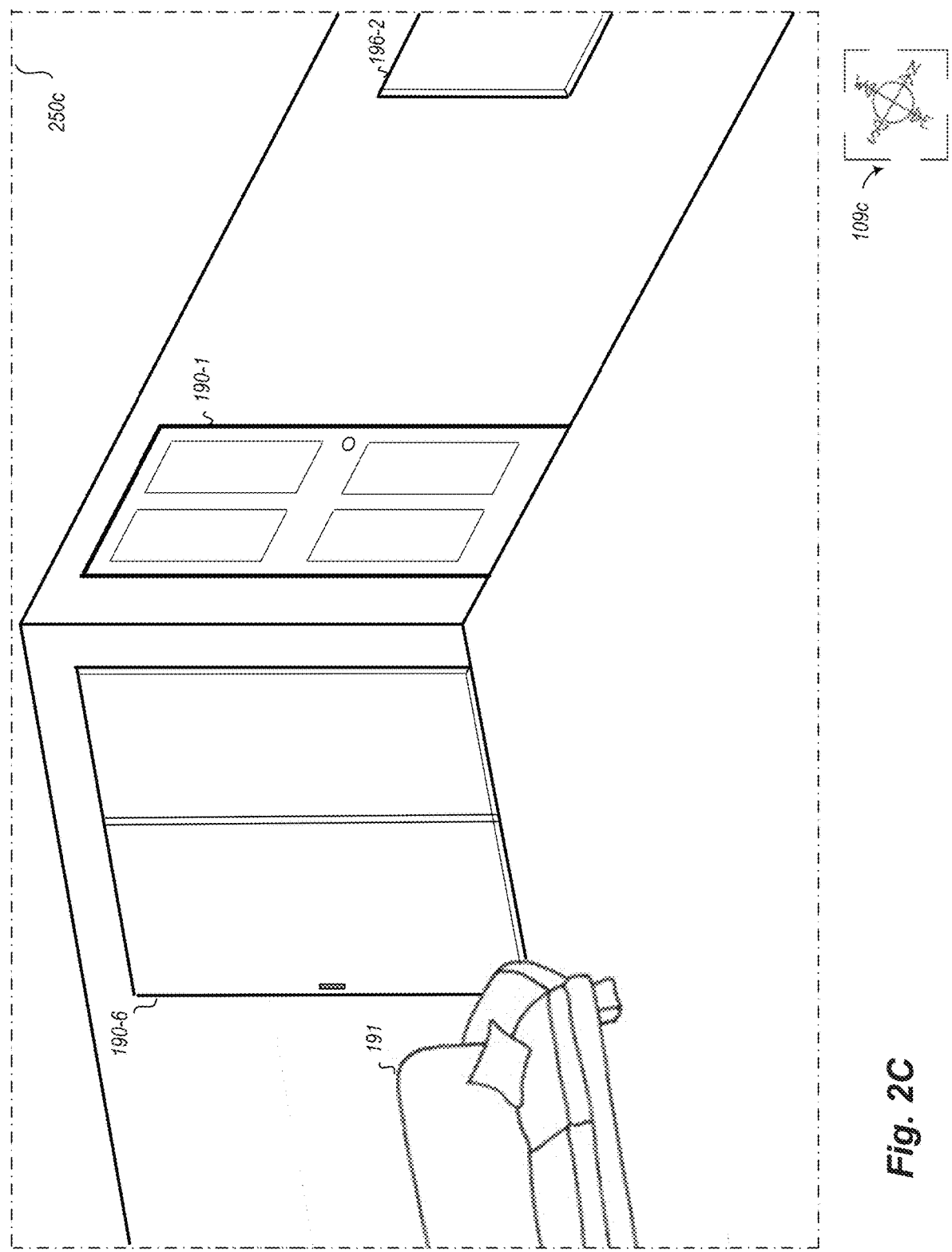

FIG. 2C continues the examples of FIGS. 2A-2B, and illustrates a third perspective image 250*c* taken in a southwesterly direction in the living room of house 198 of FIG. 1A, such as from acquisition location 210B (or a southwesterly facing subset view of a 360° panorama image taken from that acquisition location and formatted in a rectilinear manner, such as the same 360° panorama image mentioned with respect to FIGS. 2A and 2B)—the directional indicator 109*c* is further displayed to illustrate the southwesterly direction in which the image is taken. In this example image, a portion of window 196-2 continues to be visible, as is a couch 191 and visual horizontal and vertical room borders in a manner similar to that of FIGS. 2A and 2B. This example image further illustrates two inter-room passages for the living room, which in this example include a doorway 190-1 with a swinging door to enter and leave the living room (which FIG. 1A identifies as a door to the exterior of the house, such as the front yard 187*c* and subsequent sidewalk 182 and street or road 181, as shown in FIG. 1A), and a doorway 190-6 with a sliding door to move between the living room and side yard 187*b*—as is shown in the information in FIG. 1A, an additional non-doorway wall opening 263*a* exists in the east wall of the living room to move between the living room and hallway, but is not visible in the images 250*a*-250*c*. It will be appreciated that a variety of other perspective images may be taken from acquisition location 210B and/or other acquisition locations and displayed in a similar manner.

Figure 2D:
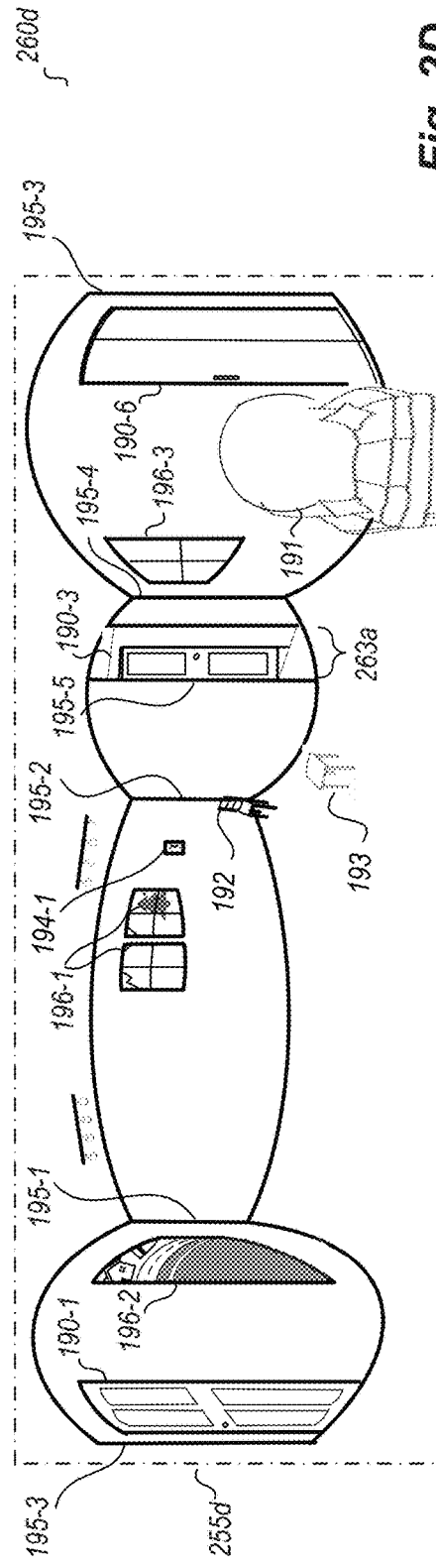
Figure 2D:
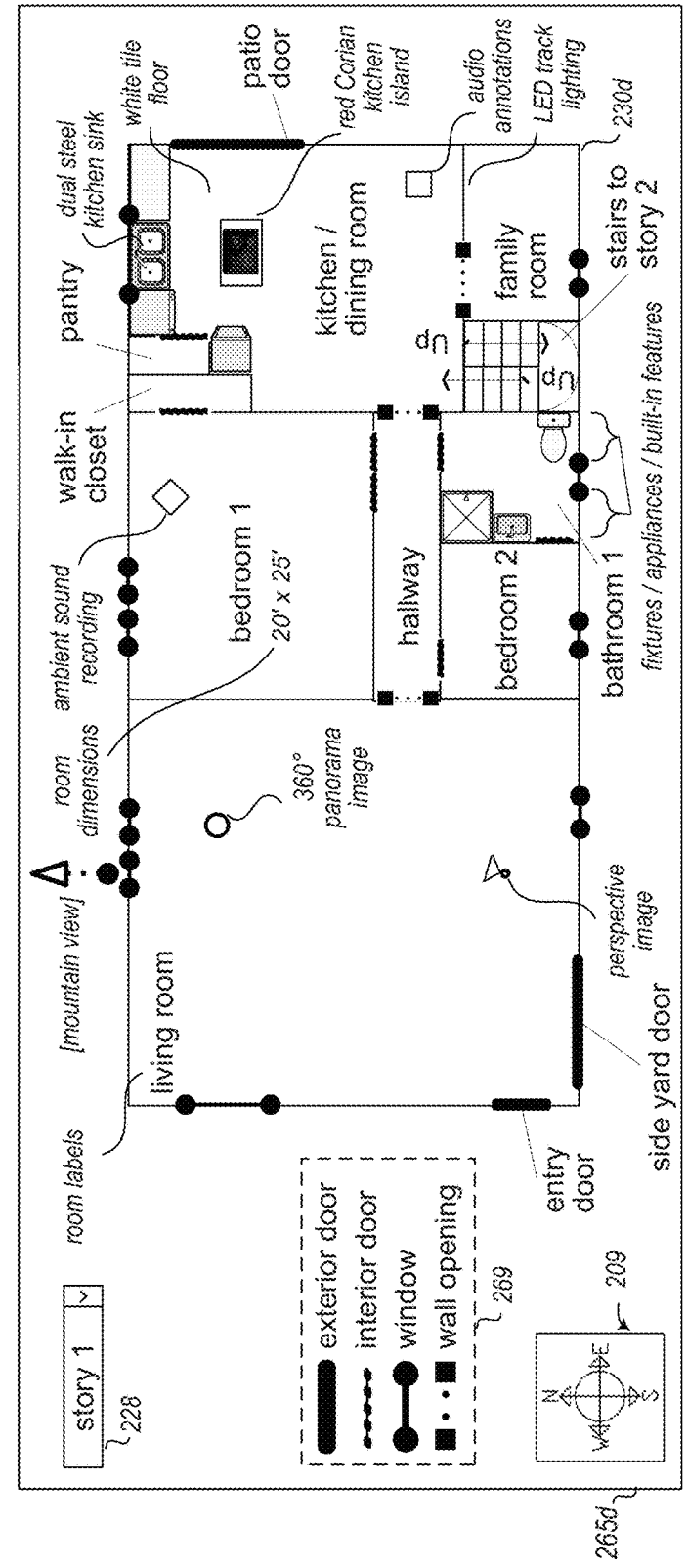

FIG. 2D continues the examples of FIGS. 2A-2C, and illustrates information 260*d* that includes a 360° panorama image 255*d* (e.g., taken from acquisition location 210B), which displays the entire living room in an equirectangular format—since the panorama image does not have a direction in the same manner as the perspective images of FIGS. 2A-2C, the directional indicator 109 is not displayed in FIG. 2D, although pose information for the panorama image may include one or more associated directions (e.g., a starting and/or ending direction for the panorama image, such as if acquired via rotation). A portion of the visual data of panorama image 255*d* corresponds to the first perspective image 250*a* (shown in approximately the center portion of the image 255*d*), while the left portion of the image 255*d* and the far-right portion of the image 255*d* contain visual data corresponding to those of the perspective images 250*b* and 250*c*—thus, for example, starting from image 255*d*, various perspective images may be rendered that include some or all of images 250*a*-250*c* (and optionally a large quantity of other images). This example panorama image 255*d* includes windows 196-1, 196-2 and 196-3, furniture 191-193, doorways 190-1 and 190-6, and non-doorway wall opening 263*a* to the hallway room (with the opening showing part of a doorway 190-3 visible in the adjacent hallway). Image 255*d* further illustrates a variety of room borders in a manner similar to that of the perspective images, but with the horizontal borders being displayed in an increasingly curved manner the farther they are from a horizontal midline of the image—the visible borders include vertical inter-wall borders 195-1 through 195-4, vertical border 195-5 at the north/left side of the hallway opening, vertical borders at the south/right side of the hallway opening, and horizontal borders between the walls and the floor and between the walls and the ceiling.

FIG. 2D further illustrates information that includes one example of part of a 2D floor plan 230*d* for the house 198 (e.g., corresponding to a first or main story of the house) presented to an end-user in a GUI 265*d*, such as may be generated by the MIGM system via analysis of images and optionally other data acquired in the house and may be displayed by the MIGM system and/or the BLTIPM system, and with the living room being the most westward room of the house (as reflected by directional indicator 209)—it will be appreciated that a 3D or 2.5D floor plan with rendered wall height information may be similarly generated and displayed in some embodiments, whether in addition to or instead of such a 2D floor plan. Various types of information are illustrated on the 2D floor plan 230*d* in this example. For example, such types of information may include one or more of the following: room labels added to some or all rooms (e.g., "living room" for the living room); room dimensions added for some or all rooms; visual indications of objects such as installed fixtures or appliances (e.g., kitchen appliances, bathroom items, etc.) or other built-in elements (e.g., a kitchen island) added for some or all rooms, optionally with associated labels and/or descriptive annotations (e.g., dual steel kitchen sink, kitchen island with red Corian surface, LED track lighting, white tile floor, etc.); visual indications added for some or all rooms of positions of additional types of associated and linked information (e.g., of other panorama images and/or perspective images that an end-user may select for further display; of audio or non-audio annotations that an end-user may select for further presentation, such as "the kitchen includes a Brand X refrigerator with features Y, a built-in stove/oven of Brand Z, etc."; of sound recordings that an end-user may select for further presentation, such as to hear the level of street noise from bedroom 1; etc.); visual indications added for some or all rooms of structural elements such as doors and windows; visual indications of visual appearance information (e.g., color and/or material type and/or texture for installed items such as floor coverings or wall coverings or surface coverings); visual indications of views from particular windows or other building locations and/or of other information external to the building (e.g., a type of an external space; items present in an external space; other associated buildings or structures, such as sheds, garages, pools, decks, patios, walkways, gardens, etc.); a key or legend 269 identifying visual indicators used for one or more types of information; etc. When displayed as part of a GUI such as GUI 265*d*, some or all such illustrated information may be user-selectable controls (or be associated with such controls) that allows an end-user to select and display some or all of the associated information (e.g., to select the 360° panorama image indicator for acquisition location 210B to view some or all of that panorama image (e.g., in a manner similar to that of FIGS. 2A-2D). In addition, in this example a user-selectable control 228 is added to indicate a current story that is displayed for the floor plan, and to allow the end-user to select a different story to be displayed—in some embodiments, a change in stories or other levels may be made directly from the floor plan, whether in addition to or instead of using the control 228, and such as via selection of a corresponding connecting passage in the illustrated floor plan (e.g., the stairs to a second or upper story, to a basement, etc.). It will be appreciated that a variety of other types of information may be added in some embodiments, that some of the illustrated types of information may not be provided in some embodiments, and that visual indications of and user selections of linked and associated information may be displayed and selected in other manners in other embodiments.

Additional details related to embodiments of a system providing at least some such functionality of an MIGM system or related system for generating floor plans and associated information and/or presenting floor plans and associated information are included in co-pending U.S. Non-Provisional patent application Ser. No. 16/190,162, filed Nov. 14, 2018 and entitled "Automated Mapping Information Generation From Inter-Connected Images" (which includes disclosure of an example Floor Map Generation Manager, or FMGM, system that is generally directed to automated operations for generating and displaying a floor map or other floor plan of a building using images acquired in and around the building); in U.S. Non-Provisional patent application Ser. No. 16/681,787, filed Nov. 12, 2019 and entitled "Presenting Integrated Building Information Using Three-Dimensional Building Models" (which includes disclosure of an example FMGM system that is generally directed to automated operations for displaying a floor map or other floor plan of a building and associated information); in U.S. Non-Provisional patent application Ser. No. 16/841,581, filed Apr. 6, 2020 and entitled "Providing Simulated Lighting Information For Three-Dimensional Building Models" (which includes disclosure of an example FMGM system that is generally directed to automated operations for displaying a floor map or other floor plan of a building and associated information); in U.S. Provisional Patent Application No. 62/927,032, filed Oct. 28, 2019 and entitled "Generating Floor Maps For Buildings From Automated Analysis Of Video Of The Buildings' Interiors" (which includes disclosure of an example Video-To-Floor Map, or VTFM, system that is generally directed to automated operations for generating a floor map or other floor plan of a building using video data acquired in and around the building); in U.S. Non-Provisional patent application Ser. No. 16/807,135, filed Mar. 2, 2020 and entitled "Automated Tools For Generating Mapping Information For Buildings" (which includes disclosure of an example MIGM system that is generally directed to automated operations for generating a floor map or other floor plan of a building using images acquired in and around the building); and in U.S. Non-Provisional patent application Ser. No. 17/013,323, filed Sep. 4, 2020 and entitled "Automated Analysis Of Image Contents To Determine The Acquisition Location Of The Image" (which includes disclosure of an example MIGM system that is generally directed to automated operations for generating a floor map or other floor plan of a building using images acquired in and around the building, and an example ILMM system for determining the acquisition location of an image on a floor plan based at least in part on an analysis of the image's contents); each of which is incorporated herein by reference in its entirety.

FIG. 2E illustrates information 260e corresponding to examples of automated operations of the BLTIPM system to provide location-related functionality for a user device 175 moving through a building, which in this example is house 198, and such as to automatically track locations of the user device and to provide location—related navigation functionality and/or other information to the user device. In the illustrated example, a variety of transmitter devices 235 are located in or around the building 198 on the associated property 183, and part of a particular visit by an example user device 175 is further illustrated. In this example, a first transmitter device 235f is located at an edge of the property 183, such as near adjacent street 181 and/or sidewalk 182, with a transmission radius 236f for transmitting an identifier and optionally other data by the transmitter device. Accordingly, another user device (not shown) traveling along a path 218 outside of the property may receive transmissions from the device 235f and, if a corresponding client application is installed on the other user device, receive corresponding building-related information associated with the transmitter device (e.g., overview information about the building, information on how to initiate a visit to the building, etc.).

In the illustrated example, the user device 175 moves along a path 215 that optionally passes within the range 236f of the transmitter device 235f, and in this example subsequently enters the range 236c of a transmitter device 235c located proximate to an entry device 239 (e.g., an electronic lockbox or electronic lock) near the front door entrance to the building—in this example, if the user device 175 already has a corresponding client application installed, the client application on the user device 175 may receive a transmitter identifier and optionally other data from the transmitter device 235c, and in this example further interacts with the BLTIPM system 140 (e.g., at a remote location, such as over one or more computer networks 199) to obtain and use authentication information to enable access to the building. After entering the building, the user device 175 enters the range 236a of a transmitter device 235a near the entrance at an area 240a, such as to obtain overview information about the building. In addition, one or more transmitter devices (e.g., transmitter device 235c and/or 235a) may send a notification message to the user device 175 to prompt use of the client application, such as to cause the provided building information to be presented, and with one example of such a notification message being shown in information 217, and with one example of building information associated with a particular transmitter device (e.g., transmitter device 235a or 235b) being shown in information 211. In situations in which the user device 175 did not have the client application installed, a visual marker and associated information 238a may be mounted or otherwise displayed near the entrance, such as to provide data to enable the downloading and installation of the client application, with one example of such a visual marker and associated information 238a shown below the floor plan view in image 250e (e.g., taken at a time after that of image 250c of FIG. 2C, such as at a time of placement of some or all transmitter devices 235).

As described in greater detail elsewhere herein, the BLTIPM system may determine locations of the user device 175 at various positions along the path 215, such as based on interactions of the user device 175 with particular transmitter devices 235—in this example so far, the locations of the user device at the entry device 239, near the visual marker 238a and/or within the range 236a of the transmitter device 235a (e.g., within area 240a) may be determined. In addition, the user device 175 may further receive additional location information, such as GPS signals 223 (e.g., while the user device is outside the building 198) and/or using further visual analysis performed by the user device 175 (not shown), and if so may further incorporate such additional location information as part of the tracked location information for the user device 175. Such tracked location information may further be associated with a visit log (not shown) for the visit of the user device 175 to the building 198, which may be initiated by the BLTIPM client application and/or by the BLTIPM system upon initial interactions of the user device with one or more of the transmitter devices, such as transmitter devices 235c and/or 235a—in addition, the interactions with one or more such transmitter devices and/or with the entry device 239 may further cause the client application and/or BLTIPM system to notify one or more other users or devices associated with the building, such as one or more devices 105 over network 199. In the illustrated example, the user device continues along the path 215 through the living room of building 198, and in this example enters the range 236b of additional transmitter device 235b at a location within an area 240b, and receives building information associated with the transmitter device 235b. Thus, the BLTIPM system may initially determine at least a position of the user device 175 as being at or near the limit of the range 236b, optionally with a greater likelihood of a straight line position between the previous location of the user device 175 and the known location of the transmitter device 235b—if the transmitter device 235b further provides information to determine a direction 241a between the user device 175 and the location of the transmitter device 235b as well as a known or estimated range or distance between the user device 175 and the transmitter device 235b, a location of the user device 175 may be determined more accurately, such as to correspond to some or all of the area 240b. As the user device 175 continues along the path 215, the user device 175 further enters an area 240c in which the user device is within range 236d of transmitter device 235d while still being within the range 236b of transmitter device 235b, and thus may further receive building information associated with transmitter device 235d. Accordingly, even if direction information 241a is not available for transmitter device 235b, the combination of range or distance information 241b between the user device 175 and the two known locations of the transmitter devices 235d and 235b may be used to triangulate the position of the use device with area 240c. While further portions of the path of the user device 175 are not illustrated in this example, including the exit of the user device from the building 198 and the corresponding end of the visit and associated visit log, it will be appreciated that the path of the user device 175 may continue through some or all of the rooms of the building and/or at one or more areas outside of the building 198 (e.g., external areas of the property 183, such as in one or more locations of the yard 187).

Figure 2F:
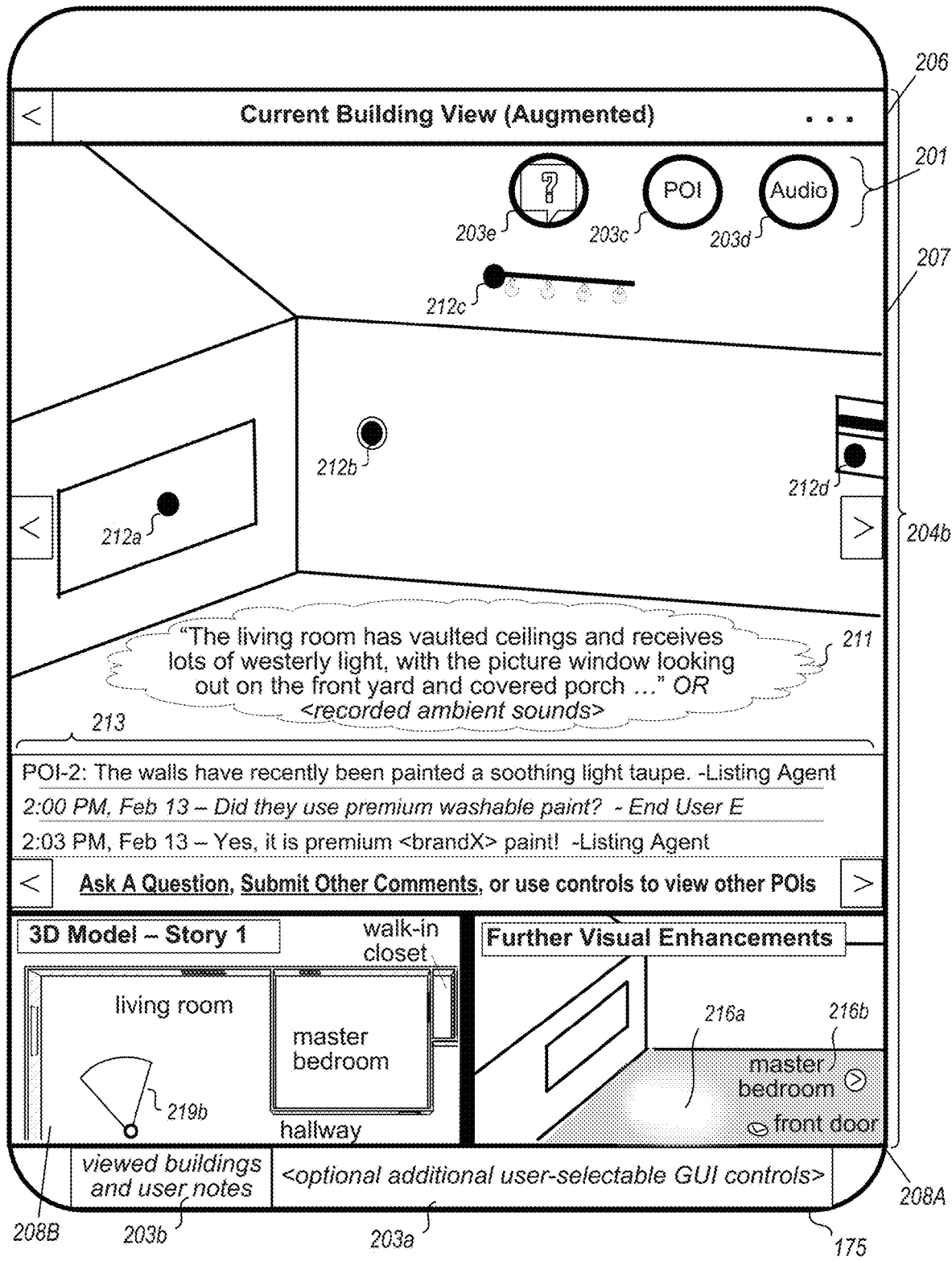

FIG. 2F continues the example of FIG. 2E, and illustrates information 260f that provides an example of one type of GUI of a client application on user device 175 to provide building information to user device 175 during the visit to building 198. In this example, the GUI illustrates multiple types of information 204b in a primary pane 207 and two secondary panes 208A and 208B, with each of the panes showing information of a different type about the same area of the example house 198, although other GUIs may include more or less panes and/or display different types of information. The primary pane 207 in this example is showing a target image captured by the mobile device in the living room, with the direction of the image being in the northwest direction, and also includes a header 206 that provides a description of the type of content shown (here, the target image with the mobile device's current camera view of the building as augmented with overlaid visual data enhancements), although in other embodiments such a header may not be used. The primary pane 207 may also have one or more user-selectable GUI controls that enable the end-user (not shown) to modify information being displayed in the GUI, such as user-selectable controls 201c-201e overlaid on the primary pane (including a toggle control 203c to show or hide information about object/attribute points of interest that are present in the current image, a toggle control 203d to show or hide a description of the area of the house shown by the image, a toggle control 203e to show or hide information about questions and answers corresponding to the area of the house shown in the image and to optionally allow the end-user to supply one or more additional questions or answers, etc.) and optionally additional user-selectable GUI controls 201, 203a and 203b may be shown separate from the primary pane 207—in at least some embodiments and situations, at least some of the displayed user-selectable controls may be contextual based on the content currently shown in the primary pane (in this example, associated with image content, and optionally with the current room being displayed).

In this example, various information has been overlaid on the primary pane 207 using visual data enhancements, such as based on selection by the end-user of the user-selectable controls 203c, 203d and 203e in this example, although it will be appreciated that the end-user may instead select zero, one, or two of those three controls in other situations. In this example, selection of the user-selectable control 203c has caused several additional user-selectable visual indicator GUI controls 212 associated with points of interest in the room to be illustrated, with visual indicator 212b being currently selected and having a corresponding textual comment shown in the area 213 of the primary pane (to comment about paint on the walls of the room). Other visual POI indicators in this example include 212a on the west-facing picture window, 212d on the north-facing window, and 212c on the overhead track lighting fixture on the ceiling. While the selected visual indicator 212b has associated text that is displayed in this example, other visual indicators for POIs may have other types of information associated, such as if the window visual indicators 212a and/or 212d have images and/or video associated with them, such as to show images or videos looking out the window (e.g., a time-lapse video over a 24-hour period of the exterior of the house from a window or door, such as to show road traffic or people traffic outside over that time period). In addition to the activation of the control 203c, the user-selectable control 203d has also been activated to provide an audio description of the area shown in the image, with the visual indicator 211 shown in this example representing audio information that may be audibly presented in response to the selection of that control (e.g., recorded ambient sounds; an audio recitation of corresponding description information, such as instead of having a textual representation of the information as shown in this example, or instead in addition to the textual information, such as if a closed captioning option is further selected). Furthermore, the user-selectable control 203b corresponding to questions and answers is also selected, causing additional information in the area 213 to be shown, such as a question from another end-user and a corresponding answer, as well as further user-selectable controls to allow the end-user to ask a question to be answered, submit a comment for display to others, or to cycle through other existing questions and comments. It will be appreciated that illustrated types of information may be presented in other manners in other embodiments, or may not be shown.

In addition to the image shown in the primary pane, the secondary panes 208A and 208B show other types of content about the same location or area of the example house. In particular, the secondary pane 208B in this example shows a portion of a 3D computer model of the house, and in particular shows a portion of the computer model that includes the northwest corner of the living room, as well as optionally including some or all of other parts of the same floor—the computer model is overlaid in this example with the visual indicator 219b to illustrate where the image shown in the primary pane was captured, and the 2D orientation of the camera that captured the image, and other types of information may be similarly overlaid (e.g., directions or other guidance to a destination location, such as with a path and/or destination target location being overlaid on the visual representation of the model, etc.). In addition, the secondary pane 208A in this example shows an example of simulated daylight lighting 216a added to the image, and further shows visual arrow indicators to direct the user to other areas/POIs that are not currently visible (e.g., a different adjacent room, an object in another part of the current room that is not currently visible, etc.). While simulated lighting is illustrated in this example in secondary pane 208A, a variety of types of information may be overlaid on the primary and/or secondary panes, such as when selected by corresponding user-selectable GUI controls (e.g., additional user-selectable GUI controls 203a), with non-exclusive examples of such overlaid information and additional functionality including the following: to show measurements or other scale information; to show simulated sunlight for specified conditions (e.g., one or more times of day and/or times of year); to show actual interior lighting (e.g., captured in previous corresponding images), optionally under specified conditions; to show information about a surrounding environment of the building; to allow virtual objects and/or surfaces and/or structural changes to be shown (e.g., to change color, texture etc. of walls, floors, object surfaces, etc.); to present sound recordings from one or more locations of the building (e.g., of ambient sound at specified times); etc. In addition, other user-selectable GUI controls are further available in this example, including a control 203b by which a user may select information about previous visits to other buildings (e.g., from stored visit logs for the user and/or the user's device), such as to see previously received building information for those buildings and/or user-supplied notes or other data captured by the user device during the visits. It will be appreciated that the information discussed with respect to the examples of FIG. 2F are provided for illustrative purposes, and that the invention is not limited to such details.

Figure 2G:
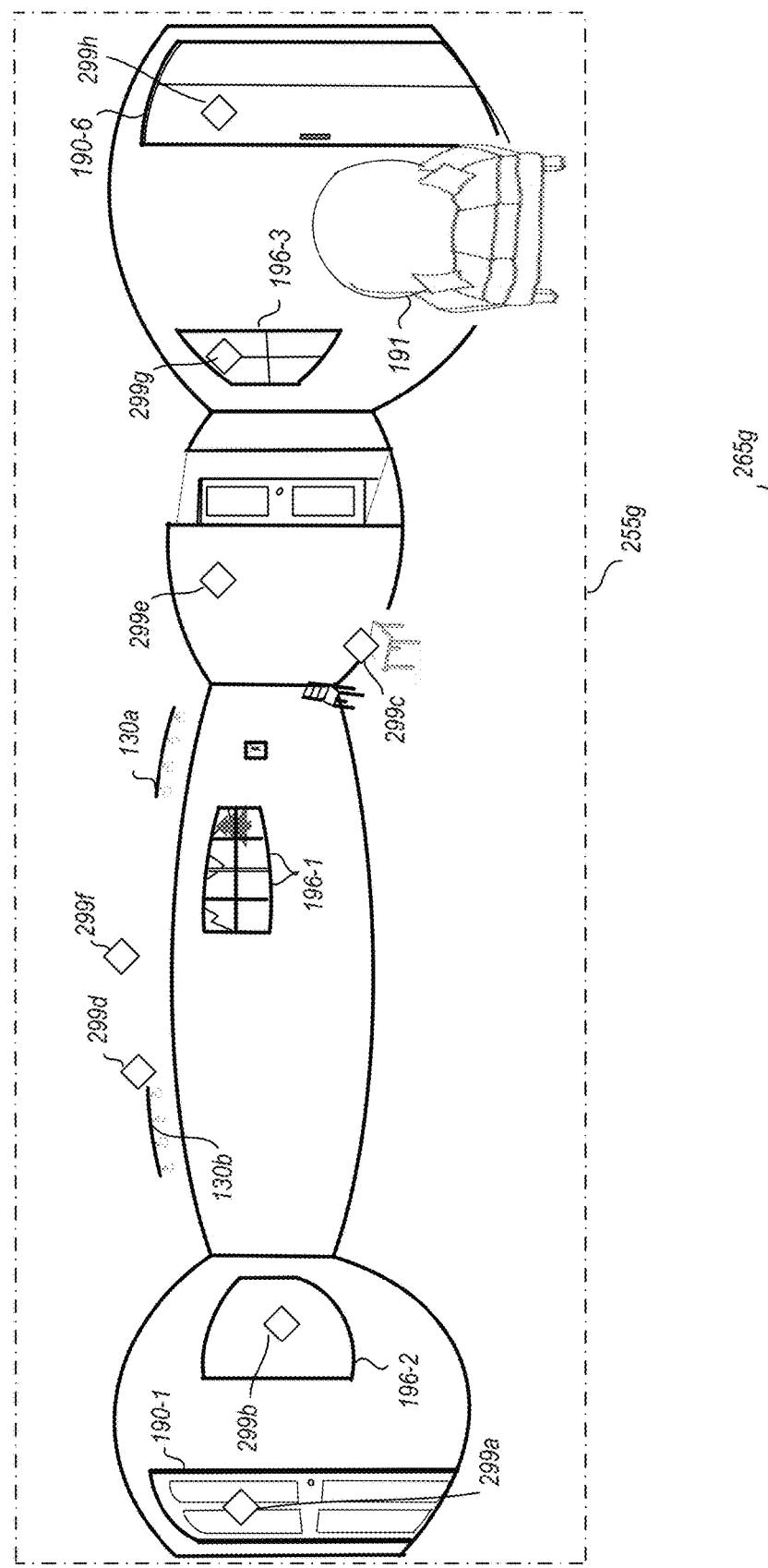
Figure 2H:
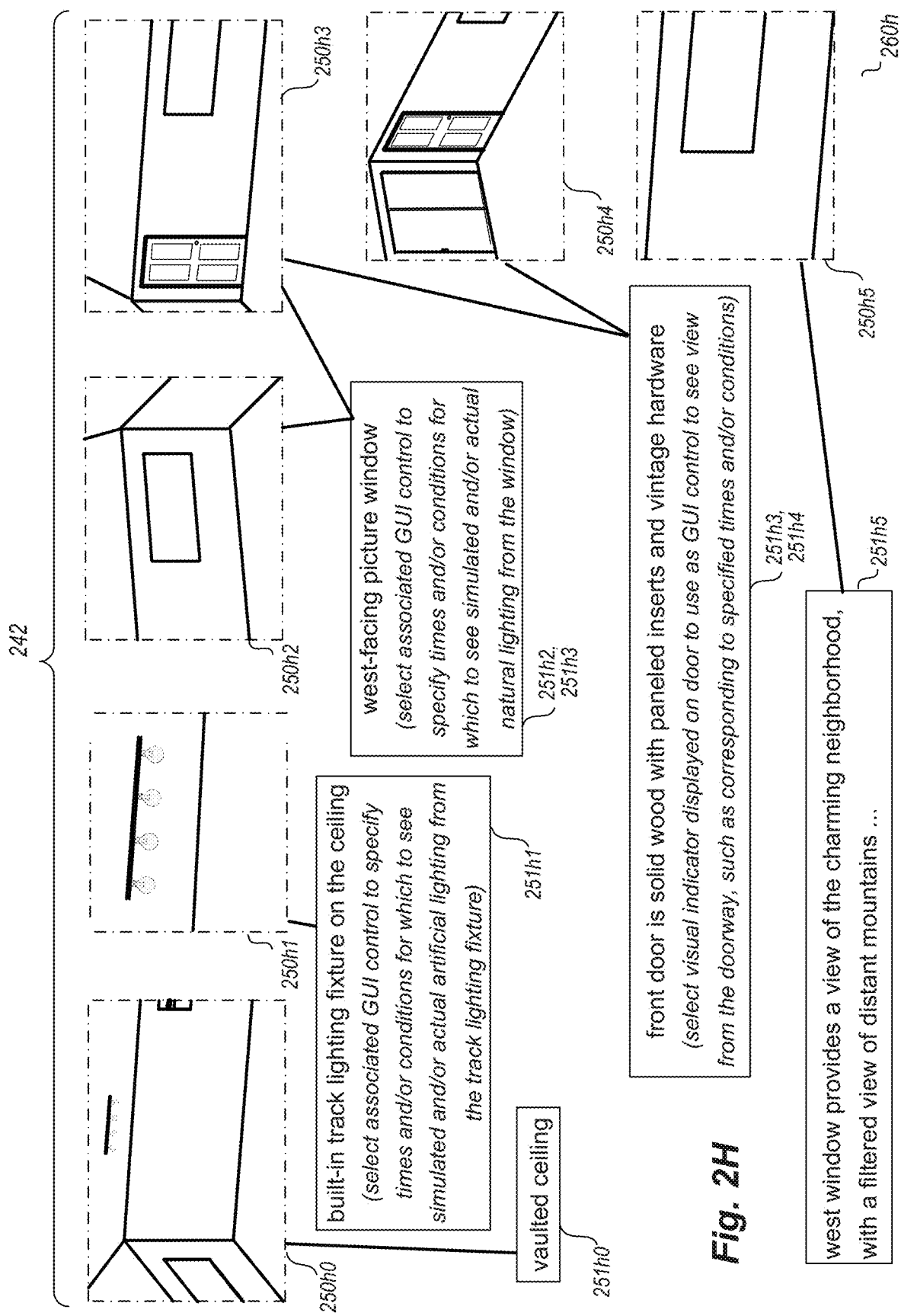

FIGS. 2G and 2H continue the examples of FIGS. 2E-2F, and illustrates information 260g to provide an example of building information 265g that may be received by the user device 175 from a transmitter device in the living room of building 198 (e.g., transmitter device 235a or 235b), as well as information 265g about various building attributes that may be described in building information provided to the user device 175. In particular, in this example, FIG. 2G illustrates various objects, such as the vaulted ceiling as indicated 299f, track lighting fixture 130b as indicated 299d, front door 190-1 as indicated 299a, west picture window 196-2 as indicated 299b, south window 196-3 as indicated 299g, sliding door 190-6 as indicated 299h, east wall as indicated 299e, table 193 as indicated 299c, etc. Corresponding building information that is associated with these objects and provided in the building information for one or more transmitter devices in the living room may further include textual information describing the selected objects, as discussed further in the information 260h of FIG. 2H, such as to provide textual descriptions and associated functionality 251h1-251h5 that describe attributes corresponding to objects shown in associated images 250h0-250h5, such as the front door 190-1 (e.g., door type, door hardware, a description of where the door leads, etc.), west picture window 196-2 (e.g., window type, hardware, view, direction, etc.), south window 196-3 (e.g., to present simulated or actual lighting from the track lighting fixture, such as for different times and/or conditions, and optionally as controlled by the user via one or more presented user-selectable controls), sliding door 190-6, east wall (e.g., color, type of surface material, etc., such as for an accent wall), table 193 (e.g., material, size, etc.), track lighting fixture 299d (e.g., to present simulated or actual lighting from the track lighting fixture, such as for different times and/or conditions, and optionally as controlled by the user via one or more presented user-selectable controls), etc. As one example, one or more additional transmitter devices may be present in the living room and each associated with one or more of the groups of building information 251h1-251h5.

Figure 2I:
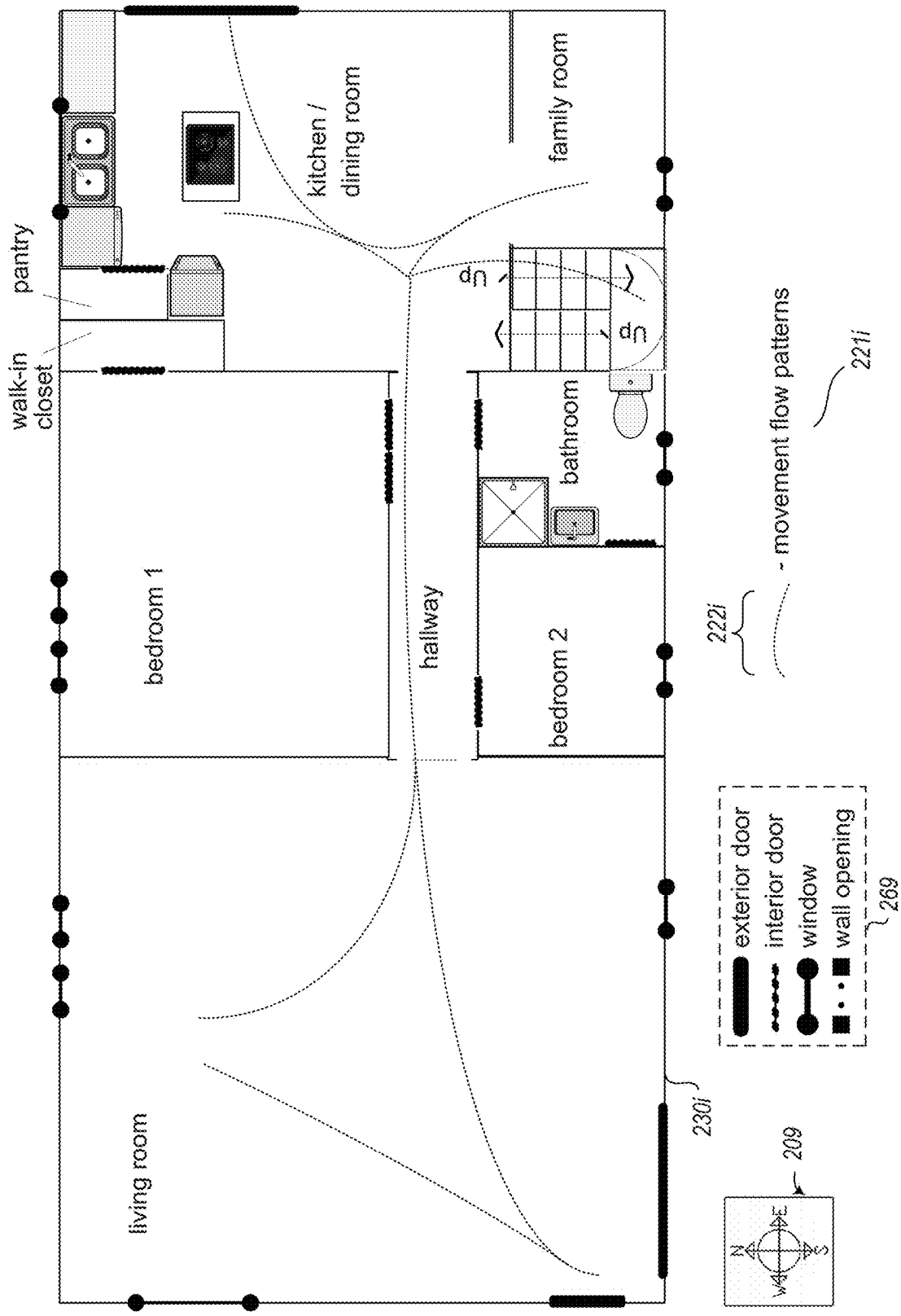
Figure 2J:
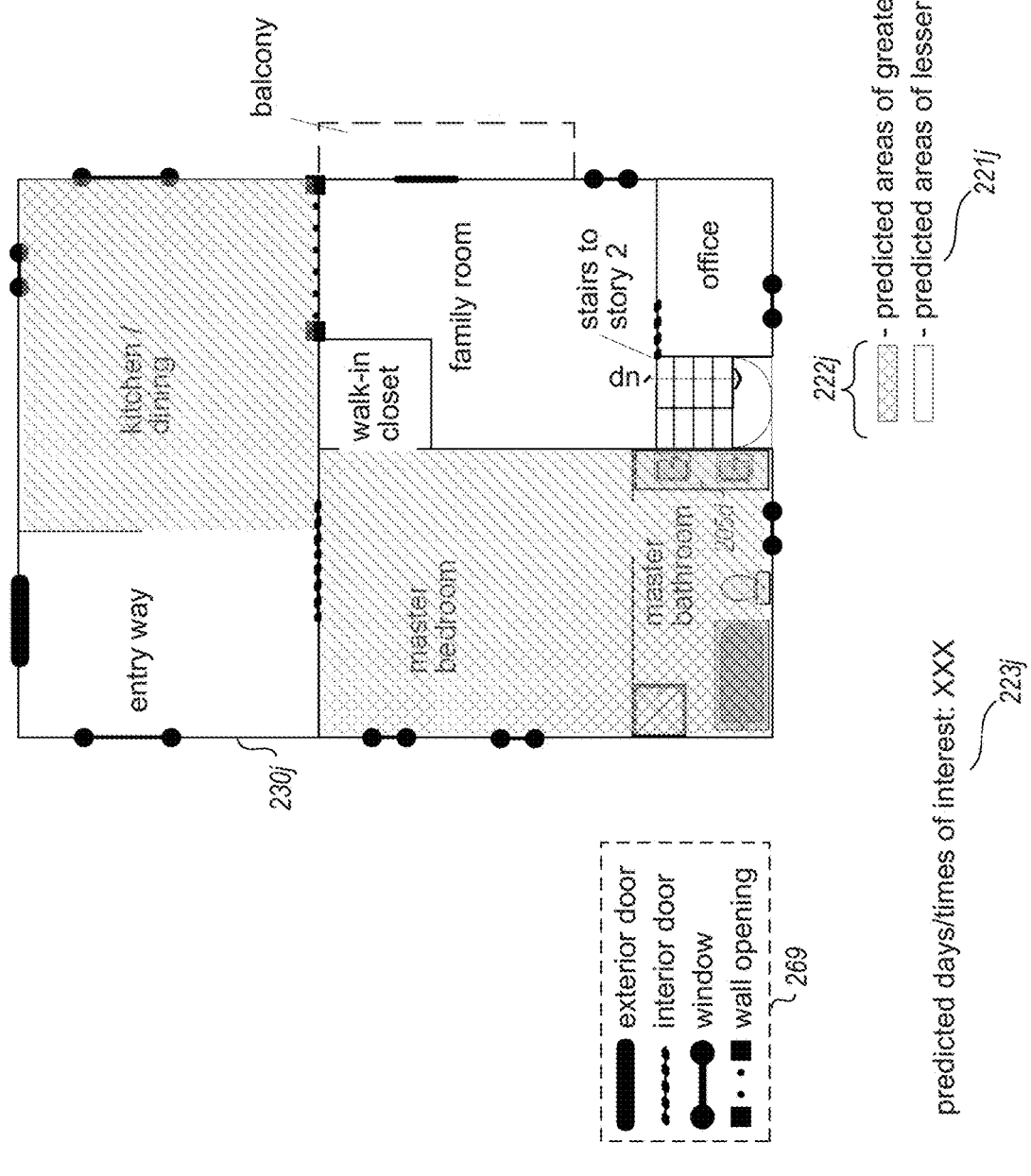

FIGS. 2I and 2J continue the examples of FIGS. 2E-2H, and illustrate information 260i and 260j, respectively to provide examples of a result of building visit information aggregation and analysis for building 198 from multiple visits by multiple user devices. In particular, in this example, FIG. 2I illustrates information 260i that includes an example 2D floor plan 230i of the first story of the building, which includes determined information 222i about movement flow pattern attributes for the building, as indicated using corresponding labels 221i, and with such information 222i optionally displayed on the floor plan (e.g., overlaid on the floor plan). In a similar manner, FIG. 2J provides additional information 260j that includes an example 2D floor plan 230j of a first story of another building for which aggregated building information of other buildings (including building 198) is used to predict information about the other building, which in this example includes predicted information 222j about rooms or other areas of the building that are predicted to be of greater or lesser interest to users who visit the other building, as indicated using corresponding labels 221j, and with information 223j about predicted times of interest for visiting the other building, and with such information 222j optionally displayed on the floor plan (e.g., overlaid on the floor plan). It will be appreciated that particular attributes about rooms and/or the building as a whole may be determined from analysis of such a floor plan and predicted in various manners, and that the types of information illustrated in FIGS. 2I-2J are non-exclusive examples provided for the purpose of illustration, such that similar and/or other types of information may be determined in other manners in other embodiments.

In one non-exclusive illustrative example embodiment, the BLTIPM system uses location-aware e technologies (e.g., Bluetooth beacons, near-field communication (NFC) tags, and visual markers that can be recognized via computer vision) placed in key locations throughout a house (e.g., by a seller of the house and/or associated users, such as seller's agents, other contracted people such as photographers, etc.), and a configured BLTIPM client application running on mobile phone users devices interprets these broadcasts and markers to determine their own relative location; optionally fusing them with other location tracking technologies (e.g. VIO/SLAM or GPS), and launching location-relevant experiences for users associated with the user devices (e.g., potential buyers, buyers' agents, etc.), as well as communicating information about the location and experience back to the BLTIPM system for analysis and presentation to sellers.

Buyer interactions enabled by such a BLTIPM system may include some or all of the following:
Displaying proactive notifications on a user's phone as they enter a house to begin a tour. Interacting with this notification would launch an app showing information about the house, including immediate access to the full listing and associated data and media.
Recording showings in a personal visit log "diary" for later reference, including any notes taken by the buyer.
On entering a house and proactively scanning signage (NFC, App Clip tag, QR code, or other visual or close-range EM marker), a user who had not installed or configured the relevant app or had not provided sufficient location-tracking permissions would be guided through an interactive experience (Apple App Clip, Android Instant App, or web page), to install, sign in, configure, and enable location permissions.
When entering a specific room or other area of the house, the user would be notified (or a running app would automatically display) the availability of augmented location-based information provided by the seller, which may include audio, text, photo, video, or other data. For instance, when approaching a window with a view, the user may be presented with an audio snippet giving the name of the mountain visible in the distance and an image showing the view in the autumn; the kitchen could provide details about a recent renovation; a kid's room could share an anecdote about a local school or park; a wiring panel could describe the modern wiring throughout the house; etc. This data could include both information explicitly associated with the location by the seller, as well as implicitly associated with corresponding areas based on automated operations of the BLTIPM system.

Seller interactions enabled by such a BLTIPM system may include some or all of the following:
Providing notification and timing information when a buyer has arrived at and begun or continued a tour of or other visit to the property.
Presenting traffic information showing which areas of a home potential buyers entered, spent time in, and interacted with associated media, together with corresponding information based on interaction with the virtual tour, displayed as a heat map or other visualization overlayed on the home's floor plan.
Predictions, based on past traffic information, of which areas of a soon-to-be-listed home will be most popular with buyers, or which days and times of day the home will get the most traffic, etc.

In addition, privacy of buyers is protected in at least some embodiments by one or more of the following:
Buyers acting to opt-in to the process by providing location tracking permissions on their mobile device.
Anonymization of individual buyer identities (e.g., except where the seller already knew the identity of the buyer via a property showing management system).
No collection of or association with audio or video information through microphones or cameras.

As examples of operations of the BLTIPM system in particular situations, when a buyer arrives at a property, an NFC tag integrated into the lockbox could optionally allow the buyer to launch the BLTIPM client application to verify their credentials and provide immediate access to the lockbox or automated electronic lock. This would indicate their presence and start of the tour, as well as allowing enhanced lock box security. If the relevant mobile BLTIPM client application was not installed, this NFC tag could show an interactive experience (such as an App Clip, Instant App, or web page) and guide the buyer to install and sign into the app. A location-aware beacon (e.g., using BLE) would be installed near the front door, broadcasting identifiers for the relevant app as well as a secondary identifier currently associated with the specific property (but which could be remapped to a different property at a later time). When a buyer who has previously installed the BLTIPM client application and provided the relevant device-level permissions approaches the house, the buyer's mobile device would detect this beacon and activate the BLTIPM client application in the background, which in turn would register the buyer's presence with the BLTIPM system as well as display a notification to the user. By tapping this notification, the BLTIPM client application would be presented, and the user would be shown building information such as the home listing, and be prompted to activate other location-specific features such as adding an entry to a personal touring diary or communicating with an agent. A beacon and NFC tag installed at an exterior location (e.g., a mailbox, "for sale" sign, etc.) could provide a similar experience with enhanced privacy, allowing passers-by not scheduled for a showing to easily view building information (e.g., the listing, a virtual tour, etc.) and/or schedule a showing.

Upon entering the house, a sign may prompt a user to "scan to begin a tour". This sign, which includes some or all of an NFC tag, visual App Clip marker, and visual QR code, would allow a user who had either not installed the BLTIPM client application or not provided location tracking permissions to install the BLTIPM client application and enable permissions or alter configurations. By scanning this sign, an interactive experience would be shown (e.g., App Clip, Instant App, or web page), guiding the user through these activation steps as needed. After completing these steps, the BLTIPM client application would inform the server and seller that a tour had begun. Beacons placed in various preselected rooms would be broadcasting identifiers for the app; the property; and unique areas within the property. Before the tour, the seller would have associated each with one or more augmented pieces of building information media (e.g., audio recordings, text snippets, photos, videos, etc.) and/or a corresponding area in a virtual tour. As the buyer moved through the house, their mobile device would detect each beacon and inform the app of the associated identifiers and range to the beacon, and the app would record this information for submission to the server as traffic data, associated with the set of ranges and triangulated approximate position of the user. When this range fell below a certain limit for a given beacon, the app would notify the user of the name of the area they had entered and the availability of augmented media, and upon interaction show this augmented media to the user, or display the virtual tour with an active context of the associated room. The app would optionally utilize local tracking while active, such as VIO/SLAM (e.g. via ARKit/ARCore) and/or GPS tracking, such as to more precisely monitor the location of the phone and utilize more precise positioning and provide an augmented showing experience utilizing data and visualization depending on this high-precision location, such as AR-style camera overlays.

It will be appreciated that the invention is not limited to the details of this example illustrative embodiment, and that other embodiments may differ in various respects from the details of this example illustrative embodiment. Similarly, various details have been provided with respect to FIGS. 2A-2J, but it will be appreciated that the provided details are non-exclusive examples included for illustrative purposes, and other embodiments may be performed in other manners without some or all such details.

Figure 3:
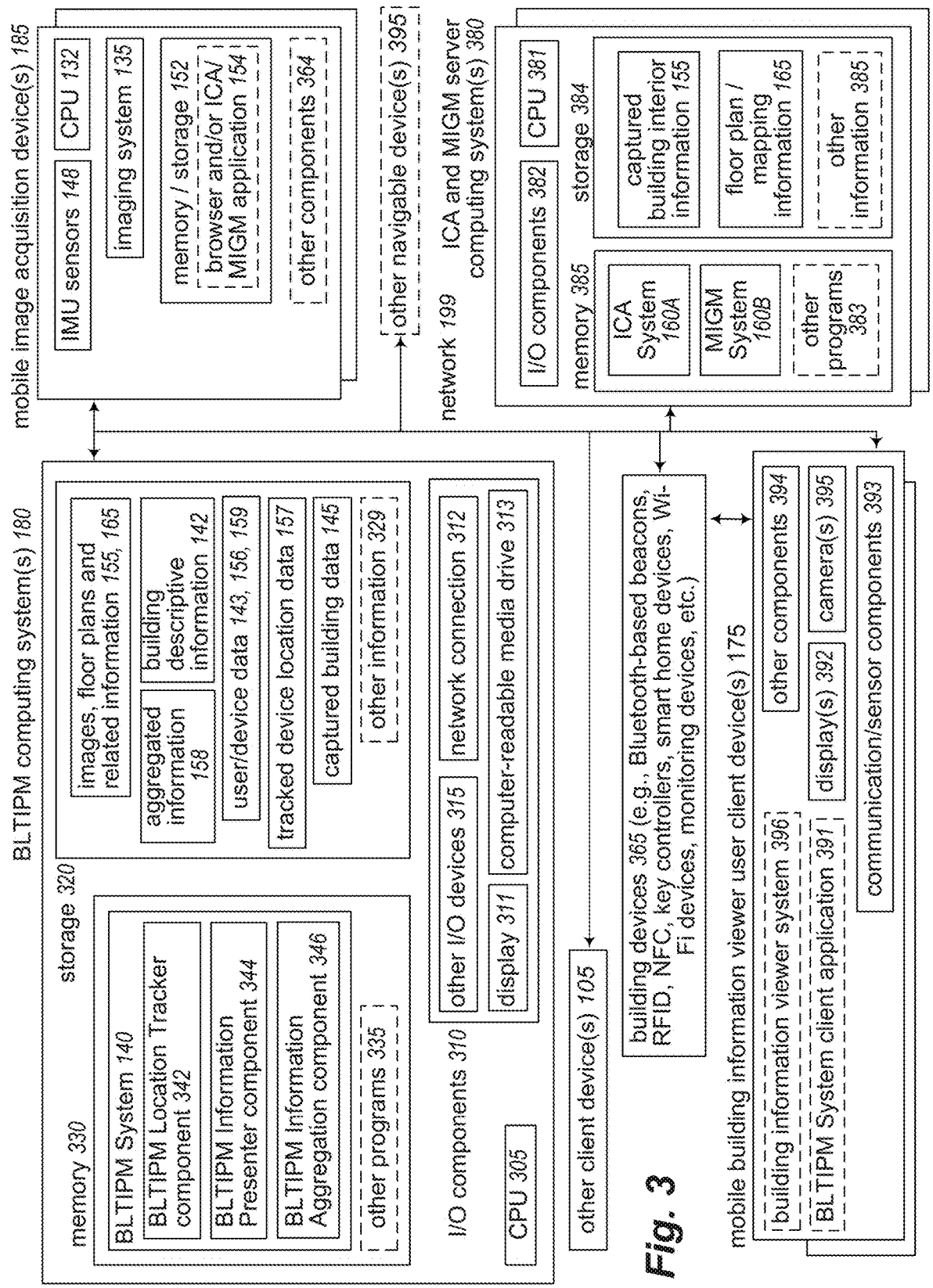
FIG. 3 is a block diagram illustrating computing systems and devices suitable for executing an embodiment of a system that performs at least some of the techniques described in the present disclosure.

FIG. 3 is a block diagram illustrating an embodiment of one or more computing systems 180 executing an implementation of a BLTIPM system 140 (e.g., in a manner analogous to that of FIG. 1A), and one or more server computing systems 380 executing an implementation of an ICA system 160A and an MIGM system 160B—the computing system(s) 180 and BLTIPM systems, and/or computing system(s) 380 and/or ICA and MIGM systems, may be implemented using a plurality of hardware components that form electronic circuits suitable for and configured to, when in combined operation, perform at least some of the techniques described herein. One or more computing systems and devices may optionally be executing a BLTIPM system client application 391 and/or other building information viewer system 396 (such as each mobile device 175) and/or optional other programs 335 and 383 (such as server computing system(s) 180 and 380, respectively, in this example). In the illustrated embodiment, each server computing system 180 includes one or more hardware central processing units ("CPUs") or other hardware processors 305, various input/output ("I/O") components 310, storage 320, and memory 330, with the illustrated I/O components including a display 311, a network connection 312, a computer-readable media drive 313, and other I/O devices 315 (e.g., keyboards, mice or other pointing devices, microphones, speakers, GPS receivers, etc.). Each server computing system 380 may have similar components, although only one or more hardware processors 381, memory 385, storage 384 and I/O components 382 are illustrated in this example for the sake of brevity.

The server computing system(s) 180 and executing BLTIPM system 140, and server computing system(s) 380 and executing ICA and MIGM systems 160A and 160B, and mobile devices 175 and executing software 391 and/or 396 may communicate with each other and with other computing systems and devices in this illustrated embodiment, such as via one or more networks 199 (e.g., the Internet, one or more cellular telephone networks, etc.), including to interact with mobile image acquisition devices 185 (e.g., used to acquire images and/or other information for buildings or other environments to be modeled, such as in a manner analogous to FIG. 1A), and/or optionally other navigable devices 395 that receive and use floor plans and optionally other generated information for navigation purposes (e.g., for use by semi-autonomous or fully autonomous vehicles or other devices). The mobile devices 175 in this example embodiment are illustrated as including one or more cameras 395 to capture target images in surrounding buildings (not shown), one or more displays 392 on which to present provide building information from the BLTIPM system, optionally other communication and/or sensor components (e.g., to receive transmissions from transmitter devices 365 and/or to otherwise communicate with other building devices 365, such as electronic lockboxes or locks, smart home devices, etc.), and other components 394 (e.g., computing resources, I/O components, etc.). In other embodiments, some of the described functionality may be combined in less computing systems, such as to combine some or all of the BLTIPM system 140 with a BLTIPM system client application 391 and/or other building information viewer system 396 in a single system or device (e.g., a mobile device 175), to combine the BLTIPM system 140 and the image acquisition functionality of device(s) 185 in a single system or device, to combine the ICA and MIGM systems 160A and 160B and the image acquisition functionality of device(s) 185 in a single system or device, to combine the BLTIPM system 140 and one or both of the ICA and MIGM systems 160A and 160B in a single system or device, to combine the BLTIPM system 140 and the ICA and MIGM systems 160A and 160B and the image acquisition functionality of device(s) 185 in a single system or device, etc.

In the illustrated embodiment, an embodiment of the BLTIPM system 140 executes in memory 330 of the server computing system(s) 180 in order to perform at least some of the described techniques, such as by using the processor(s) 305 to execute software instructions of the system 140 in a manner that configures the processor(s) 305 and computing system 180 to perform automated operations that implement those described techniques. The illustrated embodiment of the BLTIPM system may include one or more components, such as a BLTIPM Location Tracker component 342 (e.g., to provide functionality related to tracking locations of user devices, such as to correspond to blocks 462 and 467 of routine 400 of FIGS. 4A-4B), and/or a BLTIPM Information Presenter component 344 (e.g., to provide functionality related to presenting or otherwise providing building information to user devices and further interactions with the user devices, such as to correspond to blocks 462 and 472 of routine 400 of FIGS. 4A-4B), and/or a BLTIPM Information Aggregation component 346 (e.g., to provide functionality related to aggregating and using building visit information, such as to correspond to blocks 477-479 of routine 400 of FIGS. 4A-4B), such as to each perform portions of the functionality of the BLTIPM system, and the memory may further optionally execute one or more other programs 335—as one specific example, a copy of the ICA and/or MIGM systems may execute as one of the other programs 335 in at least some embodiments, such as instead of or in addition to the ICA and/or MIGM systems 160A and 160B on the server computing system(s) 180, and/or a copy of a building information viewer system may execute as one of the other programs 335 (e.g., if the computing system(s) 180 are the same as a mobile device 175). The BLTIPM system 140 may further, during its operation, store and/or retrieve various types of data on storage 320 (e.g., in one or more databases or other data structures), such as various types of user/device data 143 and/or 156 and/or 159, images and floor plans and other associated information 155 and/or 165 (e.g., generated and saved 2.5D and/or 3D models, building and room dimensions for use with associated floor plans, additional images and/or annotation information, etc.), building descriptive information 142 (e.g., determined building attributes, generated attribute descriptions, generated building descriptions, etc.), captured building data 145 (e.g., received from one or more mobile devices 175), tracked device location data 157 (e.g., for one or more user devices 175), aggregated information 158, and/or various types of optional other information 329 (e.g., various analytical information related to presentation or other use of one or more building interiors or other environments).

In addition, embodiments of the ICA and MIGM systems 160A and 160B execute in memory 385 of the server computing system(s) 380 in the illustrated embodiment in order to perform techniques related to generating panorama images and floor plans for buildings, such as by using the processor(s) 381 to execute software instructions of the systems 160A and/or 160B in a manner that configures the processor(s) 381 and computing system(s) 380 to perform automated operations that implement those techniques. The illustrated embodiment of the ICA and MIGM systems may include one or more components, not shown, to each perform portions of the functionality of the ICA and MIGM systems, respectively, and the memory may further optionally execute one or more other programs 383. The ICA and/or MIGM systems 160A and 160B may further, during operation, store and/or retrieve various types of data on storage 384 (e.g., in one or more databases or other data structures), such as video and/or image information 165 acquired for one or more buildings (e.g., 360° video or images for analysis to generate floor plans, to provide to users of client computing devices 175 for display, etc.), floor plans and/or other generated mapping information 155, and optionally other information 385 (e.g., additional images and/or annotation information for use with associated floor plans, building and room dimensions for use with associated floor plans, various analytical information related to presentation or other use of one or more building interiors or other environments, etc.)—while not illustrated in FIG. 3, the ICA and/or MIGM systems may further store and use additional types of information, such as about other types of building information to be analyzed and/or provided to the BLTIPM system, about ICA and/or MIGM system operator users and/or end-users, etc.

Some or all of the mobile devices 175, mobile image acquisition devices 185, optional other navigable devices 395, other client devices 105 and other computing systems (not shown) may similarly include some or all of the same types of components illustrated for server computing system 180. As one non-limiting example, the mobile image acquisition devices 185 are each shown to include one or more hardware CPU(s) 132, memory and/or storage 152, one or more imaging systems 135, IMU hardware sensors 148 (e.g., for use in acquisition of video and/or images, associated device movement data, etc.), and other components 364. In the illustrated example, zero or one or both of a browser and one or more client applications 154 (e.g., an application specific to the ICA system and/or to the MIGM system) are executing in memory 152, such as to participate in communication with the BLTIPM system 140, ICA system 160A, MIGM system 160B and/or other computing systems. While particular components are not illustrated for the other navigable devices 395 or other computing devices/systems 105, it will be appreciated that they may include similar and/or additional components.

It will also be appreciated that computing systems 180 and 380 and 175 and the other systems and devices included within FIG. 3 are merely illustrative and are not intended to limit the scope of the present invention. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smartphones and other cell phones, consumer electronics, wearable devices, digital music player devices, handheld gaming devices, PDAs, wireless phones, Internet appliances, and various other consumer products that include appropriate communication capabilities. In addition, the functionality provided by the illustrated BLTIPM system 140 may in some embodiments be distributed in various components, some of the described functionality of the BLTIPM system 140 may not be provided, and/or other additional functionality may be provided.

It will also be appreciated that, while various items are illustrated as being stored in memory or on storage while being used, these items or portions of them may be transferred between memory and other storage devices for purposes of memory management and data integrity. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the BLTIPM system 140 executing on server computing systems 180, by a BLTIPM client application or other building information viewer system executing on mobile devices 175 or other computing systems/devices, etc.) and/or data structures, such as by execution of software instructions of the one or more software programs and/or by storage of such software instructions and/or data structures, and such as to perform algorithms as described in the flow charts and other disclosure herein. Furthermore, in some embodiments, some or all of the systems and/or components may be implemented or provided in other manners, such as by consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4A:
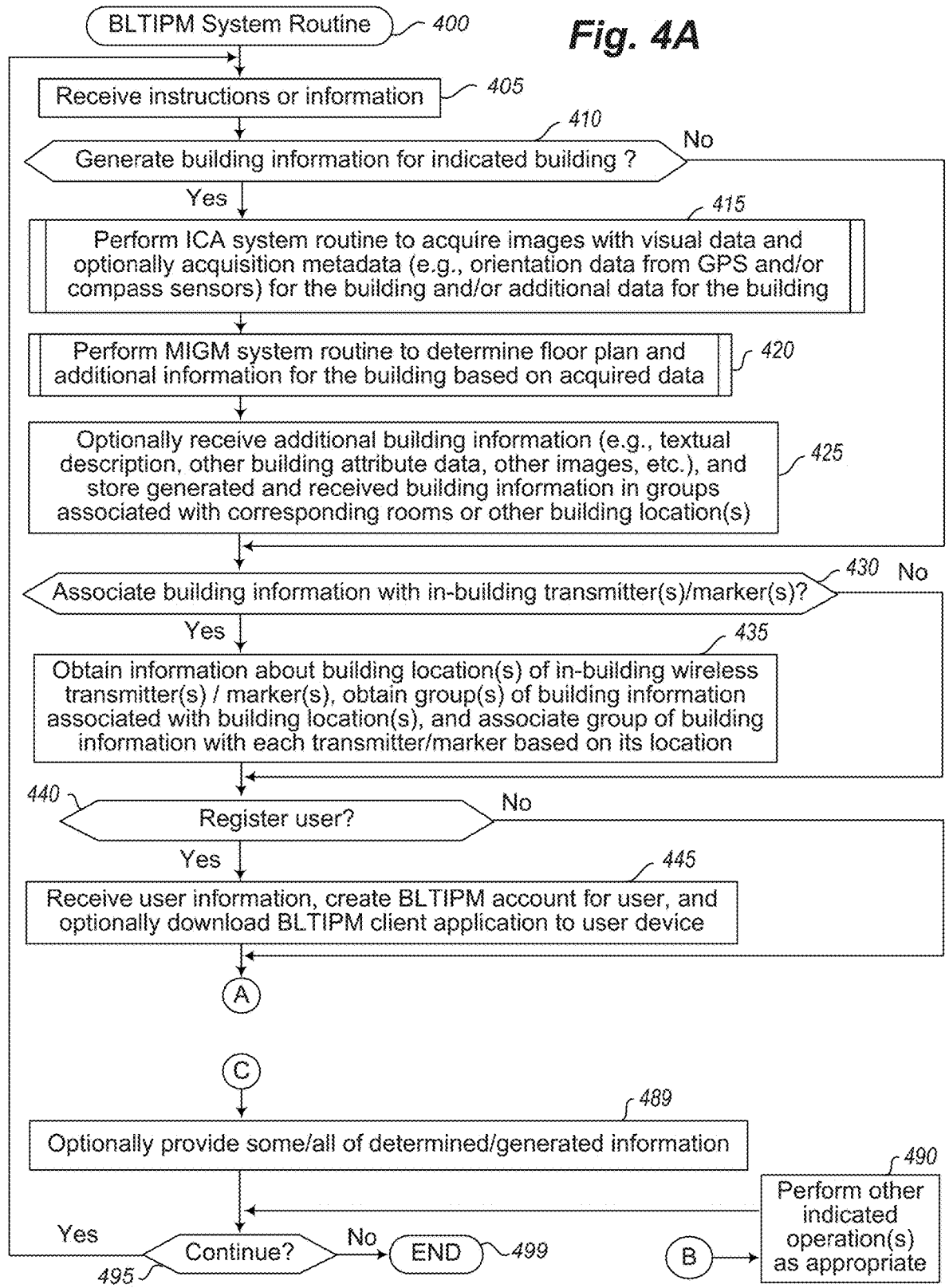

FIGS. 4A-4B illustrate an example embodiment of a flow diagram for a Building Location Tracking and Information Presentation Manager (BLTIPM) system routine in accordance with an embodiment of the present disclosure. The routine may be performed by, for example, execution of the BLTIPM system 140 of FIGS. 1A and/or 3, and/or a BLTIPM system as described with respect to FIGS. 2E-2J and elsewhere herein, such as to perform automated operations related to providing location-related functionality involving user devices moving through buildings, such as to automatically track locations of the user devices during temporary visits to a building, to automatically use building information to provide location-related navigation functionality and/or other information to those user devices, and to automatically determine and use aggregated information about tracked locations of activities of user devices in a building. In the example embodiment of FIGS. 4A-4B, the indicated buildings may be houses or other types of buildings, and various types of information may be provided or otherwise used in particular manners, but in other embodiments, other types of buildings and information uses may be provided and used, as discussed elsewhere herein.

The illustrated embodiment of the routine begins at block 405, where instructions or information are received. The routine continues to block 410, where it determines if the instructions or other information received in block 405 indicate to generate building information for use with an indicated building, and if not continues to block 430. Otherwise, the routine continues to block 415 to perform the ICA system routine to acquire images with visual data and optionally acquisition metadata (e.g., orientation data and other pose data) for the building and/or other data for the building, and to receive the results from the routine—one example of such an ICA system routine is discussed further with respect to FIG. 5. After block 415, the routine continues to block 420 to perform the MIGM system routine to determine floor plan information and additional information about the building and its attributes based at least in part on the data acquired by the ICA system routine, and to receive the results from the routine—one example of such an MIGM system routine as discussed further with respect to FIGS. 6A-6B. After block 420, the routine continues to block 425, where it optionally receives additional building information of one or more types (e.g., textual description information, other building attribute data, other images or types of captured data in or around the building, etc.) and stores the generated and received building information in groups associated with corresponding rooms or other building areas or locations.

After block 425, the routine continues to block 430 to determine whether the instructions or other information received in block 405 indicate to associate building information with transmitter devices and/or visual markers at the building, and if so continues to block 435, where it obtains information about the building locations of the transmitter devices and/or visual markers, obtains groups of building information associated with building locations, and associates one or more of the groups of building information with each of the transmitter devices and/or visual markers, or optionally to associate other types of information with one or more visual markers (e.g., for downloading a copy of the BLTIPM client application to a user device). After block 435, or if it is instead determined in block 430 that the instructions or other information received in block 405 are not to associate building information with transmitter devices and/or visual markers, the routine continues to block 440 to determine whether the instructions or other information in block 405 indicate to register a user and/or user device with the BLTIPM system. If so, the routine continues to block 445, where it receives information about the user and/or user device, creates a corresponding BLTIPM system account for the user and/or user device, and optionally downloads a copy of the BLTIPM client application to the user device for subsequent use.

After block 445, or if it is instead determined in block 440 that the instructions or other information received in block 405 are not to register a user or user device, the routine continues to block 450 to determine whether the instructions or other information received in block 405 are a notification from an electronic lock or electronic lockbox of an open or close event, and if so continues to block 455. In block 455, the routine receives the notification, begins or ends a corresponding building visit log (e.g., for an associated user device or user if known, or temporarily anonymous if not until such an identification is made), sends a notification message to the user device (if known) at the beginning of a building visit to initiate use of the BLTIPM client application during the visit, and optionally notifies one or more recipients associated with the building of the beginning and/or end of the visit. After block 455, or if it is instead determined in block 450 that the instructions or other information received in block 405 are not an open or close notification from an electronic lock or lockbox, the routine continues instead to block 460, where it determines if the instructions or other information received in block 405 are an indication from a user device of an in-range transmitter device or visual marker (e.g., based on receipt by the user device of a transmission from the transmitter device or other acquisition of data from the visual marker), and if so continues to block 462. In block 462, the routine receives an identifier or other indication of the transmitter device or visual marker, retrieves building information associated with the transmitter device and/or visual marker and sends it to the user device for use by the BLTIPM client application (optionally with a notification message to the user device to access the client application), determines and stores device location information and optionally corresponding activity information for the user device and/or associated user (e.g., viewing of and/or interacting with particular provided building information, capturing of data in the building, providing of user-supplied information for storage and later access, etc.) in the building visit log based at least in part on the current transmitter device and/or visual marker (including to associate a previously anonymous started building visit log with the user device and/or user, such as based on recency of a corresponding prior notification from electronic lock box and/or lock), and to optionally notify one or more recipients associated with the building if the transmitter device and/or visual marker interaction corresponds to the beginning or end of a visit.

After block 462, or if it is instead determined in block 460 that the instructions or other information received in block 405 are not an indication from a user device of an interaction with a transmitter device and/or visual marker, the routine continues instead to block 465 to determine if the instructions or other information received in block 405 are another type of indication of a location of the user device in the building (e.g., based on GPS data, other actions of the user device to determine its location in a room or otherwise in the building, etc.), and if so continues to block 467 to store information about the device location in the building visit log for the user device and/or associated user. After block 467, or if it is instead determined in block 465 that the instructions or other information received in block 405 are not another indication of user device building location, the routine continues instead to block 470 to determine if the instructions or other information received in block 405 include user-supplied information about the building, and if so continues to block 472 to receive and store the user-supplied information in a building visit log for the user device and/or associated user.

After block 472, or if it is instead determined in block 470 that the instructions or other information received in block 405 are not for user-supplied information, the routine continues instead to block 475, where it determines if the instructions or other information received in block 405 indicate to aggregate building visit information (e.g., at the end of each building visit, at predetermined times, if other criteria are satisfied such as a quantity or other measure of building visit log information being available, etc.) and if so continues to block 477. In block 477, the routine receives an indication of a building and/or of a user device or associated user, retrieves building visit logs for the indicated building or for the indicated user device and/or associated user, and aggregates and analyzes the retrieved building visit logs. The analysis may include, for example, determining aggregated information about the building (optionally in an anonymized format that lacks details about any of the individual user devices and/or associated users that participate in the visits), such as one or more of the following non-exclusive example types of information: movement patterns; areas of interest and/or disinterest, such as for use in generating heat map visualizations; average visit length and/or other statistical representations of the aggregated visits; etc., and the routine may further optionally store the aggregated information with other building information and associate it with transmitter devices and/or visual markers in the building and/or provide some or all of the aggregated information to recipients associated with one or more of the buildings and/or to other recipients. Alternatively, the analysis may include, for example, determining aggregated information for a particular user device and/or associated user, such as one or more of building types and/or rooms or other areas or location of interest and/or disinterest to the user, average visit length, other statistical representations of the aggregated visits, etc., and the routine may further optionally store the aggregated information for later use and/or provide some or all of the aggregated information to the user device and/or user or to another recipient. After block 477, the routine continues to block 479, where it optionally uses the aggregated building information for one or more buildings to generate predicted data for one or more other buildings (e.g., areas of likely interest or disinterest, times of likely interest for visits, etc.), and/or uses the aggregated visit information for one or more user devices and/or associated users to generate predicted data related to those user devices and/or associated users (e.g., building types and/or rooms or other areas or locations of likely interest or disinterest, times of likely interest for visits, etc.), and optionally provides some or all of the predicted data to one or more recipients for further use or otherwise takes related actions for the other buildings. After block 479, the routine continues to block 489, where it optionally provides some or all of the determined and/or generated information for the routine to one or more recipients.

If it is instead determined in block 475 that the instructions or other information received in block 405 are not to generate aggregated visit information, the routine continues instead to block 490 to perform one or more other indicated operations as appropriate. Such other indicated operations may include, for example, one or more of the following non-exclusive examples: receiving and storing (or otherwise determining) information about locations of particular transmitter devices and/or visual markers; determining suggested locations for transmitter devices and/or visual markers and optionally directing placement of those devices and/or visual markers at those locations; analyzing building information that does not have an associated location to determine a location with which to associate the information; updating information for transmitter devices and/or receiving and storing information about buildings and/or user devices and/or users for later use; retrieving and providing information from a BLTIPM system account for a user device and/or associated user to that device or user; etc.

After blocks 489 or 490, the routine continues to block 495 to determine whether to continue, such as until an explicit indication to terminate is received, or instead only if an explicit indication to continue is received If it is determined to continue, the routine returns to block 405 to await additional instructions or other information, and otherwise continues to block 499 and ends.

While not illustrated with respect to the automated operations shown in the example embodiment of FIGS. 4A-4B, in some embodiments human users may further assist in facilitating some of the operations of the BLTIPM system, such as for operator users and/or end-users of the BLTIPM system to provide input of one or more types that is further used in subsequent automated operations. As non-exclusive examples, such human users may provide input of one or more types, such as to provide input to assist with the identification of objects and/or other attributes from analysis of images, floor plans and/or other building information, etc. Additional details are included elsewhere herein regarding embodiments in which human user(s) provide input used in additional automated operations of the BLTIPM system.

Figure 5:
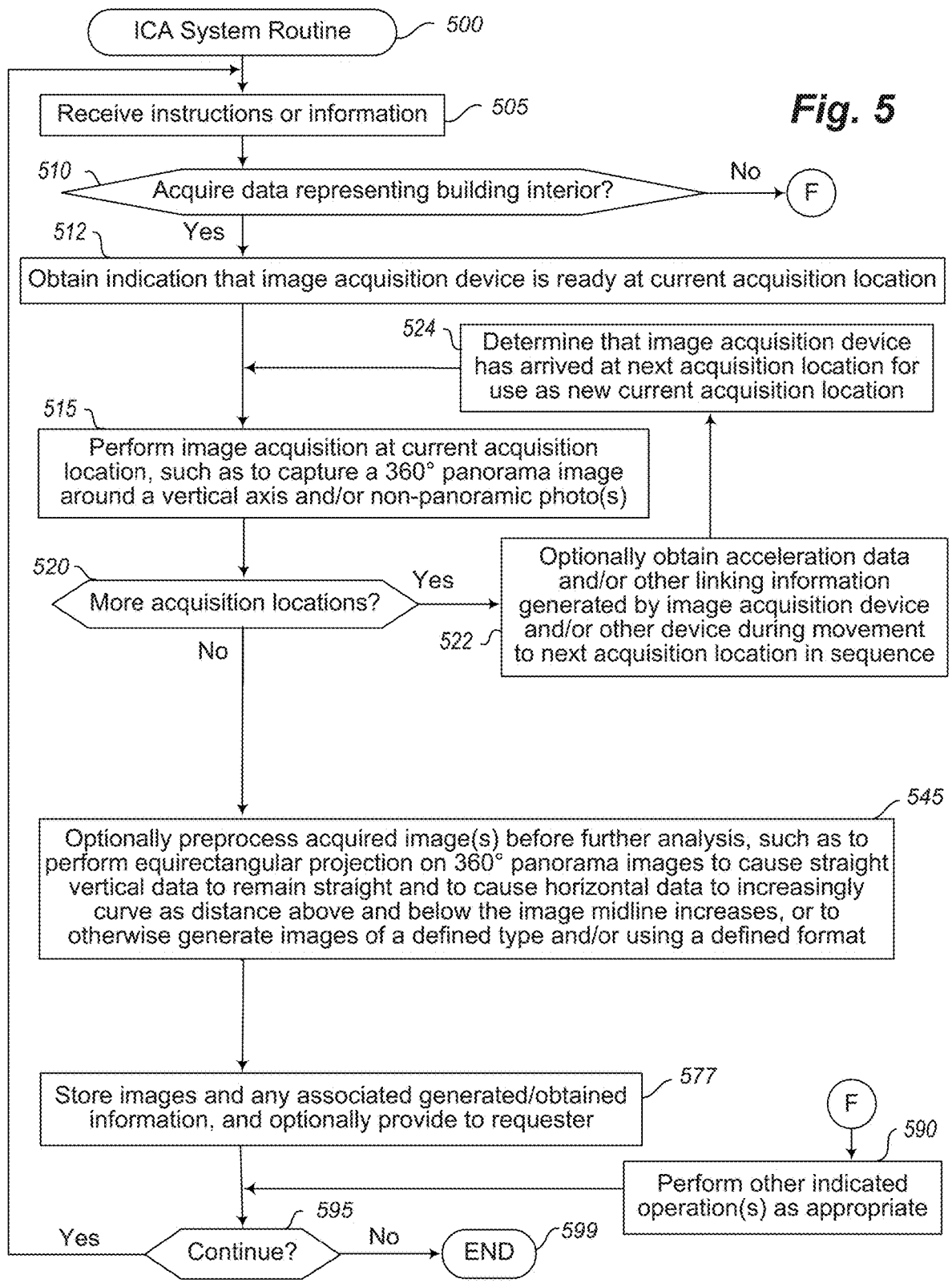
FIG. 5 illustrates an example embodiment of a flow diagram for an Image Capture and Analysis (ICA) system routine in accordance with an embodiment of the present disclosure.

FIG. 5 illustrates an example flow diagram of an embodiment of an ICA (Image Capture & Analysis) system routine 500. The routine may be performed by, for example, the ICA system 160/160A of FIGS. 1A and 3, and/or an ICA system as described with respect to FIGS. 2A-2D and elsewhere herein, such as to acquire 360° panorama images and/or other images at acquisition locations within buildings or other structures, such as for use in subsequent generation of related floor plans and/or other mapping information. While portions of the example routine 500 are discussed with respect to acquiring particular types of images at particular acquisition locations, it will be appreciated that this or a similar routine may be used to acquire video (with video frame images) and/or other data (e.g., audio), whether instead of or in addition to such panorama images or other perspective images. In addition, while the illustrated embodiment acquires and uses information from the interior of a target building, it will be appreciated that other embodiments may perform similar techniques for other types of data, including for non-building structures and/or for information external to one or more target buildings of interest (e.g., on a property on which a target building is located, such as to show yards, decks, patios, accessory structures, etc.). Furthermore, some or all of the routine may be executed on a mobile device used by a user to acquire image information, and/or by a system remote from such a mobile device. In at least some embodiments, the routine 500 may be invoked from block 415 of routine 400 of FIGS. 4A-4B, with corresponding information from routine 500 provided to routine 400 as part of implementation of that block 415, and with processing control returned to routine 400 after blocks 577 and/or 599 in such situations—in other embodiments, the routine 400 may proceed with additional operations in an asynchronous manner without waiting for such processing control to be returned (e.g., to proceed with other processing activities while waiting for the corresponding information from the routine 500 to be provided to routine 400).

The illustrated embodiment of the routine begins at block 505, where instructions or information are received. At block 510, the routine determines whether the received instructions or information indicate to acquire visual data and/or other data representing a building interior (optionally in accordance with supplied information about one or more additional acquisition locations and/or other guidance acquisition instructions), and if not continues to block 590. Otherwise, the routine proceeds to block 512 to receive an indication to begin the image acquisition process at a first acquisition location (e.g., from a user of a mobile image acquisition device that will perform the acquisition process). After block 512, the routine proceeds to block 515 in order to perform acquisition location image acquisition activities for acquiring a 360° panorama image for the acquisition location in the interior of the target building of interest, such as via one or more fisheye lenses and/or non-fisheye rectilinear lenses on the mobile device and to provide horizontal coverage of at least 360° around a vertical axis, although in other embodiments other types of images and/or other types of data may be acquired. As one non-exclusive example, the mobile image acquisition device may be a rotating (scanning) panorama camera equipped with a fisheye lens (e.g., with 180° of horizontal coverage) and/or other lens (e.g., with less than 180° of horizontal coverage, such as a regular lens or wide-angle lens or ultrawide lens or macro lens). The routine may also optionally obtain annotation and/or other information from the user regarding the acquisition location and/or the surrounding environment, such as for later use in presentation of information regarding that acquisition location and/or surrounding environment.

After block 515 is completed, the routine continues to block 520 to determine if there are more acquisition locations at which to acquire images, such as based on corresponding information provided by the user of the mobile device and/or received in block 505—in some embodiments, the ICA routine will acquire only a single image and then proceed to block 577 to provide that image and corresponding information (e.g., to return the image and corresponding information to the BLTIPM system and/or MIGM system for further use before receiving additional instructions or information to acquire one or more next images at one or more next acquisition locations). If there are more acquisition locations at which to acquire additional images at the current time, the routine continues to block 522 to optionally initiate the capture of linking information (e.g., acceleration data) during movement of the mobile device along a travel path away from the current acquisition location and towards a next acquisition location within the building interior. The captured linking information may include additional sensor data (e.g., from one or more IMU, or inertial measurement units, on the mobile device or otherwise carried by the user) and/or additional visual information (e.g., images, video, etc.) recorded during such movement. Initiating the capture of such linking information may be performed in response to an explicit indication from a user of the mobile device or based on one or more automated analyses of information recorded from the mobile device. In addition, the routine may further optionally monitor the motion of the mobile device in some embodiments during movement to the next acquisition location, and provide one or more guidance cues (e.g., to the user) regarding the motion of the mobile device, quality of the sensor data and/or visual information being captured, associated lighting/environmental conditions, advisability of capturing a next acquisition location, and any other suitable aspects of capturing the linking information. Similarly, the routine may optionally obtain annotation and/or other information from the user regarding the travel path, such as for later use in presentation of information regarding that travel path or a resulting inter-panorama image connection link. In block 524, the routine determines that the mobile device has arrived at the next acquisition location (e.g., based on an indication from the user, based on forward movement of the mobile device stopping for at least a predefined amount of time, etc.), for use as the new current acquisition location, and returns to block 515 to perform the acquisition location image acquisition activities for the new current acquisition location.

Figure 6A:
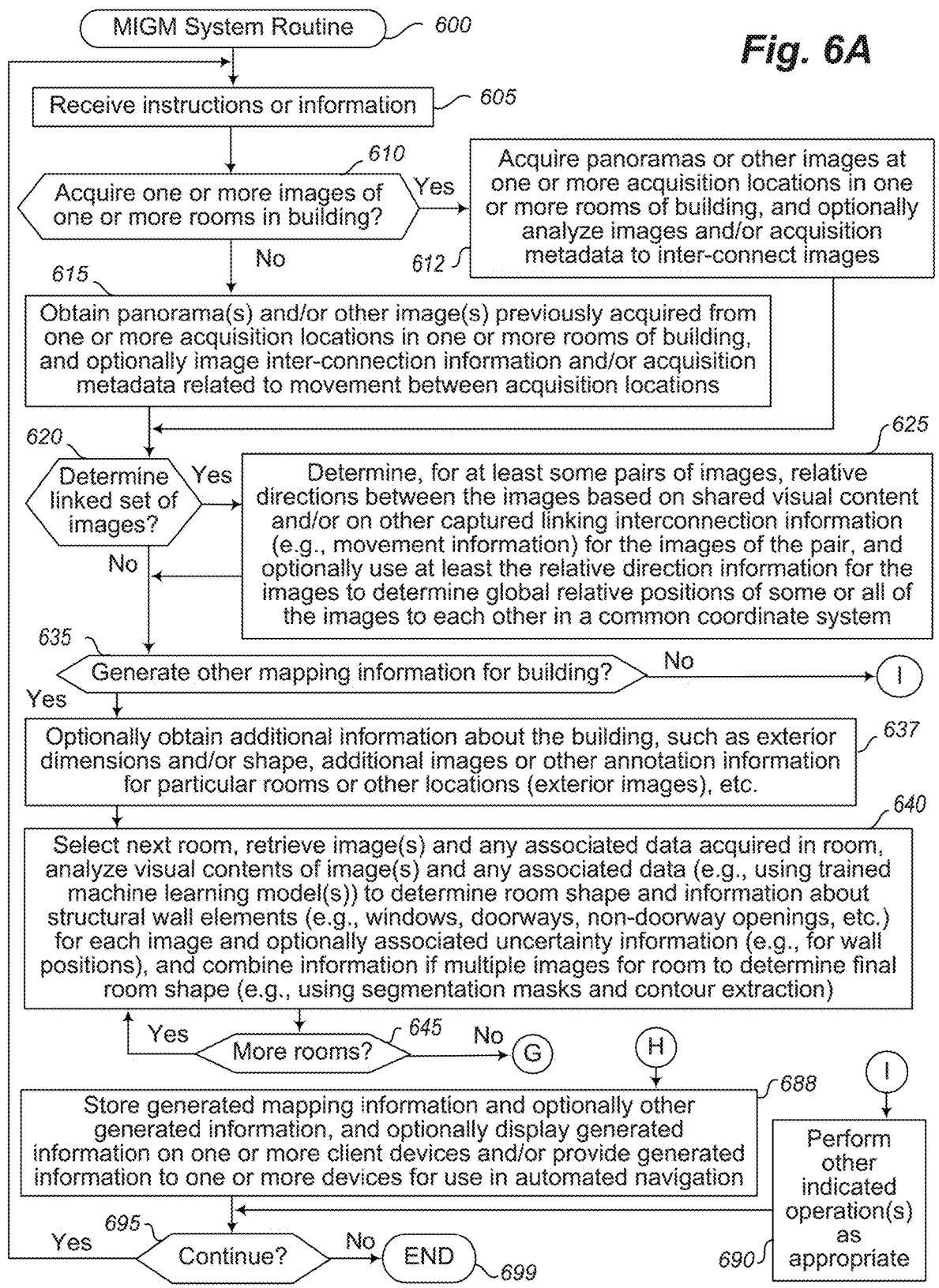
FIGS. 6A-6B illustrate an example embodiment of a flow diagram for a Mapping Information Generation Manager (MIGM) system routine in accordance with an embodiment of the present disclosure.
Figure 6B:
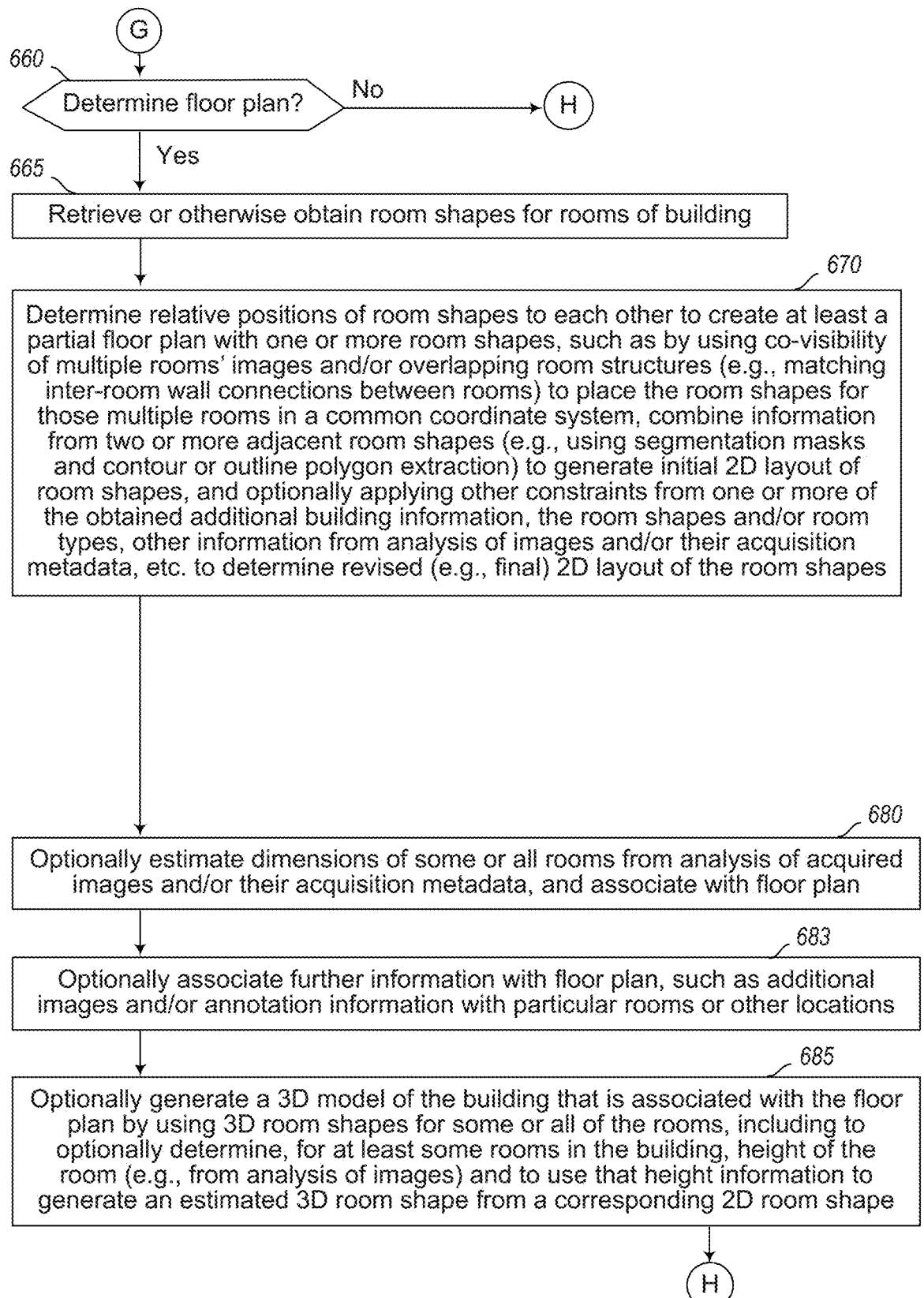

If it is instead determined in block 520 that there are not any more acquisition locations at which to acquire image information for the current building or other structure at the current time, the routine proceeds to block 545 to optionally preprocess the acquired 360° panorama images before their subsequent use (e.g., for generating related mapping information, for providing information about structural elements or other objects of rooms or other enclosing areas, etc.), such as to produce images of a particular type and/or in a particular format (e.g., to perform an equirectangular projection for each such image, with straight vertical data such as the sides of a typical rectangular door frame or a typical border between 2 adjacent walls remaining straight, and with straight horizontal data such as the top of a typical rectangular door frame or a border between a wall and a floor remaining straight at a horizontal midline of the image but being increasingly curved in the equirectangular projection image in a convex manner relative to the horizontal midline as the distance increases in the image from the horizontal midline). In block 577, the images and any associated generated or obtained information is stored for later use, and optionally provided to one or more recipients (e.g., to block 430 of routine 400 if invoked from that block)—FIGS. 6A-6B illustrate one example of a routine for generating a floor plan representation of a building interior from the generated panorama information.

If it is instead determined in block 510 that the instructions or other information received in block 505 are not to acquire images and other data representing a building interior, the routine continues instead to block 590 to perform any other indicated operations as appropriate, such as to configure parameters to be used in various operations of the system (e.g., based at least in part on information specified by a user of the system, such as a user of a mobile device who captures one or more building interiors, an operator user of the ICA system, etc.), to respond to requests for generated and stored information (e.g., to identify one or more groups of inter-connected linked panorama images each representing a building or part of a building that match one or more specified search criteria, one or more panorama images that match one or more specified search criteria, etc.), to generate and store inter-panorama image connections between panorama images for a building or other structure (e.g., for each panorama image, to determine directions within that panorama image toward one or more other acquisition locations of one or more other panorama images, such as to enable later display of an arrow or other visual representation with a panorama image for each such determined direction from the panorama image to enable an end-user to select one of the displayed visual representations to switch to a display of the other panorama image at the other acquisition location to which the selected visual representation corresponds), to obtain and store other information about users of the system, to perform any housekeeping tasks, etc.

Following blocks 577 or 590, the routine proceeds to block 595 to determine whether to continue, such as until an explicit indication to terminate is received, or instead only if an explicit indication to continue is received. If it is determined to continue, the routine returns to block 505 to await additional instructions or information, and if not proceeds to block 599 and ends.

While not illustrated with respect to the automated operations shown in the example embodiment of FIG. 5, in some embodiments human users may further assist in facilitating some of the operations of the ICA system, such as for operator users and/or end-users of the ICA system to provide input of one or more types that is further used in subsequent automated operations. As non-exclusive examples, such human users may provide input of one or more types as follows: to provide input to assist with determination of acquisition locations, such as to provide input in blocks 512 and/or 524 that is used as part of the automated operations for that block; to perform activities in block 515 related to image acquisition (e.g., to participate in the image acquisition, such as to activate the shutter, implement settings on a camera and/or associated sensor or component, rotate a camera as part of capturing a panorama image, etc.; to set the location and/or orientation of one or more camera devices and/or associated sensors or components; etc.); to provide input in blocks 515 and/or 522 that is used as part of subsequent automated operations, such as labels, annotations or other descriptive information with respect to particular images, surrounding rooms and/or objects in the rooms; etc. Additional details are included elsewhere herein regarding embodiments in which one or more human users provide input that is further used in additional automated operations of the ICA system.

FIGS. 6A-6B illustrate an example embodiment of a flow diagram for a MIGM (Mapping Information Generation Manager) system routine 600. The routine may be performed by, for example, execution of the MIGM system 160/160B of FIGS. 1 and 3, and/or a MIGM system as described with respect to FIGS. 2A-2D and elsewhere herein, such as to determine a room shape for a room (or other defined area) by analyzing information from one or more images acquired in the room (e.g., one or more 360° panorama images), to generate a partial or complete floor plan for a building or other defined area based at least in part on one or more images of the area and optionally additional data captured by a mobile computing device and using determined room shapes, and/or to generate other mapping information for a building or other defined area based at least in part on one or more images of the area and optionally additional data captured by a mobile computing device. In the example of FIGS. 6A-6B, the determined room shape for a room may be a 2D room shape to represent the locations of the walls of the room or a 3D fully closed combination of planar surfaces to represent the locations of walls and ceiling and floor of the room, and the generated mapping information for a building (e.g., a house) may include a 2D floor plan and/or 3D computer model floor plan, but in other embodiments, other types of room shapes and/or mapping information may be generated and used in other manners, including for other types of structures and defined areas, as discussed elsewhere herein. In at least some embodiments, the routine 600 may be invoked from block 420 of routine 400 of FIGS. 4A-4B, with corresponding information from routine 600 provided to routine 400 as part of implementation of that block 420, and with processing control returned to routine 400 after blocks 688 and/or 699 in such situations—in other embodiments, the routine 400 may proceed with additional operations in an asynchronous manner without waiting for such processing control to be returned (e.g., to proceed to block 425 once the corresponding information from routine 600 is provided to routine 400, to proceed with other processing activities while waiting for the corresponding information from the routine 600 to be provided to routine 400, etc.).

The illustrated embodiment of the routine begins at block 605, where information or instructions are received. The routine continues to block 610 to determine whether image information is already available to be analyzed for one or more rooms (e.g., for some or all of an indicated building, such as based on one or more such images received in block 605 as previously generated by the ICA routine), or if such image information instead is to be currently acquired. If it is determined in block 610 to currently acquire some or all of the image information, the routine continues to block 612 to acquire such information, optionally waiting for one or more users or devices to move throughout one or more rooms of a building and acquire panoramas or other images at one or more acquisition locations in one or more of the rooms (e.g., at multiple acquisition locations in each room of the building), optionally along with metadata information regarding the acquisition and/or interconnection information related to movement between acquisition locations, as discussed in greater detail elsewhere herein—implementation of block 612 may, for example, include invoking an ICA system routine to perform such activities, with FIG. 5 providing one example embodiment of an ICA system routine for performing such image acquisition. If it is instead determined in block 610 not to currently acquire the images, the routine continues instead to block 615 to obtain one or more existing panoramas or other images from one or more acquisition locations in one or more rooms (e.g., multiple images acquired at multiple acquisition locations that include at least one image and acquisition location in each room of a building), optionally along with metadata information regarding the acquisition and/or interconnection information related to movement between the acquisition locations, such as may in some situations have been supplied in block 605 along with the corresponding instructions.

After blocks 612 or 615, the routine continues to block 620, where it determines whether to generate mapping information that includes an inter-linked set of target panorama images (or other images) for a building or other group of rooms (referred to at times as a 'virtual tour', such as to enable an end-user to move from any one of the images of the linked set to one or more other images to which that starting current image is linked, including in some embodiments via selection of a user-selectable control for each such other linked image that is displayed along with a current image, optionally by overlaying visual representations of such user-selectable controls and corresponding inter-image directions on the visual data of the current image, and to similarly move from that next image to one or more additional images to which that next image is linked, etc.), and if so continues to block 625. The routine in block 625 selects pairs of at least some of the images (e.g., based on the images of a pair having overlapping visual content), and determines, for each pair, relative directions between the images of the pair based on shared visual content and/or on other captured linking interconnection information (e.g., movement information) related to the images of the pair (whether movement directly from the acquisition location for one image of a pair to the acquisition location of another image of the pair, or instead movement between those starting and ending acquisition locations via one or more other intermediary acquisition locations of other images). The routine in block 625 may further optionally use at least the relative direction information for the pairs of images to determine global relative positions of some or all of the images to each other in a common coordinate system, and/or generate the inter-image links and corresponding user-selectable controls as noted above. Additional details are included elsewhere herein regarding creating such a linked set of images.

After block 625, or if it is instead determined in block 620 that the instructions or other information received in block 605 are not to determine a linked set of images, the routine continues to block 635 to determine whether the instructions received in block 605 indicate to generate other mapping information for an indicated building (e.g., a floor plan), and if so the routine continues to perform some or all of blocks 637-685 to do so, and otherwise continues to block 690. In block 637, the routine optionally obtains additional information about the building, such as from activities performed during acquisition and optionally analysis of the images, and/or from one or more external sources (e.g., online databases, information provided by one or more end-users, etc.)—such additional information may include, for example, exterior dimensions and/or shape of the building, additional images and/or annotation information acquired corresponding to particular locations external to the building (e.g., surrounding the building and/or for other structures on the same property, from one or more overhead locations, etc.), additional images and/or annotation information acquired corresponding to particular locations within the building (optionally for locations different from acquisition locations of the acquired panorama images or other images), etc.

After block 637, the routine continues to block 640 to select the next room (beginning with the first) for which one or more images (e.g., 360° panorama images) acquired in the room are available, and to analyze the visual data of the image(s) for the room to determine a room shape (e.g., by determining at least wall locations), optionally along with determining uncertainty information about walls and/or other parts of the room shape, and optionally including identifying other wall and floor and ceiling elements (e.g., wall structural elements/objects, such as windows, doorways and stairways and other inter-room wall openings and connecting passages, wall borders between a wall and another wall and/or ceiling and/or floor, etc.) and their positions within the determined room shape of the room. In some embodiments, the room shape determination may include using boundaries of the walls with each other and at least one of the floor or ceiling to determine a 2D room shape (e.g., using one or trained machine learning models), while in other embodiments the room shape determination may be performed in other manners (e.g., by generating a 3D point cloud of some or all of the room walls and optionally the ceiling and/or floor, such as by analyzing at least visual data of the panorama image and optionally additional data captured by an image acquisition device or associated mobile computing device, such as by using visual odometry and optionally further using IMU data as part of one or more of SfM (Structure from Motion) or SLAM (Simultaneous Location And Mapping) or MVS (Multi-View Stereo) analysis). In addition, the activities of block 645 may further optionally determine and use initial pose information for each of those panorama images (e.g., as supplied with acquisition metadata for the panorama image), and/or obtain and use additional metadata for each panorama image (e.g., acquisition height information of the camera device or other image acquisition device used to acquire a panorama image relative to the floor and/or the ceiling). Additional details are included elsewhere herein regarding determining room shapes and identifying additional information for the rooms. After block 640, the routine continues to block 645, where it determines whether there are more rooms for which to determine room shapes based on images acquired in those rooms, and if so returns to block 640 to select the next such room for which to determine a room shape.

If it is instead determined in block 645 that there are not more rooms for which to generate room shapes, the routine continues to block 660 to determine whether to further generate at least a partial floor plan for the building (e.g., based at least in part on the determined room shape(s) from block 640, and optionally further information regarding how to position the determined room shapes relative to each other). If not, such as when determining only one or more room shapes without generating further mapping information for a building (e.g., to determine the room shape for a single room based on one or more images acquired in the room by the ICA system), the routine continues to block 688. Otherwise, the routine continues to block 665 to retrieve one or more room shapes (e.g., room shapes generated in block 645) or otherwise obtain one or more room shapes (e.g., based on human-supplied input) for rooms of the building, whether 2D or 3D room shapes, and then continues to block 670. In block 670, the routine uses the one or more room shapes to create an initial floor plan (e.g., an initial 2D floor plan using 2D room shapes and/or an initial 3D floor plan using 3D room shapes), such as a partial floor plan that includes one or more room shapes but less than all room shapes for the building, or a complete floor plan that includes all room shapes for the building. If there are multiple room shapes, the routine in block 670 further determines positioning of the room shapes relative to each other, such as by using visual overlap between images from multiple acquisition locations to determine relative positions of those acquisition locations and of the room shapes surrounding those acquisition locations, and/or by using other types of information (e.g., using connecting inter-room passages between rooms, optionally applying one or more constraints or optimizations, etc.). In at least some embodiments, the routine in block 670 further refines some or all of the room shapes by generating a binary segmentation mask that covers the relatively positioned room shape(s), extracting a polygon representing the outline or contour of the segmentation mask, and separating the polygon into the refined room shape(s). Such a floor plan may include, for example, relative position and shape information for the various rooms without providing any actual dimension information for the individual rooms or building as a whole, and may further include multiple linked or associated submaps (e.g., to reflect different stories, levels, sections, etc.) of the building. The routine further optionally associates positions of the doors, wall openings and other identified wall elements on the floor plan.

After block 670, the routine optionally performs one or more steps 680-685 to determine and associate additional information with the floor plan. In block 680, the routine optionally estimates the dimensions of some or all of the rooms, such as from analysis of images and/or their acquisition metadata or from overall dimension information obtained for the exterior of the building, and associates the estimated dimensions with the floor plan—it will be appreciated that if sufficiently detailed dimension information were available, architectural drawings, blueprints, etc. may be generated from the floor plan. After block 680, the routine continues to block 683 to optionally associate further information with the floor plan (e.g., with particular rooms or other locations within the building), such as additional existing images with specified positions and/or annotation information. In block 685, if the room shapes from block 645 are not 3D room shapes, the routine further optionally estimates heights of walls in some or all rooms, such as from analysis of images and optionally sizes of known objects in the images, as well as height information about a camera when the images were acquired, and uses that height information to generate 3D room shapes for the rooms. The routine further optionally uses the 3D room shapes (whether from block 640 or block 685) to generate a 3D computer model floor plan of the building, with the 2D and 3D floor plans being associated with each other—in other embodiments, only a 3D computer model floor plan may be generated and used (including to provide a visual representation of a 2D floor plan if so desired by using a horizontal slice of the 3D computer model floor plan).

After block 685, or if it is instead determined in block 660 not to determine a floor plan, the routine continues to block 688 to store the determined room shape(s) and/or generated mapping information and/or other generated information, to optionally provide some or all of that information to one or more recipients (e.g., to block 440 of routine 400 if invoked from that block), and to optionally further use some or all of the determined and generated information, such as to provide the generated 2D floor plan and/or 3D computer model floor plan for display on one or more client devices and/or to one or more other devices for use in automating navigation of those devices and/or associated vehicles or other entities, to similarly provide and use information about determined room shapes and/or a linked set of images and/or about additional information determined about contents of rooms and/or passages between rooms, etc.

If it is instead determined in block 635 that the information or instructions received in block 605 are not to generate mapping information for an indicated building, the routine continues instead to block 690 to perform one or more other indicated operations as appropriate. Such other operations may include, for example, receiving and responding to requests for previously generated floor plans and/or previously determined room shapes and/or other generated information (e.g., requests for such information for display on one or more client devices, requests for such information to provide it to one or more other devices for use in automated navigation, etc.), obtaining and storing information about buildings for use in later operations (e.g., information about dimensions, numbers or types of rooms, total square footage, adjacent or nearby other buildings, adjacent or nearby vegetation, exterior images, etc.), etc.

After blocks 688 or 690, the routine continues to block 695 to determine whether to continue, such as until an explicit indication to terminate is received, or instead only if an explicit indication to continue is received. If it is determined to continue, the routine returns to block 605 to wait for and receive additional instructions or information, and otherwise continues to block 699 and ends.

While not illustrated with respect to the automated operations shown in the example embodiment of FIGS. 6A-6B, in some embodiments human users may further assist in facilitating some of the operations of the MIGM system, such as for operator users and/or end-users of the MIGM system to provide input of one or more types that is further used in subsequent automated operations. As non-exclusive examples, such human users may provide input of one or more types as follows: to provide input to assist with the linking of a set of images, such as to provide input in block 625 that is used as part of the automated operations for that block (e.g., to specify or adjust initial automatically determined directions between one or more pairs of images, to specify or adjust initial automatically determined final global positions of some or all of the images relative to each other, etc.); to provide input in block 637 that is used as part of subsequent automated operations, such as one or more of the illustrated types of information about the building; to provide input with respect to block 640 that is used as part of subsequent automated operations, such as to specify or adjust initial automatically determined element locations and/or estimated room shapes and/or to manually combine information from multiple estimated room shapes for a room (e.g., separate room shape estimates from different images acquired in the room) to create a final room shape for the room and/or to specify or adjust initial automatically determined information about a final room shape, etc.; to provide input with respect to block 670, that is used as part of subsequent operations, such as to specify or adjust initial automatically determined positions of room shapes within a floor plan being generated and/or to specify or adjust initial automatically determined room shapes themselves within such a floor plan; to provide input with respect to one or more of blocks 680 and 683 and 685 that is used as part of subsequent operations, such as to specify or adjust initial automatically determined information of one or more types discussed with respect to those blocks; and/or to specify or adjust initial automatically determined pose information (whether initial pose information or subsequent updated pose information) for one or more of the panorama images; etc. Additional details are included elsewhere herein regarding embodiments in which human user(s) provide input that is further used in additional automated operations of the MIGM system.

Figure 7A:
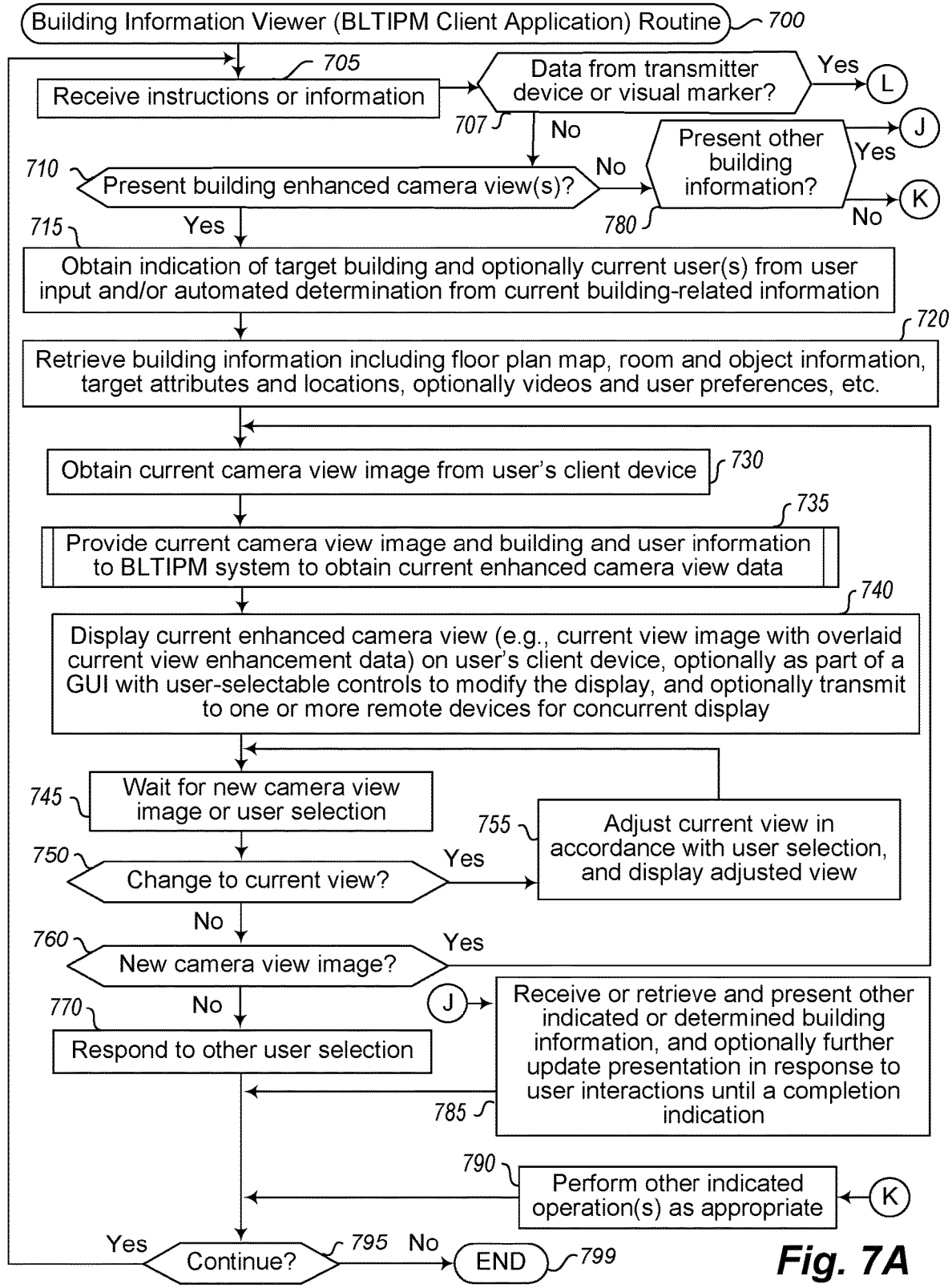
FIGS. 7A-7B illustrate an example embodiment of a flow diagram for a Building Information Viewer system routine in accordance with an embodiment of the present disclosure.
Figure 7B:
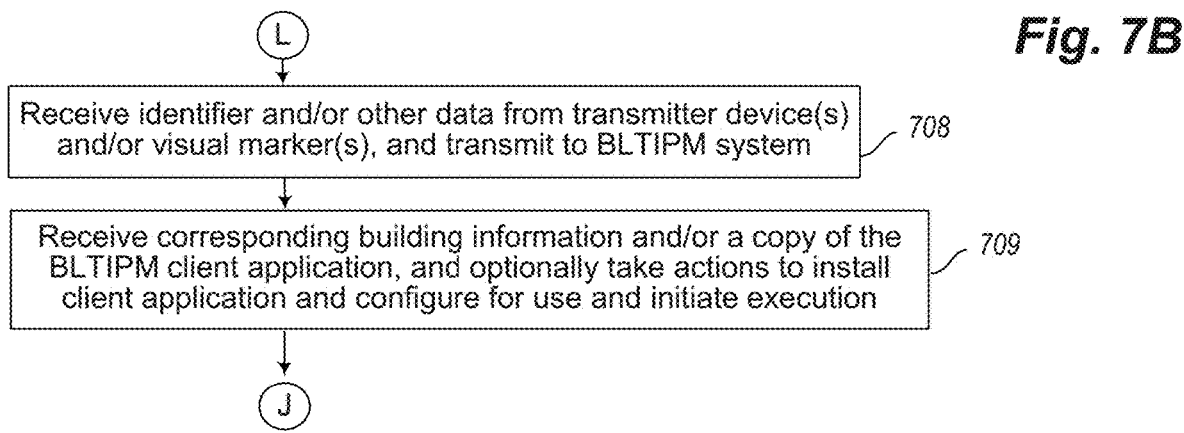

FIGS. 7A-7B illustrate an example embodiment of a flow diagram for a Building Information Viewer system routine 700, such as may be implemented by an embodiment of the BLTIPM client application. The routine may be performed by, for example, execution of a BLTIPM client application 391 or other building information viewer system 396 of mobile device 175 of FIG. 3 and/or of such a client application or other building information viewer system otherwise executing on a mobile device 175 and/or other computing system or device as described elsewhere herein, such as to receive and present building information (e.g., individual images; floor plans and/or other mapping-related information, such as determined room structural layouts/shapes, a virtual tour of inter-linked images, etc.; generated building description information; videos; etc.) associated with transmitter devices and/or visual markers or as otherwise received. In the example of FIGS. 7A-7B, the presented information is for one or more buildings (such as an interior of a house), but in other embodiments, other types of mapping information may be presented for other types of buildings or environments and used in other manners, as discussed elsewhere herein.

The illustrated embodiment of the routine begins at block 705, where instructions or information are received. At block 707, the routine determines whether data is received from one or more transmitter devices and/or visual markers, and if not continues to block 710. Otherwise, the routine continues to block 708 where one or more identifiers or other data is received from one or more transmitter devices and/or visual markers, and transmits the data to the BLTIPM system. In block 709, the routine then receives corresponding building information and/or a copy of the BLTIPM client application to be installed (e.g., if the blocks 707-709 are performed by a building information viewer system executing on the user device other than a BLTIPM client application, and receive data from a visual marker to cause the download of the BLTIPM client application copy), and optionally takes actions to install, configure and execute the client application (e.g., to perform all of the routine 700 other than its own downloading and installation). After block 709, the routine continues to block 785.

At block 710, the routine determines whether the received instructions or information in block 705 are to present enhanced camera view data for a current building, and if not continues to block 780. Otherwise, the routine continues to block 715 to obtain information for the current target building and optionally one or more current users, such as from current user input and/or an automated determination using current building-related information. In block 720, the routine then optionally retrieves building information such as a floor plan, room and object information, attributes and locations, etc. for the current building, such as for use in presentations in association with enhanced camera view data (e.g., in additional panes or portions of a GUI that also shows the enhanced camera view data). In block 730, the routine then obtains one or more current camera view target images from the mobile device, and in block 735 proceeds to provide the current target image(s) and indication of the current building to the BLTIPM system to obtain current enhanced camera view data, optionally along with other building and user information. In block 740, the routine then receives and presents the current enhanced camera view data on the mobile device, optionally as part of a GUI that includes user-selectable controls to modify the presentation (whether as part of visual enhancement data overlaid on a current image and/or other separate GUI controls), and optionally with other types of presented building information. In some embodiments, the routine 700 and/or routine 400 further transmits the same enhanced camera view data to one or more other remote devices for concurrent display (e.g., as part of a shared video conference). The routine then proceeds to perform blocks 745-755 to correspond to optional user interactions with the current presented enhanced camera view data and/or other user activities (e.g., movement of the mobile device to cause new target image(s) to be acquired), such as to wait in block 745 for a user selection or an indication of a new target image, and to then determine in block 750 if a user selection or other interaction with the current enhanced camera view has occurred, and if so to proceed to block 755 to adjust the current enhanced camera view in accordance with the user selection and display a corresponding adjusted view, before returning to block 745. If it is instead determined in block 750 that a new camera view target image is received, the routine returns to block 730 to obtain and present new enhanced camera view data based on the new target image, and otherwise continues to block 770 to respond to another user selection (e.g., to suspend or end a current presentation session at the current building; to switch to a presentation of a different type of building information, such as a floor plan and/or other previously acquired images; etc.).

If it is determined in block 710 that the instructions or other information received in block 705 do not indicate to present enhanced camera view data for a current building, the routine continues to block 780 to determine whether the instructions or other information received in block 705 indicate to present one or more other types of information about one or more buildings of interest. If so, the routine continues to block 785 to determine the one or more buildings of interest (e.g., based on information supplied in block 705, such as identifications of those buildings and/or by using one or more criteria to identify the buildings) and to retrieve corresponding information for the building(s) (e.g., of a default type, such as a floor plan for a single building, comparison information of one or more types for multiple buildings, etc.; of one or more types indicated in block 705; etc., and optionally by interacting with a MIGM system and/or an BLTIPM system to obtain that information), and presents the information on the mobile device. If the presented information includes one or more user-selectable GUI controls or other interaction mechanisms, the routine may further receive and respond to user selections or other interactions with the presentation information as appropriate, including to retrieve and present additional information as selected by the user. Additional details are included elsewhere herein regarding presentation of various types of building information.

If it is instead determined in block 780 that the instructions or other information received in block 705 do not indicate to present one or more other types of information about one or more buildings of interest, the routine continues instead to block 790 to perform one or more other indicated operations as appropriate, such as to configure parameters to be used in various operations of the system (e.g., based at least in part on information specified by a user of the system, such as a user of a mobile device who acquires one or more building interiors, an operator user of the BLTIPM and/or MIGM systems, etc., including for use in personalizing information display for a particular recipient user in accordance with his/her preferences or other information specific to that recipient), to obtain and store other information about users of the system (e.g., preferences or other information specific to that user), to respond to requests for generated and stored information, to receive data captured by the user device and/or other user-supplied information (e.g., notes) and send them to the BLTIPM system for storage (e.g., in an ongoing visit log), to perform any housekeeping tasks, etc.

Following blocks 770 or 785 or 790, the routine proceeds to block 795 to determine whether to continue, such as until an explicit indication to terminate is received, or instead only if an explicit indication to continue is received. If it is determined to continue, the routine returns to block 705 to await additional instructions or information, and if not proceeds to step 799 and ends.

Aspects of the present disclosure are described herein with reference to flowchart illustrations and/or block diagrams of methods, apparatus (systems), and computer program products according to embodiments of the present disclosure. It will be appreciated that each block of the flowchart illustrations and/or block diagrams, and combinations of blocks in the flowchart illustrations and/or block diagrams, can be implemented by computer readable program instructions. It will be further appreciated that in some implementations the functionality provided by the routines discussed above may be provided in alternative ways, such as being split among more routines or consolidated into fewer routines. Similarly, in some implementations illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures and/or by having multiple data structures consolidated into a single data structure. Similarly, in some implementations illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited by those claims. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A computer-implemented method comprising:
   obtaining, by one or more computing devices, information about each of multiple rooms of a house, including one or more textual descriptions of one or more attributes associated with that room and data captured in that room that includes at least one of visual data or audio data;
   determining, by the one or more computing devices and for each of a plurality of wireless transmitter devices in the house, an associated identifier transmitted by that wireless transmitter device and a respective location of that wireless transmitter device in one of the multiple rooms and a respective group of building information associated with that wireless transmitter device that includes at least one of the one or more textual descriptions associated with that one room and at least some of the data captured in that one room;
   interacting, by the one or more computing devices, with a plurality of user devices in the house based at least in part on the plurality of wireless transmitter devices, including, for each of the user devices:
      receiving, by the one or more computing devices, a sequence of identifiers sent from that user device as the user device moves along a path through the house, wherein the sequence of identifiers are received by that user device from a sequence of wireless transmitter identifiers along the path; and
      sending, by the one or more computing devices and in response to each of the identifiers of the received sequence, data to that user device for presentation that includes the respective group of building information associated with the wireless transmitter device transmitting that identifier;
   tracking, by the one or more computing devices and for each of the plurality of user devices, the path of that user device through the house using a sequence of locations that are based at least in part on the sequence of identifiers received from that user device;
   determining, by the one or more computing devices and based at least in part on the tracked paths for the plurality of user devices, aggregated information about movement through the house that includes a subset of one or more rooms of the house satisfying one or more defined criteria based on at least of a quantity of entrances into the one or more rooms by the user devices or a quantity of time spent in the one or more rooms by the user devices;

updating, by the one or more computing devices, information for each of one or more of the wireless transmitter devices based at least in part on the determined aggregated information, including to modify the respective group of building information associated with a first wireless transmitter device of the one or more wireless transmitter devices to include at least some of the determined aggregated information; and sending, by the one or more computing devices and after the updating, the modified respective group of building information associated with the first wireless transmitter device to an additional user device in the house in response to receiving from the additional user device the associated identifier for the first wireless transmitter device.

2. The computer-implemented method of claim 1 wherein the determining of the respective location of the first wireless transmitter device includes directing, by the one or more computing devices and based at least in part on the obtained information about the house, placement of the first wireless transmitter device in the house at that respective location, and wherein the updating of the information for the one or more wireless transmitter devices includes directing, by the one or more computing devices, an updated placement of the first wireless transmitter device at a new location in the house that is determined based at least in part on the determined aggregated information, and updating the respective location of the first wireless transmitter device to the new location in the house, such that the sending of the modified respective group of building information to the additional user device occurs as the additional user device approaches the new location in the house.

3. The computer-implemented method of claim 1 wherein the respective location of the first wireless transmitter device is in a first room of the house, and wherein the updating of the information for the one or more wireless transmitter devices includes receiving, by the one or more computing devices, additional data captured in the first room by one of the plurality of user devices, and updating the respective group of building information for the first wireless transmitter device to include the additional data, such that the sending of the modified respective group of building information to the additional user device includes sending the additional data to the additional user device as the additional user device approaches the respective location for the first wireless transmitter device.

4. The computer-implemented method of claim 1 wherein the plurality of wireless transmitter devices include beacon devices using Bluetooth Low Energy (BLE) in each of the multiple rooms;

wherein the house further has an additional near-field communication (NFC) device mounted proximate to an entrance to the house; and wherein the interacting with each of the plurality of user devices in the house further includes receiving, by the one or more computing devices, an additional identifier for the NFC device from that user device, and sending, by the one or more computing devices, authentication information to that user device to cause an electronic lockbox or an electronic lock at the entrance to provide access to the house.

5. A computer-implemented method comprising:

associating, by one or more computing devices, and for each of a plurality of wireless transmitter devices in a building and having an associated identifier transmitted by that wireless transmitter device, a respective location in the building and a respective group of building information with that wireless transmitter device, the respective group of building information being based on that respective location;

interacting, by the one or more computing devices, with a plurality of user devices in the building based at least in part on the plurality of wireless transmitter devices, including, for each of the user devices:

receiving, by the one or more computing devices, identifiers sent from that user device after being received by that user device from a sequence of wireless transmitter devices as the user device moves through at least some rooms of the building;

sending, by the one or more computing devices and in response to each of the received identifiers, data to that user device for presentation that includes the respective group of building information associated with the wireless transmitter device transmitting that received identifier; and tracking, by the one or more computing devices, a sequence of locations of that user device in the building based at least in part on the sequence of wireless transmitter devices for that user device;

determining, by the one or more computing devices and based at least in part on the tracked sequences of locations for the plurality of user devices, aggregated information about movement through the building that includes a subset of one or more rooms of the building satisfying one or more defined criteria; and providing, by the one or more computing devices, the determined aggregated information for further use.

6. The computer-implemented method of claim 5 further comprising:

updating, by the one or more computing devices, information associated with each of one or more of the wireless transmitter devices based at least in part on the determined aggregated information, including to modify the respective group of building information associated with one of the wireless transmitter devices; and sending, by the one or more computing devices and after the updating, the modified respective group of building information associated with the one wireless transmitter device to an additional user device in the building in response to receiving the associated identifier for the one wireless transmitter device from the additional user device.

7. The computer-implemented method of claim 6 wherein the updating of the information associated with each of one or more of the wireless transmitter devices includes updating the respective location of the one wireless transmitter device to be a new location within the building to which the one wireless transmitter device is moved, and performing the modifying of the respective group of building information associated with the one wireless transmitter device to include building information about the new location.

8. The computer-implemented method of claim 7 wherein the updating of the information associated with each of one or more of the wireless transmitter devices further includes determining, by the one or more computing devices, to move the one wireless transmitter device to the new location within the building based at least in part on the determined aggregated information, and directing, by the one or more computing devices, placement of the one wireless transmitter device at the new location.

9. The computer-implemented method of claim 5 wherein the plurality of wireless transmitter devices includes at least one of a near-field communication (NFC) device or a Bluetooth Low Energy (BLE) beacon device or a Wi-Fi device.

10. The computer-implemented method of claim 9 wherein the plurality of wireless transmitter devices further include one or more additional wireless transmitter devices, the one or more additional wireless transmitter devices including at least one of:
   a first NFC device or BLE beacon device proximate to an entrance of the building and having an associated respective group of information that is sent to one or more first user devices to provide overview information about the building; or
   a second NFC device or BLE beacon device proximate to the entrance of the building, and wherein the one or more computing devices further determine at least one of a start or an end to a visit to the building for each of the user devices upon receipt of an identifier associated with the second NFC device or BLE beacon device; or
   a third NFC device or BLE beacon device outside the entrance of the building and having an associated respective group of information that is sent to one or more third user devices to provide information about gaining access to the building; or
   a fourth NFC device or BLE beacon device proximate to an edge of a property on which the building is sited and having an associated respective group of information that is sent to one or more of the user devices to provide overview information about the building, and wherein entrance to the building by the one or more user devices is prompted by providing of the overview information.

11. The computer-implemented method of claim 5 further comprising, for one of the user devices, at least one of:
   performing, by the one or more computing devices, the tracking of the sequence of locations of the one user device in the building to determine a path of the one user device in the building, including combining triangulated location information for the one user device that is based on the respective locations for two or more of the wireless transmitter devices, and additional location information for the one user device using one or more sensors on the one user device, wherein the additional location information is based on at least one of one or more GPS signals received by the one user device, or visual odometry performed by the one user device, or movement information from one or more accelerometers or gyroscopes on the one user device; or
   performing, by the one or more computing devices, the sending of the data to the one user device by sending a combination of multiple of textual data, and audio data recorded in the building, and visual data recorded in the building; or
   performing, by the one or more computing devices, the sending of the data to the one user device by determining and sending information that is personalized to the one user device based at least in part on information previously associated with the one user device from one or more previous activities; or
   storing, by the one or more computing devices, information associated with a visit of the one user device to the building, and later providing the stored information to the one user device in response to a received request, wherein the information associated with the visit of the one user device to the building includes at least one of the sequence of locations for the one user device, or the data sent to the one user device, or information about one or more activities performed in the building by at least one of the one user device or a user of the one user device, or information received from the user of the one user device during the visit.

12. The computer-implemented method of claim 5 wherein the interacting with the plurality of user devices in the building further includes, for one of the user devices, at least one of:
   sending, by the one or more computing devices, one or more notification messages to the one user device to prompt a user of the one user device to present at least some of the data sent to that one user device; or
   sending, by the one or more computing devices, before the sending of the data to the one user device and in response to a first message from the one user device using data available at the building, a copy of a client application to install and execute on the one user device, and wherein the sending of the identifiers by the one user device to the one or more computing devices is performed by the client application executing on the one user device; or
   sending, by the one or more computing devices, before the sending of the data to the one user device and in response to a second message from the one user device using data available at an entrance to the building, authentication data for at least one of an electronic lockbox or an electronic lock to enable access to the building via the entrance; or
   sending, by the one or more computing devices and in response to a third message from the one user device using data on a visual marker displayed at the building, additional information about the building.

13. A non-transitory computer-readable medium having stored contents that cause one or more computing devices to perform automated operations, the automated operations including at least:
   directing, by the one or more computing devices, and for each of a plurality of wireless transmitter devices having an associated identifier transmitted by that wireless transmitter device, placement of that wireless transmitter device at a respective location in a building;
   determining, by the one or more computing devices, and for each of the plurality of wireless transmitter devices, a respective group of building information to associate with that wireless transmitter device corresponding to the respective location in the building of that wireless transmitter device;
   interacting, by the one or more computing devices, with a plurality of user devices in the building based at least in part on the plurality of wireless transmitter devices, including sending, to each of the user devices in response to identifiers received from that user device for multiple of the wireless transmitter devices, data including the respective groups of building information associated with the wireless transmitter devices transmitting the identifiers received from that user device;
   tracking, by the one or more computing devices and for each of the plurality of user devices, locations of that user device in the building based at least in part on the respective locations in the building of the wireless transmitter devices that are transmitting the identifiers received from that user device;

determining, by the one or more computing devices and based at least in part on the tracked locations for the plurality of user devices, aggregated information about the building that includes a subset of one or more rooms of the building satisfying one or more defined criteria; and providing, by the one or more computing devices, the determined aggregated information for further use.

14. The non-transitory computer-readable medium of claim 13 wherein the stored contents include software instructions that, when executed, cause the one or more computing devices to perform further automated operations including:

updating, by the one or more computing devices, information for each of one or more of the wireless transmitter devices based at least in part on the determined aggregated information, including to modify the respective group of building information associated with one of the wireless transmitter devices; and sending, by the one or more computing devices and after the updating, the modified respective group of building information to an additional user device in the building in response to receiving the associated identifier for the one wireless transmitter device from the additional user device.

15. The non-transitory computer-readable medium of claim 13 wherein the determined aggregated information about the building includes aggregated information about movement through the building, and wherein the automated operations further include analyzing, by the one or more computing devices, the determined aggregated information about the building and additional aggregated information about movement through additional buildings to predict movement patterns through one or more further buildings based at least in part on comparisons of the one or more further buildings to the building and to the additional buildings, and wherein the providing of the determined aggregated information includes providing the predicted movement patterns for the one or more further buildings.

16. The non-transitory computer-readable medium of claim 13 wherein the tracking of the locations in the building of each of the plurality of user devices includes determining at least one of a beginning of a visit of that user device to the building based at least in part on a first of the identifiers received from that user device or an end of the visit of that user device to the building based at least in part on a last of the identifiers received from that user device, and wherein the automated operations further include sending, by the one or more computing devices and to one or more additional user devices of one or more users associated with the building, and for each of the plurality of user devices in response to the determining of the at least one of the beginning or the end of the visit of that user device, information about the determined at least one of the beginning or the end of the visit of that user device.

17. The non-transitory computer-readable medium of claim 13 wherein the providing of the determined aggregated information includes sending the determined aggregated information to one or more additional user devices of one or more additional users associated with the building.

18. The non-transitory computer-readable medium of claim 13 wherein the automated operations further include:
interacting, by the one or more computing devices, with one of the plurality of user devices in a plurality of additional buildings, including sending, to the one user device in response to additional identifiers received from the one user device for additional wireless transmitter devices in that additional building, respective additional groups of building information associated with additional wireless transmitter devices transmitting the additional identifiers;

tracking, by the one or more computing devices and for each of the additional buildings, additional locations of the one user device in that additional building based at least in part on respective additional locations in that additional building of the additional wireless transmitter devices that are transmitting the additional identifiers received from the one user device for that additional building;

determining, by the one or more computing devices and based at least in part on the tracked additional locations, further aggregated information for the one user device that includes movement patterns of the one user device through the building and through the additional buildings;

analyzing, by the one or more computing devices, the determined further aggregated information to predict movement patterns of the one user device through one or more further buildings based at least in part on comparisons of the one or more further buildings to the building and to the additional buildings; and providing, by the one or more computing devices, information about the predicted movement patterns for further use.

19. A system comprising:
one or more hardware processors of one or more computing devices; and one or more memories with stored instructions that, when executed by at least one of the one or more hardware processors, cause at least one of the one or more computing devices to perform automated operations including at least:

determining, for each of a plurality of wireless transmitter devices in a building and having an associated identifier transmitted by that wireless transmitter device, a respective location in the building of that wireless transmitter device and a respective group of building information associated with that wireless transmitter device and corresponding to that respective location;

interacting with multiple first user devices in the building based at least in part on the plurality of wireless transmitter devices, including sending, to each of the first user devices in response to identifiers received from that first user device for multiple of the wireless transmitter devices, data that includes the respective groups of building information associated with the wireless transmitter devices transmitting the identifiers received from that first user device;

updating information for one of the wireless transmitter devices, including to modify the respective group of building information associated with the one wireless transmitter device based on at least one of additional information being available for the respective location in the building of the one wireless transmitter device, or of a change to the respective location in the building of the one wireless transmitter device; and interacting, after the updating, with a second user device in the building based at least in part on the plurality of wireless transmitter devices, including sending, to the second user device in response to multiple identifiers received from the second user device for multiple of the wireless transmitter devices that include the one wireless transmitter device, data that includes the respective groups of building information associated with the multiple wireless transmitter devices, including sending the updated information to the second user device in response to receiving the identifier for the one wireless transmitter device.

20. The system of claim 19 wherein the stored instructions include software instructions that, when executed, cause the one or more computing devices to perform further automated operations including:

tracking, for each of the first user devices, a sequence of locations of that first user device in the building based at least in part on the received identifiers from that first user device; and providing information about the tracked sequence of locations for at least one of the first user devices for further use.

21. The system of claim 19 wherein the automated operations further include:

determining, based at least in part on the interacting with the multiple first user devices, aggregated information about the building that includes a subset of one or more rooms of the building satisfying one or more defined criteria; and providing information about the determined aggregated information for further use.

22. The system of claim 21 wherein modifying of the respective group of building information associated with the one wireless transmitter device involves including the additional information in the modified respective group of building information, and wherein the additional information is based at least in part on the determined aggregated information, such that the sending of the updated information to the second user device includes sending the additional information.

23. The system of claim 19 wherein the updating of the respective group of building information associated with the one wireless transmitter device includes receiving an indication of a new location for the one wireless transmitter device resulting from the change to the respective location in the building of the one wireless transmitter device, modifying the respective location in the building of the one wireless transmitter device to be the new location, and modifying the respective group of building information associated with the one wireless transmitter device to include new building information associated with the new location, such that the sending of the updated information to the second user device includes sending the new building information.

24. The system of claim 19 wherein the automated operations further include, before the determining for each of the plurality of wireless transmitter devices of the respective location in the building of that wireless transmitter device:

interacting with multiple third user devices in a second building based at least in part on the plurality of wireless transmitter devices at respective second locations in the second building, including sending, to each of the third user devices in response to identifiers received from that third user device for multiple of the wireless transmitter devices, data that includes respective second groups of building information for the second building that are associated with the wireless transmitter devices transmitting the identifiers received from that second user device, and wherein the determining for each of the plurality of wireless transmitter devices of the respective location in the building of that wireless transmitter device includes receiving indications of the plurality of wireless transmitter devices being moved from the second building to the building.

25. The system of claim 19 wherein the determining for each of the plurality of wireless transmitter devices of the respective location in the building of that wireless transmitter device includes:

receiving information about the building that includes a floor plan of the building and textual descriptions associated with a plurality of locations in multiple rooms of the building;

determining, based at least in part on the floor plan and the plurality of locations, positions in the building at which to place the plurality of wireless transmitter devices; and directing, for each of the plurality of wireless transmitter devices, placement of that wireless transmitter device at a respective one of the determined positions in the building.

26. The system of claim 19 further comprising the second user device, and wherein the automated operations further include:

receiving, by the second user device, the multiple identifiers from the multiple wireless transmitters in a sequence as the second user device moves through the building; and for each of the multiple identifiers in the sequence,
transmitting, by the second user device and to the one or more computing devices, that identifier upon the receiving of that identifier by the second user device;
receiving, by the second user device and from the one or more computing devices, the respective group of building information associated with the wireless transmitter device transmitting that identifier; and
presenting, on the second user device, the received respective group of building information.

* * * * *